United States Patent
Alsina-Fernandez et al.

(10) Patent No.: US 12,453,758 B2
(45) Date of Patent: Oct. 28, 2025

(54) METHOD OF USING A GIP/GLP1 CO-AGONIST FOR DIABETES

(71) Applicant: Eli Lilly and Company, Indianapolis, IN (US)

(72) Inventors: Jorge Alsina-Fernandez, Indianapolis, IN (US); Over Cabrera, Carmel, IN (US); Tamer Coskun, Carmel, IN (US)

(73) Assignee: ELI LILLY AND COMPANY, Indianapolis, IN (US)

( * ) Notice: Subject to any disclaimer, the term of this patent is extended or adjusted under 35 U.S.C. 154(b) by 0 days.

(21) Appl. No.: 19/098,553

(22) Filed: Apr. 2, 2025

(65) Prior Publication Data

US 2025/0241995 A1 Jul. 31, 2025

Related U.S. Application Data

(62) Division of application No. 17/260,279, filed as application No. PCT/US2019/042824 on Jul. 22, 2019, now Pat. No. 12,295,987.

(60) Provisional application No. 62/740,640, filed on Oct. 3, 2018, provisional application No. 62/730,562, filed on Sep. 13, 2018, provisional application No. 62/702,180, filed on Jul. 23, 2018.

(51) Int. Cl.
*A61K 38/26* (2006.01)
*A61P 3/10* (2006.01)

(52) U.S. Cl.
CPC .............. *A61K 38/26* (2013.01); *A61P 3/10* (2018.01)

(58) Field of Classification Search
CPC .................................. A61K 38/26; A61P 3/10
See application file for complete search history.

(56) References Cited

U.S. PATENT DOCUMENTS

| | | | |
|---|---|---|---|
| 9,474,780 B2 | 10/2016 | Bokvist et al. | |
| 10,278,923 B2 | 5/2019 | Nielsen et al. | |
| 11,357,820 B2 | 6/2022 | Corvari et al. | |
| 2013/0065828 A1 | 3/2013 | Ruus et al. | |

FOREIGN PATENT DOCUMENTS

| | | |
|---|---|---|
| WO | 2013164483 | 11/2013 |
| WO | 2014177683 A1 | 11/2014 |
| WO | 2015022420 A1 | 2/2015 |
| WO | 2015067715 A2 | 5/2015 |
| WO | 2016111971 A1 | 7/2016 |
| WO | 2017/074715 A1 | 5/2017 |
| WO | 2020/023386 A1 | 1/2020 |

OTHER PUBLICATIONS

Chaplin et al. Properties of GLP-1 agonists and their use in type 2 diabetes. Prescriber, (2016), 27(1), 43-46.
Ciardullo et al., "GLP1-GIP receptor co-agonists: a promising evolution in the treatment of type 2 diabetes," Acta Diabetologica, https://doi.org/10.1007/s00592-024-02300-6, Published online: Jun. 3, 2024, 10 pages.
Closer Look, American Diabetes Association 82nd Scientific Sessions, Jun. 3-7, 2022; New Orleans, LA (+Virtual); Day #2 Highlights—Draft, www.closeconcerns.com, 31 pages.
Closer Look, American Diabetes Association 82nd Scientific Sessions, Jun. 3-7, 2022; New Orleans, LA (+Virtual); Day #5 Highlights—Draft, www.closeconcerns.com, 37 pages.
Closer Look, ATTD (Advanced Technologies and Treatments for Diabetes) 2022, Apr. 27-30, 2022; Barcelona, Spain (+Virtual); Full Report—Draft, www.closeconcerns.com, 304 pages.
Closer Look, Practical Ways to Achieve Targets in Diabetes Care (Keystone) 2024, Jul. 10-13, 2024; Keystone, CO; Day #2 Highlights—Draft, www.closeconcerns.com, 18 pages.
Closer Look, www.closerconcerns.com, EASD 2018 (European Association for the Study of Diabetes), Oct. 1-5, 2018; Berlin, Germany; Day #4 Highlights—Draft, pp. 1-29.
Coskun et al., LY3298176, a novel dual GIP and GLP-1 receptor agonist for the treatment of type 2 diabetes mellitus: from discovery to clinical proof of concept. Molecular metabolism, (2018), 18, 3-14.
Del Prato et al., "Tirzepatide versus insulin glargine in type 2 diabetes and increased cardiovascular risk (SURPASS-4): a randomised, open-label, parallel-group, multicentre, phase 3 trial," The Lancet, vol. 398, pp. 1811-1824, Nov. 13, 2021, Published Online Oct. 18, 2021.
Diabetes_Core_Update_Nov. 2023, diabetesjournals.org, 12 pages (transcript from audio podcast at diabetesjournals.org/journals/pages/diabetes-core-update-podcasts).
Fanshier et al., "Tirzepatide: A Novel Glucose-Dependent Insulinotropic Polypeptide/Glucagon-Like Peptide 1 Receptor Agonist for the Treatment of Type 2 Diabetes: The First Twincretin," Diabetes Journal, vol. 41, No. 3, pp. 367-377, Summer 2023.

(Continued)

*Primary Examiner* — Julie Ha
(74) *Attorney, Agent, or Firm* — Parker D. McCrary

(57) ABSTRACT

The present invention provides methods of treating type 2 diabetes (T2D) using a novel dosing regimen of a GIP:GLP-1 Peptide having a GIP:GLP-1 receptor agonist potency ratio that is about 2.5:1 to about 10:1 GIP to GLP-1. Furthermore, the present invention provides methods of treating T2D using a novel dosing regimen of a GIP:GLP-1 Peptide having a GIP:GLP-1 receptor agonist potency ratio that is about 2.5:1 to about 5:1 GIP to GLP-1. Also, the present invention provides methods of inducing T2D remission using a novel dosing regimen of a GIP:GLP-1 Peptide. The present invention also provides methods of treating obesity using a novel dosing regimen of a GIP:GLP-1 Peptide.

8 Claims, No Drawings
Specification includes a Sequence Listing.

(56) References Cited

OTHER PUBLICATIONS

Frias et al., (2018). Efficacy and safety of LY3298176, a novel dual GIP and GLP-1 receptor agonist, in patients with type 2 diabetes: a randomised, placebo-controlled and active comparator-controlled phase 2 trial. The Lancet, 392 (10160), 2180-2193.
I8F-MC-GPGH(c) Clinical Protocol, "Protocol I8F-MC-GPGH(c) A Randomized, Phase 3, Open-Label Trial Comparing the Effect of LY3298176 versus Titrated Insulin Degludec on Glycemic Control in Patients with Type 2 Diabetes (SURPASS-3)," Eli Lilly and Company, Indianapolis, Indiana USA 46285, Approval Date: Jul. 30, 2020 GMT, 95 pages.
I8F-MC-GPGI(b) Clinical Protocol, "Protocol I8F-MC-GPGI(b) A Randomized, Phase 3, Double-blind Trial Comparing the Effect of the Addition of Tirzepatide versus Placebo in Patients with Type 2 Diabetes Inadequately Controlled on Insulin Glargine with or without Metformin (SURPASS-5)," Eli Lilly and Company, Indianapolis, Indiana USA 46285, Approval Date: Jun. 26, 2020 GMT, 100 pages.
I8F-MC-GPGK(b) Clinical Protocol, "Protocol I8F-MC-GPGK(b) A Randomized, Double-blind, Placebo-Controlled Trial Comparing the Efficacy and Safety of Three Tirzepatide Does versus Placebo in Patients with Type 2 Diabetes, Inadequately Controlled with Diet and Exercise Alone (SURPASS-1)," Eli Lilly and Company, Indianapolis, Indiana USA 46285, Approval Date: Apr. 15, 2020 GMT, 91 pages.
I8F-MC-GPGL(b) Clinical Protocol, "Protocol I8F-MC-GPGL(b) A Phase 3, Randomized, Open-Label Trial Comparing Efficacy and Safety of Tirzepatide versus Semaglutide Once Weekly as Add-on Therapy to Metformin in Patients with Type 2 Diabetes (SURPASS-2)," Eli Lilly and Company, Indianapolis, Indiana USA 46285, Approval Date: Jun. 15, 2020 GMT, 99 pages.
I8F-MC-GPGM(b) Clinical Protocol, "Protocol I8F-MC-GPGM(b) Efficacy and Safety of LY3298176 Once Weekly versus Insulin Glargine in Patients with Type 2 Diabetes and Increased Cardiovascular Risk (SURPASS-4)," Eli Lilly and Company, Indianapolis, Indiana USA 46285, Approval Date: Jul. 10, 2020 GMT, 94 pages.
Kaneko, "Tirzepatide: A Novel, Once-weekly Dual GIP and GLP-1 Receptor Agonist for the Treatment of Type 2 Diabetes," Touch Medical Media, DOI: https://doi.org/10.17925/EE.2022.18.1.10, Jun. 16, 2022, pp. 10-19.
Ludvik et al., "Once-weekly tirzepatide versus once-daily insulin degludec as add-on to metformin with or without SGLT2 inhibitors in patients with type 2 diabetes (SURPASS-3): a randomised, open-label, parallel-group, phase 3 trial," The Lancet, vol. 398, pp. 583-598, Aug. 14, 2021, Published Online Aug. 6, 2021.
MacIsaac et al., Challenging Clinical Perspectives in Type 2 Diabetes with Tirzepatide, a First-in-Class Twincretin, Diabetes Ther (2023) 14:1997-2014, https://doi.org/10.1007/s13300-023-01475-5.
Mudalier, Diabetes remission—The holy grail in diabetes management, Chronicle of Diabetes Research and Practice, Jan.-Jun. 2024, vol. 3, Issue 1, pp. 1-4.
Nathan et al., (2009). Medical management of hyperglycemia in type 2 diabetes: a consensus algorithm for the initiation and adjustment of therapy: a consensus statement of the American Diabetes Association and the European Association for the Study of Diabetes. Diabetes care, 32(1), 193-203.

Petri et al., Diabetes Obes Metab. 2018;20:2238-2245 (Year: 2018).
Popovic et al., "Achievement of normoglycemia with tirzepatide in type 2 diabetes mellitus: A step closer to drug-induced diabetes remission?," Journal of Diabetes and Its Complications 38 (2024) 108800, 3 pages.
Portron et al. Pharmacodynamics, pharmacokinetics, safety and tolerability of the novel dual glucose-dependent insulinotropic polypeptide/glucagon-like peptide-1 agonist RG 7697 after single subcutaneous administration in healthy subjects. Diabetes, Obesity and Metabolism, (2017), 19(10), 1446-1453.
Pratley et al., Oral semaglutide versus subcutaneous liraglutide and placebo in type 2 diabetes (PIONEER 4): a randomized, double blind, phase 3a trial; The Lancet, (online Jun. 8, 2019).
Rosenstock et al., "Achieving Normoglycemia With Tirzepatide: Analysis of SURPASS 1-4 Trials," Diabetes Care, vol. 46, Nov. 2023, pp. 1986-1992.
Rosenstock et al., "Efficacy and safety of a novel dual GIP and GLP-1 receptor agonist tirzepatide in patients with type 2 diabetes (SURPASS-1): a double-blind, randomised, phase 3 trial," The Lancet, vol. 398, pp. 143-155, Jul. 10, 2021, Published Online Jun. 26, 2021.
Schmitt et al. (2017). Pharmacodynamics, pharmacokinetics and safety of multiple ascending doses of the novel dual glucose-dependent insulinotropic polypeptide/glucagon-like peptide-1 agonist RG 7697 in people with type 2 diabetes mellitus. Diabetes, Obesity and Metabolism, 19(10), 1436-1445.
Sun et al., Gastrointestinal adverse events of glucagon-like peptide-1 receptor agonists in patients with type 2 diabetes: a systematic review and network meta-analysis. Diabetes technology & therapeutics, (2015), 17(1), 35-42.
Tan et al., "Tirzepatide and the new era of twincretins for diabetes," The Lancet, vol. 398, pp. 95-97, Jul. 10, 2021, Published Online Jun. 26, 2021, https://doi.org/10.1016/S0140-6736(21)01390-8.
Taub, Chemokine-leukocyte interactions. The voodoo that they do so well. Cytokine & growth factor reviews, (1996), 7(4), 355-376.
Trial NCT02759107, A Study of LY3298176 in Healthy Participants and Participants With Type 2 Diabetes (T2DM), May 3, 2016 (Year: 2016).
Will et al., Gut check on diabesity: leveraging gut mechanisms for the treatment of type 2 diabetes and obesity. Current opinion in pharmacology, (2017), 37, 10-15; 6 pages.
Wong et al., (2018). Noninvasive biomarkers in NAFLD and NASH—current progress and future promise. Nature Reviews Gastroenterology & Hepatology, 15(8), 461 https://www.ncbi.nlm.nih.gov/pubmed/29844588.
Written Opinion of the International Searching Authority pertaining to International Application No. PCT/US2019/042824; Date of Mailing: Oct. 14, 2019; 10 pages.
International Search Report of the International Searching Authority pertaining to International Application No. PCT/US2019/042824; Date of Mailing: Oct. 14, 2019; 6 pages.
Younossi et al., Global epidemiology of nonalcoholic fatty liver disease—meta-analytic assessment of prevalence, incidence, and outcomes. Hepatology, (2016), 64(1), 73-84.
International Search Report and Written Opinion, PCT Application No. PCT/US2019/042824, mailed date Oct. 14, 2019, pp. 10.
European Extended Search Report, EP Application No. 24194825.6, mailed date Nov. 28, 2024, pp. 11.

METHOD OF USING A GIP/GLP1 CO-AGONIST FOR DIABETES

The present application is being filed along with a Sequence Listing in ST.26 XML format. The Sequence Listing is provided as a file titled "χ21834A_US 8jul.2025," created 8 Jul. 2025, and is 550 KB in size. The Sequence Listing in formation in the ST.26 XML format is incorporated herein by reference in its entirety.

The present invention provides methods of treating type 2 diabetes (T2D) using a novel dosing regimen of a GIP/GLP-1 co-agonist compound (hereafter GIP:GLP-1 Peptide) having a GIP:GLP-1 receptor agonist potency ratio that is about 2.5 to about 10:1 GIP to GLP-1. Furthermore, the present invention provides methods of treating T2D using a novel dosing regimen of a GIP:GLP-1 Peptide having a GIP:GLP-1 receptor agonist potency ratio that is about 2.5:1 to about 5:1 GIP to GLP-1. Also, the present invention provides methods of inducing T2D remission using a novel dosing regimen of a GIP:GLP-1 Peptide. The present invention also provides methods of treating obesity using a novel dosing regimen of a GIP:GLP-1 Peptide.

Over the past several decades, the prevalence of diabetes has continued to rise. T2DM is the most common form of diabetes accounting for approximately 90% of all diabetes. T2DM is characterized by high blood glucose levels associated mainly with insulin resistance. T2D is epidemic. Long-term consequences of T2D translate into enormous human suffering and economic costs; however, much of the morbidity associated with long-term microvascular and neuropathic complications can be substantially reduced by interventions that achieve glucose levels close to the non-diabetic range. Although new classes of medications and numerous combinations have been demonstrated to lower glycemia, it is reported that current-day management generally fails to achieve and maintain the glycemic levels most likely to provide optimal healthcare status for people with diabetes. *The Medical Management of Hyperglycemia in Type 2 Diabetes: A Consensus Algorithm for the Initiation and Adjustment of Therapy*, DIABETES CARE, VOLUME 32:193-203;, NUMBER 1, January 2009. The American Diabetes Association guidelines recommend to use HbA1c in the range of 5.7 to 6.1% (39-47 mmol/mol) as the prediabetes level. (39-47 mmol/mol). American Diabetes Association, Diabetes Care. 2018 January; 41 (Supplement 1): S55-S64. There is a significant need for a treatment method to enable patients with T2D to reach their glycemic treatment goals.

It is well-known that GLP1 treatments are associated with nausea, vomiting, and/or diarrhea. For example, one study reported that all GLP-1 receptor agonist dosing regimens significantly increased the incidence of gastrointestinal adverse events. Diabetes Technol Ther. 2015 January; 17 (1): 35-42.

Although endogenous GIP exerts strong insulinotropic effects in healthy subjects, the severe reduction in insulinotropic effect of GIP and the GIP-dependent enhancement of postprandial glucagon response have discouraged development of GIP-based therapies for T2D. Seino, et.al., *GIP and GLP-1, the two incretin hormones: Similarities and differences*; Journal of Diabetes Investigation, Volume 1 Issue ½ (February/April 2010) (8-23) p 16.

Also, previous clinical trials of a GIP/GLP1 co-agonist compound having a balanced GIP/GLP1 potency have been performed and found that tolerability at high doses was limited by gastrointestinal adverse events. Portron, A. et al. "Pharmacodynamics, pharmacokinetics, safety and tolerability of the novel dual glucose-dependent insulinotropic polypeptide/glucagon-like peptide-1 agonist RG7697 after single subcutaneous administration in healthy subjects." Diabetes Obes. Metab. 2017; 19:1446-1453. Finan, B. et al. "Unimolecular dual incretins maximize metabolic benefits in rodents, monkeys, and humans." Sci Trans Med. 2013; 5 (209): 209ra151. The dose limitation associated with gastrointestinal adverse events may prevent dosing to the desired effective dose, may compromise patient compliance with treatment, and may limit the effectiveness of the treatment regimen.

While treatments for T2D include GLP-1 receptor agonists, there are currently no approved T2D treatments reporting GIP/GLP receptor co-agonism. Furthermore, there are no available treatments having a ratio that is about 2.5:1 to about 10:1 GIP to GLP-1 receptor agonist potency to treat T2D.

One GIP/GLP-1 receptor co-agonist having a potency ratio of about 3.6:1 GIP:GLP-1 is known as tirzepatide. In a Phase II clinical trial, tirzepatide treatment using once weekly subcutaneous doses including a 15 mg dose provided dramatic reduction of HbA1c, remission of diabetes for many patients after 26 weeks, and dramatic improvement in weight control.

Obesity is a complex medical disorder resulting in excessive accumulation of adipose tissue mass. Today obesity is a global public health concern that is associated with undesired health outcomes and morbidities. Desired treatments for patients with obesity strive to reduce excess body weight, improve obesity-related co-morbidities, and maintain long-term weight reduction. Available treatments for obesity are particularly unsatisfactory for patients with severe obesity. Successful treatment of obesity is associated with alleviation or prevention of T2D. There is a need for alternative treatment options to induce therapeutic weight loss in patients in need of such treatment. Compounds having a ratio that is about 2.5:1 to about 10:1 GIP receptor agonist potency to GLP-1 receptor agonist potency are useful for significantly improving weight management, and can prevent the manifestation of T2D in formerly obese patients susceptible to T2D.

WO2016/111971 describes peptides stated to have GLP-1 and GIP activity. WO2013/164483 also discloses compounds stated to have GLP-1 and GIP activity. U.S. Pat. No. 9,474,780 generally describes compositions containing a GIP/GLP1 co-agonist, administered by parenteral routes, and generally discloses a wide dosage range up to about 30 mg per person per week. U.S. Pat. No. 9,474,780 discloses the use of GIP/GLP1 co-agonists for treating diabetes, obesity, and other conditions. U.S. Pat. No. 9,474,780 describes and claims tirzepatide.

The present invention provides novel dosing regimens of a GIP:GLP-1 Peptide for use in the aforementioned therapies (glycemic control/diabetes, obesity) that include one or more titration doses and a maintenance dose. More specifically, the present invention provides novel dosing regimens that include a titration dose and a maintenance dose wherein the titration dose is about 50% of the maintenance dose and is administered about once weekly for a minimum of about 2 weeks before administration of the maintenance dose. In another aspect, the dosing regimen comprises three titration doses: the first being about 25% of the maintenance dose, the second being about 50% of the maintenance dose and the third being about 75% of the maintenance dose, and a maintenance dose wherein each titration dose is administered about once weekly for a minimum of about 2 weeks before the administration of the next higher dose. In yet a third embodiment, the dosing regimen comprises five titration doses: the first being about 17% of the maintenance dose, the second being about 33% of the maintenance dose, the third being about 50% of the maintenance dose, the fourth being about 66% of the maintenance dose and the fifth being about 83% of the maintenance dose wherein each titration dose is administered about once weekly for a minimum of about 2 weeks before the administration of the next higher dose. Further embodiments are dosing regimens as above where each titration dose is administered about once weekly for about 4 weeks before the administration of the next higher dose begins.

In an embodiment, GIP:GLP-1 Peptides of the present invention have a receptor agonist potency ratio as measured after a 60 minute incubation using a casein cAMP assay normalized against GIP and GLP-1 of about 2.5:1 to about 10:1 GIP to GLP-1. In an embodiment, GIP:GLP-1 Peptides of the present invention have a receptor agonist potency ratio as measured after a 60 minute incubation using a casein cAMP assay normalized against GIP and GLP-1 of about 2.5:1 to about 5:1 GIP to GLP-1. In an embodiment, GIP:GLP-1 Peptides of the present invention have a receptor agonist potency ratio as measured after a 60 minute incubation using a casein cAMP assay normalized against GIP and GLP-1 of about 2.5:1 to about 3.5:1 GIP to GLP-1 . . . . In an embodiment, GIP:GLP-1 Peptides of the present invention have a receptor agonist potency ratio as measured after a 60 minute incubation using a casein cAMP assay normalized against GIP and GLP-1 of about 2.5:1 to about 10:1 GIP to GLP-1. In an embodiment, GIP:GLP-1 Peptides of the present invention have a receptor agonist potency ratio as measured after a 60 minute incubation at 37C using a casein cAMP assay normalized against GIP and GLP-1 of about 2.5:1 to about 10:1 GIP to GLP-1.

Accordingly, the present invention provides a method of treating type 2 diabetes in a patient in need thereof, comprising: administering a titration dose of a GIP:GLP-1 Peptide for about two weeks and thereafter administering a maintenance dose of that GIP:GLP-1 Peptide wherein the titration dose is about 50% of the maintenance dose and wherein the GIP:GLP-1 Peptide has a receptor agonist potency ratio as measured after a 60 minute incubation using a casein cAMP assay normalized against GIP and GLP-1 that is about 2.5:1 to about 10:1 GIP to GLP-1.

The present invention further provides a method of improving glycemic control in a patient in need thereof, comprising: administering a titration dose of a GIP:GLP-1 Peptide for about two weeks and thereafter administering a maintenance dose of that GIP:GLP-1 Peptide wherein the titration dose is about 50% of the maintenance dose and wherein the GIP:GLP-1 Peptide has a receptor agonist potency ratio as measured after a 60 minute incubation using a casein cAMP assay normalized against GIP and GLP-1 that is about 2.5:1 to about 10:1 GIP to GLP-1.

Furthermore, the present invention provides a method of improving weight management in a patient in need thereof, comprising: administering a titration dose of a GIP:GLP-1 Peptide for about two weeks and thereafter administering a maintenance dose of that GIP:GLP-1 Peptide wherein the titration dose is about 50% of the maintenance dose and wherein the GIP:GLP-1 Peptide has a receptor agonist potency ratio as measured after a 60 minute incubation using a casein cAMP assay normalized against GIP and GLP-1 that is about 2.5:1 to about 10:1 GIP to GLP-1.

Furthermore, the present invention provides a method of treating chronic kidney disease in a patient in need thereof, comprising: administering a titration dose of a GIP:GLP-1 Peptide for about two weeks and thereafter administering a maintenance dose of that GIP:GLP-1 Peptide wherein the titration dose is about 50% of the maintenance dose and wherein the GIP:GLP-1 Peptide has a receptor agonist potency ratio as measured after a 60 minute incubation using a casein cAMP assay normalized against GIP and GLP-1 that is about 2.5:1 to about 10:1 GIP to GLP-1.

Furthermore, the present invention provides a method of treating atherosclerosis in a patient in need thereof, comprising: administering a titration dose of a GIP:GLP-1 Peptide for about two weeks and thereafter administering a maintenance dose of that GIP:GLP-1 Peptide wherein the titration dose is about 50% of the maintenance dose and wherein the GIP:GLP-1 Peptide has a receptor agonist potency ratio as measured after a 60 minute incubation using a casein cAMP assay normalized against GIP and GLP-1 that is about 2.5:1 to about 10:1 GIP to GLP-1.

Furthermore, the present invention provides a method of treating NAFLD in a patient in need thereof, comprising: administering a titration dose of a GIP:GLP-1 Peptide for about two weeks and thereafter administering a maintenance dose of that GIP:GLP-1 Peptide wherein the titration dose is about 50% of the maintenance dose and wherein the GIP:GLP-1 Peptide has a receptor agonist potency ratio as measured after a 60 minute incubation using a casein cAMP assay normalized against GIP and GLP-1 that is about 2.5:1 to about 10:1 GIP to GLP-1.

Furthermore, the present invention provides a method of treating NASH in a patient in need thereof, comprising: administering a titration dose of a GIP:GLP-1 Peptide for about two weeks and thereafter administering a maintenance dose of that GIP:GLP-1 Peptide wherein the titration dose is about 50% of the maintenance dose and wherein the GIP:GLP-1 Peptide has a receptor agonist potency ratio as measured after a 60 minute incubation using a casein cAMP assay normalized against GIP and GLP-1 that is about 2.5:1 to about 10:1 GIP to GLP-1.

Furthermore, the present invention provides a method of curing diabetes, inducing remission or regression of diabetes or preventing diabetes in a patient in need thereof, comprising: administering a titration dose of a GIP:GLP-1 Peptide for about two weeks and thereafter administering a maintenance dose of that GIP:GLP-1 Peptide wherein the titration dose is about 50% of the maintenance dose and wherein the GIP:GLP-1 Peptide has a receptor agonist potency ratio as measured after a 60 minute incubation using a casein cAMP assay normalized against GIP and GLP-1 that is about 2.5:1 to about 10:1 GIP to GLP-1.

A further embodiment of the present invention are the methods above wherein three titration doses (about 25%, about 50% and about 75% of the maintenance dose) are administered starting with the 25% dose and wherein each titration dose is administered for about two weeks before the administration of the next higher dose begins. A further embodiment of the present invention are the methods above wherein five titration doses (about 17%, about 33%, about 50%, about 66% and about 83% of the maintenance dose) are administered starting with the 17% dose and wherein each titration dose is administered for about two weeks before the administration of the next higher dose. A further embodiment of the present invention are the methods above where the titration dose or doses are administered for about four weeks before the administration of the next higher dose begins.

Another aspect of the present invention are methods described above for treating type 2 diabetes, improving glycemic control, improving weight management, treating chronic kidney disease, treating NAFLD, treating NASH and to cure diabetes, induce remission or regression of diabetes, or prevent diabetes wherein the GIP:GLP-1 Peptide has a GIP:GLP-1 receptor agonist potency ratio that is about 2.5:1 to about 5:1 as measured after a 60 minute incubation using a casein cAMP assay normalized against GIP and GLP-1. A further aspect of the present invention are methods described above for treating type 2 diabetes, improving glycemic control, improving weight management, treating chronic kidney disease, treating NAFLD, treating NASH or to cure diabetes, induce remission or regression of diabetes, or prevent diabetes wherein the GIP:GLP-1 Peptide has a GIP:GLP-1 receptor agonist potency ratio that is about 2.5:1 to about 3.5:1 as measured after a 60 minute incubation using a casein cAMP assay normalized against GIP and GLP-1.

A further aspect of the present invention are the methods described above for treating type 2 diabetes, improving glycemic control, improving weight management, treating chronic kidney disease, treating NAFLD, treating NASH or to cure diabetes, induce remission or regression of diabetes, or prevent diabetes wherein the GIP:GLP-1 Peptide is a compound of SEQ ID NO: 3, or a pharmaceutically acceptable salt thereof. Another aspect of the present invention are the methods described above for treating type 2 diabetes, improving glycemic control, improving weight management, treating chronic kidney disease, treating NAFLD, treating NASH or to cure diabetes, induce remission or regression of diabetes, or prevent diabetes wherein the GIP:GLP-1 Peptide is a compound of SEQ ID NO: 3, or a pharmaceutically acceptable salt thereof, and wherein the compound of SEQ ID NO: 3, or a pharmaceutically acceptable salt thereof, has a GIP:GLP-1 receptor agonist potency ratio that is about 2.5:1 to about 5:1 as measured after a 60 minute incubation using a casein cAMP assay normalized against GIP and GLP-1. Another aspect of the present invention are the methods described above for treating type 2 diabetes, improving glycemic control, improving weight management, treating chronic kidney disease, treating NAFLD, treating NASH or to cure diabetes, induce remission or regression of diabetes, or prevent diabetes wherein the GIP:GLP-1 Peptide is a compound of SEQ ID NO: 3, or a pharmaceutically acceptable salt thereof, and wherein the compound of SEQ ID NO: 3, or a pharmaceutically acceptable salt thereof, has a GIP:GLP-1 receptor agonist potency ratio that is about 2.5:1 to about 3.5:1 as measured after a 60 minute incubation using a casein cAMP assay normalized against GIP and GLP-1.

In an embodiment 1(a), the present invention provides a method of treating type 2 diabetes in a patient in need thereof, comprising:
  a) administering to said patient a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
  b) administering to said patient a maintenance dose of that GIP:GLP-1 Peptide;
wherein the titration dose is about 50% of the maintenance dose.

In embodiment 1 (b), the present invention provides a method of treating type 2 diabetes in a patient in need thereof, comprising:
  a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
  b) administering to said patient a second titration dose of that GIP:GLP-1 Peptide for a minimum of about two weeks; and thereafter
  c) administering to said patient a third titration dose of that GIP:GLP-1 Peptide for a minimum of about two weeks; and thereafter
  d) administering to said patient a maintenance dose of that GIP:GLP-1 Peptide;
wherein the first titration dose is about 25% of the maintenance dose, the second titration dose is about 50% of the maintenance dose and the third titration dose is about 75% of the maintenance dose.

In embodiment 1 (c), the present invention provides a method of treating type 2 diabetes in a patient in need thereof, comprising:
  a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
  b) administering to said patient a second titration dose of that GIP:GLP-1 Peptide for a minimum of about two weeks; and thereafter
  c) administering to said patient a third titration dose of that GIP:GLP-1 Peptide for a minimum of about two weeks; and thereafter
  d) administering to said patient a fourth titration dose of that GIP:GLP-1 Peptide for a minimum of about two weeks; and thereafter
  e) administering to said patient a fifth titration dose of that GIP:GLP-1 Peptide for a minimum of about two weeks; and thereafter
  f) administering to said patient a maintenance dose of that GIP:GLP-1 Peptide;
wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 1 (a1), the present invention provides a method of treating type 2 diabetes in a patient in need thereof, comprising:
  a) subcutaneously administering to said patient a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 about once weekly for a minimum of about two weeks; and thereafter
  b) administering to said patient a maintenance dose of that GIP:GLP-1 Peptide;
wherein the titration dose is about 50% of the maintenance dose.

In embodiment 1 (b1), the present invention provides a method of treating type 2 diabetes in a patient in need thereof, comprising:
  a) subcutaneously administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 about once weekly for a minimum of about two weeks; and thereafter b) subcutaneously administering to said patient a second titration dose of that GIP:GLP-1 Peptide about once weekly for a minimum of about two weeks; and thereafter c) subcutaneously administering to said patient a third titration dose of that GIP:GLP-1 Peptide about once weekly for a minimum of about two weeks, and thereafter subcutaneously administering to said patient a maintenance dose of that GIP:GLP-1 Peptide;

wherein the first titration dose is about 25% of the maintenance dose, the second titration dose is about 50% of the maintenance dose and the third titration dose is about 75% of the maintenance dose.

In embodiment 1(c1), the present invention provides a method of treating type 2 diabetes in a patient in need thereof, comprising:

a) subcutaneously administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 about once weekly for a minimum of about two weeks; and thereafter b) subcutaneously administering to said patient a second titration dose of that GIP:GLP-1 Peptide about once weekly for a minimum of about two weeks; and thereafter c) subcutaneously administering to said patient a third titration dose of that GIP:GLP-1 Peptide about once weekly for a minimum of about two weeks; and thereafter d) subcutaneously administering to said patient a fourth titration dose of that GIP:GLP-1 Peptide about once weekly for a minimum of about two weeks; and thereafter e) subcutaneously administering to said patient a fifth titration dose of that GIP:GLP-1 Peptide about once weekly for a minimum of about two weeks; and thereafter f) subcutaneously administering to said patient a maintenance dose of that GIP:GLP-1 Peptide;

wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 2(a), the present invention provides a method of improving glycemic control in a patient in need thereof, comprising:

a) administering to said patient a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter b) administering to said patient a maintenance dose of that GIP:GLP-1 Peptide;

wherein the titration dose is about 50% of the maintenance dose.

In an embodiment 2(a), the present invention provides a method of improving glycemic control in a patient in need thereof, comprising:

a) administering to said patient a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter b) administering to said patient a maintenance dose of that GIP:GLP-1 Peptide;

wherein the titration dose is about 50% of the maintenance dose.

In embodiment 2 (b), the present invention provides a method of improving glycemic control in a patient in need thereof, comprising:

a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter b) administering to said patient a second titration dose of that GIP:GLP-1 Peptide for a minimum of about two weeks; and thereafter c) administering to said patient a third titration dose of that GIP:GLP-1 Peptide for a minimum of about two weeks; and thereafter d) administering to said patient a maintenance dose of that GIP:GLP-1 Peptide;

wherein the first titration dose is about 25% of the maintenance dose, the second titration dose is about 50% of the maintenance dose and the third titration dose is about 75% of the maintenance dose.

In embodiment 2 (c), the present invention provides a method of improving glycemic control in a patient in need thereof, comprising:

a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter b) administering to said patient a second titration dose of that GIP:GLP-1 Peptide for a minimum of about two weeks; and thereafter c) administering to said patient a third titration dose of that GIP:GLP-1 Peptide for a minimum of about two weeks; and thereafter d) administering to said patient a fourth titration dose of that GIP:GLP-1 Peptide for a minimum of about two weeks; and thereafter e) administering to said patient a fifth titration dose of that GIP:GLP-1 Peptide for a minimum of about two weeks; and thereafter f) administering to said patient a maintenance dose of that GIP:GLP-1 Peptide;

wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 3(a), the present invention provides a method of improving weight management in a patient in need thereof, comprising:

a) administering to said patient a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter b) administering to said patient a maintenance dose of that GIP:GLP-1 Peptide;

wherein the titration dose is about 50% of the maintenance dose.

In embodiment 3 (b), the present invention provides a method of improving weight management in a patient in need thereof, comprising:
 a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
 b) administering to said patient a second titration dose of that GIP:GLP-1 Peptide for a minimum of about two weeks; and thereafter
 c) administering to said patient a third titration dose of that GIP:GLP-1 Peptide for a minimum of about two weeks; and thereafter
 d) administering to said patient a maintenance dose of that GIP:GLP-1 Peptide;

wherein the first titration dose is about 25% of the maintenance dose, the second titration dose is about 50% of the maintenance dose and the third titration dose is about 75% of the maintenance dose.

In embodiment 3 (c), the present invention provides a method of improving weight management in a patient in need thereof, comprising:
 a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
 b) administering to said patient a second titration dose of that GIP:GLP-1 Peptide for a minimum of about two weeks; and thereafter
 c) administering to said patient a third titration dose of that GIP:GLP-1 Peptide for a minimum of about two weeks; and thereafter
 d) administering to said patient a fourth titration dose of that GIP:GLP-1 Peptide for a minimum of about two weeks; and thereafter
 e) administering to said patient a fifth titration dose of that GIP:GLP-1 Peptide for a minimum of about two weeks; and thereafter
 f) administering to said patient a maintenance dose of that GIP:GLP-1 Peptide;

wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 4(a), the present invention provides a method of treating chronic kidney disease in a patient in need thereof, comprising:
 a) administering to said patient a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
 b) administering to said patient a maintenance dose of that GIP:GLP-1 Peptide;

wherein the titration dose is about 50% of the maintenance dose.

In embodiment 4 (b), the present invention provides a method of treating chronic kidney disease in a patient in need thereof, comprising:
 a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
 b) administering to said patient a second titration dose of that GIP:GLP-1 Peptide for a minimum of about two weeks; and thereafter
 c) administering to said patient a third titration dose of that GIP:GLP-1 Peptide for a minimum of about two weeks; and thereafter
 d) administering to said patient a maintenance dose of that GIP:GLP-1 Peptide;

wherein the first titration dose is about 25% of the maintenance dose, the second titration dose is about 50% of the maintenance dose and the third titration dose is about 75% of the maintenance dose.

In embodiment 4 (c), the present invention provides a method of treating chronic kidney disease in a patient in need thereof, comprising:
 a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
 b) administering to said patient a second titration dose of that GIP:GLP-1 Peptide for a minimum of about two weeks; and thereafter
 c) administering to said patient a third titration dose of that GIP:GLP-1 Peptide for a minimum of about two weeks; and thereafter
 d) administering to said patient a fourth titration dose of that GIP:GLP-1 Peptide for a minimum of about two weeks; and thereafter
 e) administering to said patient a fifth titration dose of that GIP:GLP-1 Peptide for a minimum of about two weeks; and thereafter
 f) administering to said patient a maintenance dose of that GIP:GLP-1 Peptide;

wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 5(a), the present invention provides a method of treating NAFLD in a patient in need thereof, comprising:
 a) administering to said patient a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
 b) administering to said patient a maintenance dose of that GIP:GLP-1 Peptide;

wherein the titration dose is about 50% of the maintenance dose.

In embodiment 5 (b), the present invention provides a method of treating NAFLD in a patient in need thereof, comprising:

a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a second titration dose of that GIP:GLP-1 Peptide for a minimum of about two weeks; and thereafter
c) administering to said patient a third titration dose of that GIP:GLP-1 Peptide for a minimum of about two weeks; and thereafter
d) administering to said patient a maintenance dose of that GIP:GLP-1 Peptide; wherein the first titration dose is about 25% of the maintenance dose, the second titration dose is about 50% of the maintenance dose and the third titration dose is about 75% of the maintenance dose.

In embodiment 5 (c), the present invention provides a method of treating NAFLD in a patient in need thereof, comprising:
a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a second titration dose of that GIP:GLP-1 Peptide for a minimum of about two weeks; and thereafter
c) administering to said patient a third titration dose of that GIP:GLP-1 Peptide for a minimum of about two weeks; and thereafter
d) administering to said patient a fourth titration dose of that GIP:GLP-1 Peptide for a minimum of about two weeks; and thereafter
e) administering to said patient a fifth titration dose of that GIP:GLP-1 Peptide for a minimum of about two weeks; and thereafter
f) administering to said patient a maintenance dose of that GIP:GLP-1 Peptide;
wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 6(a), the present invention provides a method of treating NASH in a patient in need thereof, comprising:
a) administering to said patient a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a maintenance dose of that GIP:GLP-1 Peptide;
wherein the titration dose is about 50% of the maintenance dose.

In embodiment 6 (b), the present invention provides a method of treating NASH in a patient in need thereof, comprising:
a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a second titration dose of that GIP:GLP-1 Peptide for a minimum of about two weeks; and thereafter
c) administering to said patient a third titration dose of that GIP:GLP-1 Peptide for a minimum of about two weeks; and thereafter
d) administering to said patient a maintenance dose of that GIP:GLP-1 Peptide;
wherein the first titration dose is about 25% of the maintenance dose, the second titration dose is about 50% of the maintenance dose and the third titration dose is about 75% of the maintenance dose.

In embodiment 6 (c), the present invention provides a method of treating NASH in a patient in need thereof, comprising:
a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a second titration dose of that GIP:GLP-1 Peptide for a minimum of about two weeks; and thereafter
c) administering to said patient a third titration dose of that GIP:GLP-1 Peptide for a minimum of about two weeks; and thereafter
d) administering to said patient a fourth titration dose of that GIP:GLP-1 Peptide for a minimum of about two weeks; and thereafter
e) administering to said patient a fifth titration dose of that GIP:GLP-1 Peptide for a minimum of about two weeks; and thereafter
f) administering to said patient a maintenance dose of that GIP:GLP-1 Peptide; wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 7(a), the present invention provides a method of curing diabetes, inducing remission or regression of diabetes, or preventing diabetes in a patient in need thereof, comprising: to cure diabetes, induce remission or regression of diabetes, or prevent diabetes
a) administering to said patient a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a maintenance dose of that GIP:GLP-1 Peptide;
wherein the titration dose is about 50% of the maintenance dose.

In embodiment 7 (b), the present invention provides a method of curing diabetes, inducing remission or regression of diabetes, or preventing diabetes in a patient in need thereof, comprising:
a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a second titration dose of that GIP:GLP-1 Peptide for a minimum of about two weeks; and thereafter
c) administering to said patient a third titration dose of that GIP:GLP-1 Peptide for a minimum of about two weeks; and thereafter
d) administering to said patient a maintenance dose of that GIP:GLP-1 Peptide;

wherein the first titration dose is about 25% of the maintenance dose, the second titration dose is about 50% of the maintenance dose and the third titration dose is about 75% of the maintenance dose.

In embodiment 7 (c), the present invention provides a method of curing diabetes, inducing remission or regression of diabetes, or preventing diabetes in a patient in need thereof, comprising:
a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a second titration dose of that GIP:GLP-1 Peptide for a minimum of about two weeks; and thereafter
c) administering to said patient a third titration dose of that GIP:GLP-1 Peptide for a minimum of about two weeks; and thereafter
d) administering to said patient a fourth titration dose of that GIP:GLP-1 Peptide for a minimum of about two weeks; and thereafter
e) administering to said patient a fifth titration dose of that GIP:GLP-1 Peptide for a minimum of about two weeks; and thereafter
f) administering to said patient a maintenance dose of that GIP:GLP-1 Peptide;

wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In embodiment 8, the titration doses of embodiments 1(a)-(c), 2(a)-(c), 3(a)-(c), 4(a)-(c), 5(a)-(c), 6(a)-(c) or 7(a)-(c) are each administered for about four weeks before the administration of the next higher dose begins. Thus, for example, the present invention provides in embodiment 1 (d) a method of treating type 2 diabetes in a patient in need thereof, comprising:
a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for about four weeks; and thereafter
b) administering to said patient a maintenance dose of that GIP:GLP-1 Peptide;

wherein the titration dose is about 50% of the maintenance dose.

The present invention thus further provides in embodiment 1 (e), a method of treating type 2 diabetes in a patient in need thereof, comprising:
a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for about four weeks; and thereafter
b) administering to said patient a second titration dose of that GIP:GLP-1 Peptide for about four weeks; and thereafter
c) administering to said patient a third titration dose of that GIP:GLP-1 Peptide for about four weeks; and thereafter
d) administering to said patient a maintenance dose of that GIP:GLP-1 Peptide;

wherein the first titration dose is about 25% of the maintenance dose, the second titration dose is about 50% of the maintenance dose and the third titration dose is about 75% of the maintenance dose.

The present invention thus further provides in embodiment 1 (f), a method of treating type 2 diabetes in a patient in need thereof, comprising:
a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for about four weeks; and thereafter
b) administering to said patient a second titration dose of that GIP:GLP-1 Peptide for about four weeks; and thereafter
c) administering to said patient a third titration dose of that GIP:GLP-1 Peptide for about four weeks; and thereafter
d) administering to said patient a fourth titration dose of that GIP:GLP-1 Peptide for about four weeks; and thereafter
e) administering to said patient a fifth titration dose of that GIP:GLP-1 Peptide for about four weeks; and thereafter
f) administering to said patient a maintenance dose of that GIP:GLP-1 Peptide;

wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In embodiment 9, the GIP:GLP-1 Peptide of embodiments 1(a)-(c), 2(a)-(c), 3(a)-(c), 4(a)-(c), 5(a)-(c), 6(a)-(c), 7(a)-(c) or 8 is a compound of SEQ ID NO: 3, or a pharmaceutically acceptable salt thereof. Thus, for example, the present invention provides in embodiment 1 (g) a method of treating type 2 diabetes in a patient in need thereof, comprising:
a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 wherein the GIP:GLP-1 Peptide is a compound of SEQ ID NO: 3 for about four weeks; and thereafter
b) administering to said patient a maintenance dose of that GIP:GLP-1 Peptide;

wherein the titration dose is about 50% of the maintenance dose.

The present invention thus further provides in embodiment 1 (h), a method of treating type 2 diabetes in a patient in need thereof, comprising:
a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 wherein the GIP:GLP-1 Peptide is a compound of SEQ ID NO: 3 for about four weeks; and thereafter b) administering to said patient a second titration dose of that GIP:GLP-1 Peptide for about four weeks; and thereafter c) administering to said patient a third titration dose of that GIP:GLP-1 Peptide for about four weeks; and thereafter d) administering to said patient a maintenance dose of that GIP:GLP-1 Peptide;

wherein the first titration dose is about 25% of the maintenance dose, the second titration dose is about 50% of the maintenance dose and the third titration dose is about 75% of the maintenance dose.

The present invention thus further provides in embodiment 1 (i), a method of treating type 2 diabetes in a patient in need thereof, comprising:

a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 wherein the GIP:GLP-1 Peptide is a compound of SEQ ID NO: 3 for about four weeks; and thereafter b) administering to said patient a second titration dose of that GIP:GLP-1 Peptide for about four weeks; and thereafter c) administering to said patient a third titration dose of that GIP:GLP-1 Peptide for about four weeks; and thereafter d) administering to said patient a fourth titration dose of that GIP:GLP-1 Peptide for about four weeks; and thereafter e) administering to said patient a fifth titration dose of that GIP:GLP-1 Peptide for about four weeks; and thereafter f) administering to said patient a maintenance dose of that GIP:GLP-1 Peptide;

wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In embodiment 10, the GIP:GLP-1 Peptide of embodiments 1(a)-(c), 2(a)-(c), 3(a)-(c), 4(a)-(c), 5(a)-(c), 6(a)-(c), 7(a)-(c), 8 or 9 has a receptor agonist potency ratio that is 2.5:1 to about 5:1 GIP to GLP-1.

In embodiment 11, the GIP:GLP-1 Peptide of embodiments 1(a)-(c), 2(a)-(c), 3(a)-(c), 4(a)-(c), 5(a)-(c), 6(a)-(c), 7(a)-(c), 8, 9 or 10 has a receptor agonist potency ratio that is 2.5:1 to about 3.5:1 GIP to GLP-1.

In an embodiment 12(a), the present invention provides the use of a GIP:GLP-1 Peptide, or a pharmaceutically acceptable salt thereof, in the manufacture of a medicament for treating type 2 diabetes in a patient in need thereof, comprising:

a administering to said patient a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter b) administering to said patient a maintenance dose of that GIP:GLP-1 Peptide;

wherein the titration dose is about 50% of the maintenance dose.

In an embodiment 12 (b), the present invention provides the use of a GIP:GLP-1 Peptide, or a pharmaceutically acceptable salt thereof, in the manufacture of a medicament for treating type 2 diabetes in a patient in need thereof, comprising:

a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter b) administering to said patient a second titration dose of that GIP:GLP-1 Peptide for a minimum of about two weeks; and thereafter c) administering to said patient a third titration dose of that GIP:GLP-1 Peptide for a minimum of about two weeks; and thereafter d) administering to said patient a maintenance dose of that GIP:GLP-1 Peptide;

wherein the first titration dose is about 25% of the maintenance dose, the second titration dose is about 50% of the maintenance dose and the third titration dose is about 75% of the maintenance dose.

In an embodiment 12 (c), the present invention provides the use of a GIP:GLP-1 Peptide, or a pharmaceutically acceptable salt thereof, in the manufacture of a medicament for treating type 2 diabetes in a patient in need thereof, comprising:

a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter b) administering to said patient a second titration dose of that GIP:GLP-1 Peptide for a minimum of about two weeks; and thereafter c) administering to said patient a third titration dose of that GIP:GLP-1 Peptide for a minimum of about two weeks; and thereafter d) administering to said patient a fourth titration dose of that GIP:GLP-1 Peptide for a minimum of about two weeks; and thereafter e) administering to said patient a fifth titration dose of that GIP:GLP-1 Peptide for a minimum of about two weeks; and thereafter f) administering to said patient a maintenance dose of that GIP:GLP-1 Peptide;

wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 13(a), the present invention provides the use of a GIP:GLP-1 Peptide, or a pharmaceutically acceptable salt thereof, in the manufacture of a medicament for improving glycemic control in a patient in need thereof, comprising:

a) administering to said patient a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter b) administering to said patient a maintenance dose of that GIP:GLP-1 Peptide;

wherein the titration dose is about 50% of the maintenance dose.

In an embodiment 13 (b), the present invention provides the use of a GIP:GLP-1 Peptide, or a pharmaceutically acceptable salt thereof, in the manufacture of a medicament for improving glycemic control in a patient in need thereof, comprising:

a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter b) administering to said patient a second titration dose of that GIP:GLP-1 Peptide for a minimum of about two weeks; and thereafter c) administering to said patient a third titration dose of that GIP:GLP-1 Peptide for a minimum of about two weeks; and thereafter d) administering to said patient a maintenance dose of that GIP:GLP-1 Peptide;

wherein the first titration dose is about 25% of the maintenance dose, the second titration dose is about 50% of the maintenance dose and the third titration dose is about 75% of the maintenance dose.

In an embodiment 13 (c), the present invention provides the use of a GIP:GLP-1 Peptide, or a pharmaceutically acceptable salt thereof, in the manufacture of a medicament for improving glycemic control in a patient in need thereof, comprising:

a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks, and thereafter b) administering to said patient a second titration dose of that GIP:GLP-1 Peptide for a minimum of about two weeks; and thereafter c) administering to said patient a third titration dose of that GIP:GLP-1 Peptide for a minimum of about two weeks; and thereafter d) administering to said patient a fourth titration dose of that GIP:GLP-1 Peptide for a minimum of about two weeks; and thereafter e) administering to said patient a fifth titration dose of that GIP:GLP-1 Peptide for a minimum of about two weeks; and thereafter f) administering to said patient a maintenance dose of that GIP:GLP-1 Peptide;

wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 14(a), the present invention provides the use of a GIP:GLP-1 Peptide, or a pharmaceutically acceptable salt thereof, in the manufacture of a medicament for improving weight management in a patient in need thereof, comprising:

a) administering to said patient a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter b) administering to said patient a maintenance dose of that GIP:GLP-1 Peptide;

wherein the titration dose is about 50% of the maintenance dose.

In an embodiment 14 (b), the present invention provides the use of a GIP:GLP-1 Peptide, or a pharmaceutically acceptable salt thereof, in the manufacture of a medicament for improving weight management in a patient in need thereof, comprising:

a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter b) administering to said patient a second titration dose of that GIP:GLP-1 Peptide for a minimum of about two weeks; and thereafter c) administering to said patient a third titration dose of that GIP:GLP-1 Peptide for a minimum of about two weeks; and thereafter d) administering to said patient a maintenance dose of that GIP:GLP-1 Peptide;

wherein the first titration dose is about 25% of the maintenance dose, the second titration dose is about 50% of the maintenance dose and the third titration dose is about 75% of the maintenance dose.

In an embodiment 14 (c), the present invention provides the use of a GIP:GLP-1 Peptide, or a pharmaceutically acceptable salt thereof, in the manufacture of a medicament for improving weight management in a patient in need thereof, comprising:

a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter b) administering to said patient a second titration dose of that GIP:GLP-1 Peptide for a minimum of about two weeks; and thereafter c) administering to said patient a third titration dose of that GIP:GLP-1 Peptide for a minimum of about two weeks; and thereafter d) administering to said patient a fourth titration dose of that GIP:GLP-1 Peptide for a minimum of about two weeks; and thereafter e) administering to said patient a fifth titration dose of that GIP:GLP-1 Peptide for a minimum of about two weeks; and thereafter f) administering to said patient a maintenance dose of that GIP:GLP-1 Peptide;

wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 15(a), the present invention provides the use of a GIP:GLP-1 Peptide, or a pharmaceutically acceptable salt thereof, in the manufacture of a medicament for treating chronic kidney disease in a patient in need thereof, comprising:

a) administering to said patient a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a maintenance dose of that GIP:GLP-1 Peptide;
wherein the titration dose is about 50% of the maintenance dose.

In an embodiment 15 (b), the present invention provides the use of a GIP:GLP-1 Peptide, or a pharmaceutically acceptable salt thereof, in the manufacture of a medicament for treating chronic kidney disease in a patient in need thereof, comprising:
a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a second titration dose of that GIP:GLP-1 Peptide for a minimum of about two weeks; and thereafter
c) administering to said patient a third titration dose of that GIP:GLP-1 Peptide for a minimum of about two weeks; and thereafter
d) administering to said patient a maintenance dose of that GIP:GLP-1 Peptide;
wherein the first titration dose is about 25% of the maintenance dose, the second titration dose is about 50% of the maintenance dose and the third titration dose is about 75% of the maintenance dose.

In an embodiment 15 (c), the present invention provides the use of a GIP:GLP-1 Peptide, or a pharmaceutically acceptable salt thereof, in the manufacture of a medicament for treating chronic kidney disease in a patient in need thereof, comprising:
a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a second titration dose of that GIP:GLP-1 Peptide for a minimum of about two weeks; and thereafter
c) administering to said patient a third titration dose of that GIP:GLP-1 Peptide for a minimum of about two weeks; and thereafter
d) administering to said patient a fourth titration dose of that GIP:GLP-1 Peptide for a minimum of about two weeks; and thereafter
e) administering to said patient a fifth titration dose of that GIP:GLP-1 Peptide for a minimum of about two weeks; and thereafter
f) administering to said patient a maintenance dose of that GIP:GLP-1 Peptide;
wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 16(a), the present invention provides the use of a GIP:GLP-1 Peptide, or a pharmaceutically acceptable salt thereof, in the manufacture of a medicament for treating NAFLD in a patient in need thereof, comprising:
a) administering to said patient a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a maintenance dose of that GIP:GLP-1 Peptide;
wherein the titration dose is about 50% of the maintenance dose.

In an embodiment 16 (b), the present invention provides the use of a GIP:GLP-1 Peptide, or a pharmaceutically acceptable salt thereof, in the manufacture of a medicament for treating NAFLD in a patient in need thereof, comprising:
a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a second titration dose of that GIP:GLP-1 Peptide for a minimum of about two weeks; and thereafter
c) administering to said patient a third titration dose of that GIP:GLP-1 Peptide for a minimum of about two weeks; and thereafter
d) administering to said patient a maintenance dose of that GIP:GLP-1 Peptide;
wherein the first titration dose is about 25% of the maintenance dose, the second titration dose is about 50% of the maintenance dose and the third titration dose is about 75% of the maintenance dose.

In an embodiment 16 (c), the present invention provides the use of a GIP:GLP-1 Peptide, or a pharmaceutically acceptable salt thereof, in the manufacture of a medicament for treating NAFLD in a patient in need thereof, comprising:
a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a second titration dose of that GIP:GLP-1 Peptide for a minimum of about two weeks; and thereafter
c) administering to said patient a third titration dose of that GIP:GLP-1 Peptide for a minimum of about two weeks; and thereafter
d) administering to said patient a fourth titration dose of that GIP:GLP-1 Peptide for a minimum of about two weeks; and thereafter
e) administering to said patient a fifth titration dose of that GIP:GLP-1 Peptide for a minimum of about two weeks; and thereafter
f) administering to said patient a maintenance dose of that GIP:GLP-1 Peptide;
wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 17(a), the present invention provides the use of a GIP:GLP-1 Peptide, or a pharmaceutically acceptable salt thereof, in the manufacture of a medicament for treating NASH in a patient in need thereof, comprising:
a) administering to said patient a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a maintenance dose of that GIP:GLP-1 Peptide;
wherein the titration dose is about 50% of the maintenance dose.

In an embodiment 17 (b), the present invention provides the use of a GIP:GLP-1 Peptide, or a pharmaceutically acceptable salt thereof, in the manufacture of a medicament for treating NASH in a patient in need thereof, comprising:
a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a second titration dose of that GIP:GLP-1 Peptide for a minimum of about two weeks; and thereafter
c) administering to said patient a third titration dose of that GIP:GLP-1 Peptide for a minimum of about two weeks; and thereafter
d) administering to said patient a maintenance dose of that GIP:GLP-1 Peptide,
wherein the first titration dose is about 25% of the maintenance dose, the second titration dose is about 50% of the maintenance dose and the third titration dose is about 75% of the maintenance dose.

In an embodiment 17 (c), the present invention provides the use of a GIP:GLP-1 Peptide, or a pharmaceutically acceptable salt thereof, in the manufacture of a medicament for treating NASH in a patient in need thereof, comprising:
a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a second titration dose of that GIP:GLP-1 Peptide for a minimum of about two weeks; and thereafter
c) administering to said patient a third titration dose of that GIP:GLP-1 Peptide for a minimum of about two weeks; and thereafter
d) administering to said patient a fourth titration dose of that GIP:GLP-1 Peptide for a minimum of about two weeks; and thereafter
e) administering to said patient a fifth titration dose of that GIP:GLP-1 Peptide for a minimum of about two weeks; and thereafter
f) administering to said patient a maintenance dose of that GIP:GLP-1 Peptide;
wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 18(a), the present invention provides the use of a GIP:GLP-1 Peptide, or a pharmaceutically acceptable salt thereof, in the manufacture of a medicament for inducing remission or regression of diabetes, or preventing diabetes in a patient in need thereof, comprising:
a) administering to said patient a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a maintenance dose of that GIP:GLP-1 Peptide;
wherein the titration dose is about 50% of the maintenance dose.

In an embodiment 18 (b), the present invention provides the use of a GIP:GLP-1 Peptide, or a pharmaceutically acceptable salt thereof, in the manufacture of a medicament for inducing remission or regression of diabetes, or preventing diabetes in a patient in need thereof, comprising:
a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a second titration dose of that GIP:GLP-1 Peptide for a minimum of about two weeks; and thereafter
c) administering to said patient a third titration dose of that GIP:GLP-1 Peptide for a minimum of about two weeks; and thereafter
d) administering to said patient a maintenance dose of that GIP:GLP-1 Peptide;
wherein the first titration dose is about 25% of the maintenance dose, the second titration dose is about 50% of the maintenance dose and the third titration dose is about 75% of the maintenance dose.

In an embodiment 18 (c), the present invention provides the use of a GIP:GLP-1 Peptide, or a pharmaceutically acceptable salt thereof, in the manufacture of a medicament for inducing remission or regression of diabetes, or preventing diabetes in a patient in need thereof, comprising:
a) administering to said patient a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administering to said patient a second titration dose of that GIP:GLP-1 Peptide for a minimum of about two weeks; and thereafter
c) administering to said patient a third titration dose of that GIP:GLP-1 Peptide for a minimum of about two weeks; and thereafter
d) administering to said patient a fourth titration dose of that GIP:GLP-1 Peptide for a minimum of about two weeks; and thereafter
e) administering to said patient a fifth titration dose of that GIP:GLP-1 Peptide for a minimum of about two weeks; and thereafter
f) administering to said patient a maintenance dose of that GIP:GLP-1 Peptide;
wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In embodiment 19, the titration doses of any of embodiments 12(a)-(c), 13(a)-(c), 14(a)-(c), 15(a)-(c), 16(a)-(c), 17(a)-(c), or 18(a)-(c) are each administered for about four weeks before the administration of the next higher dose begins.

In embodiment 20, the GIP:GLP-1 Peptide of any of embodiments 12(a)-(c), 13(a)-(c), 14(a)-(c), 15(a)-(c), 16(a)-(c), 17(a)-(c), 18(a)-(c), or 19 is a peptide of SEQ ID NO: 3, or a pharmaceutically acceptable salt thereof.

In embodiment 21, the GIP:GLP-1 Peptide of any of embodiments 12(a)-(c), 13(a)-(c), 14(a)-(c), 15(a)-(c), 16(a)-(c), 17(a)-(c), 18(a)-(c), 19 or 20 has a receptor agonist potency ratio that is 2.5:1 to about 5:1 GIP to GLP-1.

In embodiment 22, the GIP:GLP-1 Peptide of any of embodiments 12(a)-(c), 13(a)-(c), 14(a)-(c), 15(a)-(c), 16(a)-(c), 17(a)-(c), 18(a)-(c), 19, or 20 has a receptor agonist potency ratio that is 2.5:1 to about 3.5:1 GIP to GLP-1.

In an embodiment 23(a), the present invention provides a GIP:GLP-1 Peptide, or a pharmaceutically acceptable salt thereof, for use in treating type 2 diabetes in a patient in need thereof wherein the use comprises:
 a) administration of a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
 b) administration of a maintenance dose of that GIP:GLP-1 Peptide;
 wherein the titration dose is about 50% of the maintenance dose.

In an embodiment 23 (b), the present invention provides a GIP:GLP-1 Peptide, or a pharmaceutically acceptable salt thereof, for use in treating type 2 diabetes in a patient in need thereof wherein the use comprises:
 a) administration of a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
 b) administration of a second titration dose of that GIP:GLP-1 Peptide for a minimum of about two weeks; and thereafter
 c) administration of a third titration dose of that GIP:GLP-1 Peptide for a minimum of about two weeks; and thereafter
 d) administration of a maintenance dose of that GIP:GLP-1 Peptide;
 wherein the first titration dose is about 25% of the maintenance dose, the second titration dose is about 50% of the maintenance dose and the third titration dose is about 75% of the maintenance dose.

In an embodiment 23 (c), the present invention provides a GIP:GLP-1 Peptide, or a pharmaceutically acceptable salt thereof, for use in treating type 2 diabetes in a patient in need thereof wherein the use comprises:
 a) administration of a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
 b) administration of a second titration dose of that GIP:GLP-1 Peptide for a minimum of about two weeks, and thereafter
 c) administration of a third titration dose of that GIP:GLP-1 Peptide for a minimum of about two weeks; and thereafter
 d) administration of a fourth titration dose of that GIP:GLP-1 Peptide for a minimum of about two weeks; and thereafter
 e) administration of a fifth titration dose of that GIP:GLP-1 Peptide for a minimum of about two weeks; and thereafter
 f) administration of a maintenance dose of that GIP:GLP-1 Peptide;
 wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 24(a), the present invention provides a GIP:GLP-1 Peptide, or a pharmaceutically acceptable salt thereof, for use in improving glycemic control in a patient in need thereof wherein the use comprises:
 a) administration of a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
 b) administration of a maintenance dose of that GIP:GLP-1 Peptide;
 wherein the titration dose is about 50% of the maintenance dose.

In an embodiment 24 (b), the present invention provides a GIP:GLP-1 Peptide, or a pharmaceutically acceptable salt thereof, for use in improving glycemic control in a patient in need thereof wherein the use comprises:
 a) administration of a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
 b) administration of a second titration dose of that GIP:GLP-1 Peptide for a minimum of about two weeks; and thereafter
 c) administration of a third titration dose of that GIP:GLP-1 Peptide for a minimum of about two weeks; and thereafter
 d) administration of a maintenance dose of that GIP:GLP-1 Peptide;
 wherein the first titration dose is about 25% of the maintenance dose, the second titration dose is about 50% of the maintenance dose and the third titration dose is about 75% of the maintenance dose.

In an embodiment 24 (c), the present invention provides a GIP:GLP-1 Peptide, or a pharmaceutically acceptable salt thereof, for use in improving glycemic control in a patient in need thereof wherein the use comprises:
 a) administration of a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
 b) administration of a second titration dose of that GIP:GLP-1 Peptide for a minimum of about two weeks; and thereafter c) administration of a third titration dose of that GIP:GLP-1 Peptide for a minimum of about two weeks; and thereafter
d) administration of a fourth titration dose of that GIP:GLP-1 Peptide for a minimum of about two weeks; and thereafter
e) administration of a fifth titration dose of that GIP:GLP-1 Peptide for a minimum of about two weeks; and thereafter
f) administration of a maintenance dose of that GIP:GLP-1 Peptide;

wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 25(a), the present invention provides a GIP:GLP-1 Peptide, or a pharmaceutically acceptable salt thereof, for use in improving weight management in a patient in need thereof wherein the use comprises:
a) administration of a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administration of a maintenance dose of that GIP:GLP-1 Peptide;
wherein the titration dose is about 50% of the maintenance dose.

In an embodiment 25 (b), the present invention provides a GIP:GLP-1 Peptide, or a pharmaceutically acceptable salt thereof, for use in improving weight management in a patient in need thereof wherein the use comprises:
a) administration of a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administration of a second titration dose of that GIP:GLP-1 Peptide for a minimum of about two weeks; and thereafter
c) administration of a third titration dose of that GIP:GLP-1 Peptide for a minimum of about two weeks; and thereafter
d) administration of a maintenance dose of that GIP:GLP-1 Peptide;
wherein the first titration dose is about 25% of the maintenance dose, the second titration dose is about 50% of the maintenance dose and the third titration dose is about 75% of the maintenance dose.

In an embodiment 25 (c), the present invention provides a GIP:GLP-1 Peptide, or a pharmaceutically acceptable salt thereof, for use in improving weight management in a patient in need thereof wherein the use comprises:
a) administration of a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administration of a second titration dose of that GIP:GLP-1 Peptide for a minimum of about two weeks; and thereafter c) administration of a third titration dose of that GIP:GLP-1 Peptide for a minimum of about two weeks; and thereafter
d) administration of a fourth titration dose of that GIP:GLP-1 Peptide for a minimum of about two weeks; and thereafter
e) administration of a fifth titration dose of that GIP:GLP-1 Peptide for a minimum of about two weeks; and thereafter
f) administration of a maintenance dose of that GIP:GLP-1 Peptide;
wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 26(a), the present invention provides a GIP:GLP-1 Peptide, or a pharmaceutically acceptable salt thereof, for use in treating chronic kidney disease in a patient in need thereof wherein the use comprises:
a) administration of a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administration of a maintenance dose of that GIP:GLP-1 Peptide;
wherein the titration dose is about 50% of the maintenance dose.

In an embodiment 26 (b), the present invention provides a GIP:GLP-1 Peptide, or a pharmaceutically acceptable salt thereof, for use in treating chronic kidney disease in a patient in need thereof wherein the use comprises:
a) administration of a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administration of a second titration dose of that GIP:GLP-1 Peptide for a minimum of about two weeks; and thereafter
c) administration of a third titration dose of that GIP:GLP-1 Peptide for a minimum of about two weeks; and thereafter
d) administration of a maintenance dose of that GIP:GLP-1 Peptide;
wherein the first titration dose is about 25% of the maintenance dose, the second titration dose is about 50% of the maintenance dose and the third titration dose is about 75% of the maintenance dose.

In an embodiment 26 (c), the present invention provides a GIP:GLP-1 Peptide, or a pharmaceutically acceptable salt thereof, for use in treating chronic kidney disease in a patient in need thereof wherein the use comprises:
a) administration of a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administration of a second titration dose of that GIP:GLP-1 Peptide for a minimum of about two weeks; and thereafter c) administration of a third titration dose of that GIP:GLP-1 Peptide for a minimum of about two weeks, and thereafter
d) administration of a fourth titration dose of that GIP:GLP-1 Peptide for a minimum of about two weeks; and thereafter
e) administration of a fifth titration dose of that GIP:GLP-1 Peptide for a minimum of about two weeks; and thereafter
f) administration of a maintenance dose of that GIP:GLP-1 Peptide;

wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 27(a), the present invention provides a GIP:GLP-1 Peptide, or a pharmaceutically acceptable salt thereof, for use in treating NAFLD in a patient in need thereof wherein the use comprises:
a) administration of a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administration of a maintenance dose of that GIP:GLP-1 Peptide;

wherein the titration dose is about 50% of the maintenance dose.

In an embodiment 27 (b), the present invention provides a GIP:GLP-1 Peptide, or a pharmaceutically acceptable salt thereof, for use in treating NAFLD in a patient in need thereof wherein the use comprises:
a) administration of a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administration of a second titration dose of that GIP:GLP-1 Peptide for a minimum of about two weeks; and thereafter
c) administration of a third titration dose of that GIP:GLP-1 Peptide for a minimum of about two weeks; and thereafter
d) administration of a maintenance dose of that GIP:GLP-1 Peptide;

wherein the first titration dose is about 25% of the maintenance dose, the second titration dose is about 50% of the maintenance dose and the third titration dose is about 75% of the maintenance dose.

In an embodiment 27 (c), the present invention provides a GIP:GLP-1 Peptide, or a pharmaceutically acceptable salt thereof, for use in treating NAFLD in a patient in need thereof wherein the use comprises:
a) administration of a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administration of a second titration dose of that GIP:GLP-1 Peptide for a minimum of about two weeks; and thereafter c) administration of a third titration dose of that GIP:GLP-1 Peptide for a minimum of about two weeks; and thereafter
d) administration of a fourth titration dose of that GIP:GLP-1 Peptide for a minimum of about two weeks; and thereafter
e) administration of a fifth titration dose of that GIP:GLP-1 Peptide for a minimum of about two weeks; and thereafter
f) administration of a maintenance dose of that GIP:GLP-1 Peptide;

wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 28(a), the present invention provides a GIP:GLP-1 Peptide, or a pharmaceutically acceptable salt thereof, for use in treating NASH in a patient in need thereof wherein the use comprises:
a) administration of a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administration of a maintenance dose of that GIP:GLP-1 Peptide;

wherein the titration dose is about 50% of the maintenance dose.

In an embodiment 28 (b), the present invention provides a GIP:GLP-1 Peptide, or a pharmaceutically acceptable salt thereof, for use in treating NASH in a patient in need thereof wherein the use comprises:
a) administration of a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administration of a second titration dose of that GIP:GLP-1 Peptide for a minimum of about two weeks; and thereafter
c) administration of a third titration dose of that GIP:GLP-1 Peptide for a minimum of about two weeks; and thereafter
d) administration of a maintenance dose of that GIP:GLP-1 Peptide;

wherein the first titration dose is about 25% of the maintenance dose, the second titration dose is about 50% of the maintenance dose and the third titration dose is about 75% of the maintenance dose.

In an embodiment 28 (c), the present invention provides a GIP:GLP-1 Peptide, or a pharmaceutically acceptable salt thereof, for use in treating NASH in a patient in need thereof wherein the use comprises:
a) administration of a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter
b) administration of a second titration dose of that GIP:GLP-1 Peptide for a minimum of about two weeks; and thereafter c) administration of a third titration dose of that GIP:GLP-1 Peptide for a minimum of about two weeks; and thereafter d) administration of a fourth titration dose of that GIP:GLP-1 Peptide for a minimum of about two weeks; and thereafter e) administration of a fifth titration dose of that GIP:GLP-1 Peptide for a minimum of about two weeks; and thereafter f) administration of a maintenance dose of that GIP:GLP-1 Peptide;

wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In an embodiment 29(a), the present invention provides a GIP:GLP-1 Peptide, or a pharmaceutically acceptable salt thereof, for use in inducing remission or regression of diabetes, or preventing diabetes in a patient in need thereof wherein the use comprises:

a) administration of a titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter b) administration of a maintenance dose of that GIP:GLP-1 Peptide;

wherein the titration dose is about 50% of the maintenance dose.

In an embodiment 29 (b), the present invention provides a GIP:GLP-1 Peptide, or a pharmaceutically acceptable salt thereof, for use in inducing remission or regression of diabetes, or preventing diabetes in a patient in need thereof wherein the use comprises:

a) administration of a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter b) administration of a second titration dose of that GIP:GLP-1 Peptide for a minimum of about two weeks, and thereafter c) administration of a third titration dose of that GIP:GLP-1 Peptide for a minimum of about two weeks; and thereafter d) administration of a maintenance dose of that GIP:GLP-1 Peptide;

wherein the first titration dose is about 25% of the maintenance dose, the second titration dose is about 50% of the maintenance dose and the third titration dose is about 75% of the maintenance dose.

In an embodiment 29 (c), the present invention provides a GIP:GLP-1 Peptide, or a pharmaceutically acceptable salt thereof, for use in inducing remission or regression of diabetes, or preventing diabetes in a patient in need thereof wherein the use comprises:

a) administration of a first titration dose of a GIP:GLP-1 Peptide having a GIP:GLP-1 receptor agonist potency ratio as measured after a 60 minute incubation using a casein cAMP assay normalized against GIP and GLP-1 that is about 2.5:1 to about 10:1 for a minimum of about two weeks; and thereafter b) administration of a second titration dose of that GIP:GLP-1 Peptide for a minimum of about two weeks; and thereafter c) administration of a third titration dose of that GIP:GLP-1 Peptide for a minimum of about two weeks; and thereafter d) administration of a fourth titration dose of that GIP:GLP-1 Peptide for a minimum of about two weeks; and thereafter e) administration of a fifth titration dose of that GIP:GLP-1 Peptide for a minimum of about two weeks; and thereafter f) administration of a maintenance dose of that GIP:GLP-1 Peptide;

wherein the first titration dose is about 17% of the maintenance dose, the second titration dose is about 33% of the maintenance dose, the third titration dose is about 50% of the maintenance dose, the fourth titration is about 66% of the maintenance dose and the fifth titration dose is about 83% of the maintenance dose.

In embodiment 30, the titration doses of any of embodiments 23(a)-(c), 24(a)-(c), 25(a)-(c), 26(a)-(c), 27(a)-(c), 28(a)-(c), or 29(a)-(c) are each administered for about four weeks before the administration of the next higher dose begins.

In embodiment 31, the GIP:GLP-1 Peptide of any of embodiments 23(a)-(c), 24(a)-(c), 25(a)-(c), 26(a)-(c), 27(a)-(c), 28(a)-(c), 29(a)-(c) or 30 is a peptide of SEQ ID NO: 3, or a pharmaceutically acceptable salt thereof.

In embodiment 32, the GIP:GLP-1 Peptide of any of embodiments 23(a)-(c), 24(a)-(c), 25(a)-(c), 26(a)-(c), 27(a)-(c), 28(a)-(c), 29(a)-(c), 30, or 31 has a receptor agonist potency ratio that is 2.5:1 to about 5:1 GIP to GLP-1.

In embodiment 33, the GIP:GLP-1 Peptide of any of embodiments 23(a)-(c), 24(a)-(c), 25(a)-(c), 26(a)-(c), 27(a)-(c), 28(a)-(c), 29(a)-(c), 30, or 31 has a receptor agonist potency ratio that is 2.5:1 to about 3.5:1 GIP to GLP-1.

In embodiment 34, is a composition comprising a GIP-GLP-1 Peptide having a GIP:GLP-1 receptor agonist potency ratio as measured after a 60 minute incubation using casein cAMP assay normalized against GIP and GLP-1 that is about 2.5:1 to about 10:1; and a pharmaceutically acceptable excipient.

In embodiment 34(a) is a composition administered at least two weeks as an escalation dose.

In embodiment 34 (a1) is a composition administered at least two weeks as an escalation dose.

In embodiment 34 (b) is a composition administered as a maintenance dose for at least two weeks.

In embodiment 35, is a GIP-GLP-1 Peptide for use to treat diabetes in a patient in need thereof, wherein the GIP:GLP-1 receptor potency ratio of the GIP-GLP-1 Peptide, as measured after a 60 minute incubation using a casein cAMP assay normalized against GIP and GLP-1, is about 2.5:1 to about 10:1.

In embodiment 35(a) is a GIP-GLP-1 Peptide of embodiment 35 wherein the Peptide is administered for a minimum of about 2 weeks.

In embodiment 35 (b) is a GIP-GLP-1 Peptide of embodiment 35 or 35(a) wherein the Peptide is administered as at least one escalation dose for a minimum of about 2 weeks.

Also provided herein are methods of using a GIP:GLP-1 Peptide in simultaneous, separate and sequential combinations with one or more agents selected from metformin, a thiazolidinedione, a sulfonylurea, a dipeptidyl peptidase 4 inhibitor, a sodium glucose co-transporter, a SGLT-2 inhibitor, a growth differentiation factor 15 modulator ("GDF15"), a peptide tyrosine tyrosine modulator ("PYY"), a modified insulin, amylin, a dual amylin calcitonin receptor agonist, and oxyntomodulin agonist ("OXM") in the treatment of a condition selected from the group consisting of type 2 diabetes, chronic kidney disease, atherosclerosis, NALFD and NASH. Further provided herein are methods of using a GIP:GLP-1 Peptide in simultaneous, separate and sequential combinations with one or more agents selected from metformin, a thiazolidinedione, a sulfonylurea, a dipeptidyl peptidase 4 inhibitor, a sodium glucose co-transporter, a SGLT-2 inhibitor, GDF15, PYY, a modified insulin, amylin, a dual amylin calcitonin receptor agonist, and OXM in the improvement of glycemic control and/or weight management. Also provided herein are methods of using a GIP:GLP-1 Peptide in simultaneous, separate and sequential combinations with one or more agents selected from metformin, a thiazolidinedione, a sulfonylurea, a dipeptidyl peptidase 4 inhibitor, a sodium glucose co-transporter, a SGLT-2 inhibitor, GDF15, PYY, a modified insulin, amylin, a dual amylin calcitonin receptor agonist, and OXM to cure diabetes, induce remission or regression of diabetes, or prevent diabetes. In an embodiment, a compound of the present invention is provided in a fixed dose combination with one or more agents selected from metformin, a thiazolidinedione, a sulfonylurea, a dipeptidyl peptidase 4 inhibitor, a sodium glucose co-transporter, a SGLT-2 inhibitor, GDF15, PYY, a modified insulin, amylin, a dual amylin calcitonin receptor agonist, and OXM.

The present invention provides novel dosing regimens that include administering a titration dose about once weekly for a minimum of about two weeks and thereafter administering a maintenance dose wherein the titration dose is about 50% of the maintenance dose. In certain embodiment, the titration dose may be administered for about four weeks. In certain embodiments, the titration dose may be administered for more than about four weeks as determined by the nurse, patient and/or health care provider.

As used herein, the term "treating" or "to treat" includes restraining, slowing, stopping, or reversing the progression or severity of a symptom, condition, or disorder.

As used herein, "normalized against GIP and GLP-1" means that the native peptides, as provided herein as SEQ ID NO: 1 and SEQ ID NO:2, are tested in the casein CAMP assay as a control for the test compound, and Raw CPM data for concentration curves of peptides, GLP-1, or GIP are converted to percent inhibition by subtracting nonspecific binding (binding in the presence of excess unlabeled GLP-1, or GIP, respectively) from the individual CPM values and dividing by the total binding signal, also corrected by subtracting nonspecific binding. Data are analyzed using four-parameter (curve maximum, curve minimum, $IC_{50}$, Hill slope) nonlinear regression routines (Genedata Screener, version 12.0.4, Genedata AG, Basal, Switzerland).

GIP is a 42 amino acid peptide (SEQ ID NO:1), which, like GLP-1, is also known as an incretin, and plays a physiological role in glucose homeostasis by stimulating insulin secretion from pancreatic beta cells in the presence of glucose. GLP-1 is a 36 amino acid peptide, the major biologically active fragment of which (GLP-17-36) is produced as a 30-amino acid, C-terminal amidated peptide (SEQ ID NO:2). The compounds of SEQ ID NO: 3 provide desired potency at each of the GIP and GLP-1 receptors. In an embodiment, compounds of SEQ ID NO: 3 have desirable GIP and GLP receptor activity wherein the GIP agonist potency is from about 2.5:1 to about 10 times the GLP1 receptor potency as measured by the casein cAMP assay, wherein the potency is normalized against native GIP and GLP on the day the assay is run. In an embodiment, compounds of SEQ ID NO: 3 have desirable GIP and GLP receptor activity wherein the GIP agonist potency is from about 2.5:1 to about 5 times the GLP1 receptor potency as measured by the casein cAMP assay, described herein below, wherein the potency is normalized against native GIP and GLP on the day the assay is run.

As used herein "maintenance dose" means an effective dose to treat the patient with a side-effect profile that supports chronic dosing. The term "effective dose" refers to the amount or dose of a GIP:GLP-1 Peptide, which, upon single or multiple dose administration to the patient, provides the desired effect in the patient under diagnosis or treatment. An effective doe can be determined by a person of skill in the art using the clinical trial descriptions set forth herein together with known techniques and by observing results obtained under analogous circumstances. In determining the effective amount for a subject, a number of factors are considered, including, but not limited to: the species of mammal; its size, age, and general health; the specific disease or disorder involved; the degree of or involvement or the severity of the disease or disorder; the response of the individual patient; the particular compound administered; the mode of administration; the bioavailability characteristics of the preparation administered; the dose regimen selected; the use of concomitant medication; and other relevant circumstances.

As used herein, the term "titration" or "titration dose(s)" also means and can be interchangable with an escalation or escalation dose(s).

As used herein, the term GIP to GLP-1 also means and can be interchangeable with GIP:GLP-1. Thus, when "about 2.5 to about 10:1 GIP to GLP-1" or "about 2.5:1 to about 10:1 GIP to GLP-1" is used, it also means about 2.5 to about 10 GIP activity to 1 GLP-1 activity or about 2.5 to about 10 GIP activity: 1 GLP-1 activity.

When used herein in reference to one or more of the GIP or GLP-1 receptors, the terms "activity," "activate[s]" "activat[ing]" and the like refers to the capacity of a compound to bind to and induce a response at the receptor(s), as measured using assays known in the art, such as the in vitro assays described below. Such activity may be measured in vivo using serum. The receptor agonist potency ratio of a GIP:GLP-1 Peptide is measured using the casein cAMP assay, as described herein below.

The affinity of a particular GIP:GLP-1 co-agonist compound for each of the GIP and GLP-1 receptors may be measured using techniques known for measuring receptor binding levels in the art, including, for example those described in the examples below, and is commonly expressed as a Ki value; however, the GIP potency ratio that is about 2.5 to about 10 times the receptor potentcy at the GLP-1 receptor determined using the casein CAMP assay, below.

In an embodiment, a pharmaceutical composition of a GIP:GLP-1 Peptide is suitable for administration by a parenteral route (e.g., subcutaneous, intravenous, intraperitoneal, intramuscular, or transdermal). In an embodiment, a pharmaceutical composition of a GIP:GLP-1 Peptide is suitable for oral administration (e.g., tablet, capsule). Such pharmaceutical compositions and processes for preparing same are generally well known in the art. (See, e.g., Remington: The Science and Practice of Pharmacy (D. B. Troy, Editor, 21st Edition, Lippincott, Williams & Wilkins, 2006). In an embodiment of the present invention, the route of administration is subcutaneous. In an embodiment of the present invention, the route of administration is oral.

As used herein "glycemic control" refers to the maintenance or reduction of a patient's HbA1c levels; "improving" glycemic control refers to reductions in HbA1c.

As used herein "weight management" refers to the management of obesity in an individual; "improving" weight management refers to a reduction in body weight.

As used herein "HbA1c" refers to glycated hemoglobin levels, which develop when hemoglobin joins with glucose in the blood. HbA1c levels are a commonly used measure of glycemic control in patients with diabetes, with decreased HbA1c levels generally indicating improved glycemic control. In the context of the methods of the present invention, the methods of the present invention result in a decrease in HbA1c. In certain embodiments, the decrease in HbA1c is decreased relative to the HbA1c levels resulting from treatment with a lower dose of a GIP:GLP-1 Peptide.

As used herein, the term "administering" means the administration by a nurse, health care provider, patient or any other individual including self-administration as directed by the doctor. This includes not only delivering into the body but also prescribing, dispensing or assisting in any way with delivery.

As used herein, the terms "treatment," "treat," "treating," and the like, mean to include slowing or attenuating the progression of a disease or disorder. The terms mean to alleviate, ameliorate, or reduce one or more symptoms of a disorder or condition, even if the disorder or condition is not eliminated. The term includes preventing the manifestation.

As used herein "diabetes remission" means that a patient, using a GIP:GLP-1 Peptide for the treatment of diabetes reaches their glycemic control treatment goal.

As used herein, the term GIP:GLP-1 Peptide is a compound, or a pharmaceutically acceptable salt thereof, with a GIP:GLP agonist potency ratio of from about 2.5:1 to about 10:1. The GIP:GLP-1 Peptide treatment to cure diabetes can prevent, reduce the severity of, or induce remission of diabetes in such patient. In an embodiment, a patient using a GIP:GLP-1 Peptide for treatment of diabetes, reaches their glycemic control treatment goal, and requires no concomitant diabetes medicine to maintain the glycemic control goal. In an embodiment, a patient using a GIP:GLP-1 Peptide in the treatment of diabetes reaches at least their glycemic control treatment goal, and the treatment goal is maintained with cessation of treatment using a GIP:GLP-1 Peptide and all other diabetes medication. In an embodiment, a patient using a GIP:GLP-1 Peptide in the treatment of diabetes reaches at least their glycemic control treatment goal, and the treatment goal is maintained for at least a about a month with cessation of treatment using a GIP:GLP-1 Peptide and all other diabetes medications. In an embodiment, a patient using a GIP:GLP-1 Peptide in the treatment of diabetes reaches at least their glycemic control treatment goal, and the treatment goal is maintained for at least about six months with cessation of treatment using a GIP:GLP-1 Peptide and all other diabetes medications. In an embodiment the patient is unable to reach their glycemic goals prior to a GIP:GLP-1 Peptide treatment. In an embodiment, the patient has failed to reach their glycemic goal using oral diabetes medication. In an embodiment, the patient has failed to reach their glycemic goal using metformin treatment. In an embodiment, the patient glycemic goal is less than about 5.7%.

As used herein "patient" or "patients" refers to a mammal in need of treatment for a condition or disorder. In an embodiment, the patient is a human with a disease or condition that would benefit from treatment with a GIP: GLP-1 Peptide having a GIP:GLP-1 receptor agonist potency ratio of from about 2.5:1 to about 10:1.

As used herein "EDTA" means ethylenediaminetetraacetic acid. As used herein "DMSO" means dimethyl sulfoxide. As used herein "CPM" means counts per minute. As used herein "IBMX" means 3-isobutyl-1-methylxanthine. As used herein "LC/MS" means liquid chromatography/mass spectrometry. As used herein "HTRF" means homogeneous time-resolved fluorescence. As used herein "BSA" mean bovine serum albumin.

Cure Diabetes, Induce Remission or Regression of Diabetes, or Prevent Diabetes

Despite advances in the treatment of diabetes, many patients receiving such treatment are unable to reach their glycemic control goal or HbA1c goal. This invention provides a cure for diabetes wherein a patient receiving treatment for diabetes using a GIP:GLP1 Peptide, is able to reach their HbA1c goal, and wherein such patient maintains their HbA1c goal after cessation of GIP:GLP1 Peptide treatment. In an embodiment, the patient receiving GIP:GLP1 Peptide treatment for diabetes maintains their HbA1c goal after cessation of all medications approved for use in the treatment of glycemic control or diabetes. As used herein, the term "diabetes medication," "diabetes medicine" and the like, means a medication approved by the pertinent regulatory agency for use in the treatment of glycemic control or Type II diabetes. In an embodiment, the HbA1c measurement in the patient treated for diabetes is less than or equal to about 5.9%. In an embodiment, the patient maintains their HbA1c goal level for at least one month without further GIP:GLP1 Peptide administration. In an embodiment, the patient previously treated for diabetes using GIP:GLP1 Peptide maintains their HbA1 goal level for at least one month without administration of further GIP:GLP1 Peptide or any other diabetes medication. In an embodiment, the patient maintains their HbA1c goal level for at least 6 months without administration of further GIP:GLP1 Peptide or any other diabetes medication.

As used herein the term "amino acid" means both naturally occurring amino acids and unnatural amino acids. The amino acids are typically depicted using standard one letter codes (e.g., L=leucine), as well as alpha-methyl substituted residues of natural amino acids (e.g., α-methyl leucine, or αMeL and α-methyl lysine, or αMeK) and certain other unnatural amino acids, such as alpha amino isobutyric acid, or "Aib," "4Pal," "Orn," and the like. The structures of these amino acids appear below:

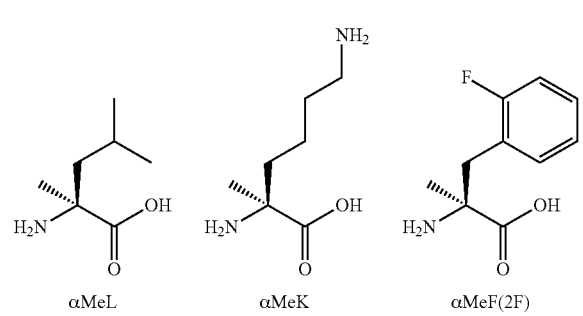

αMeL αMeK αMeF(2F)

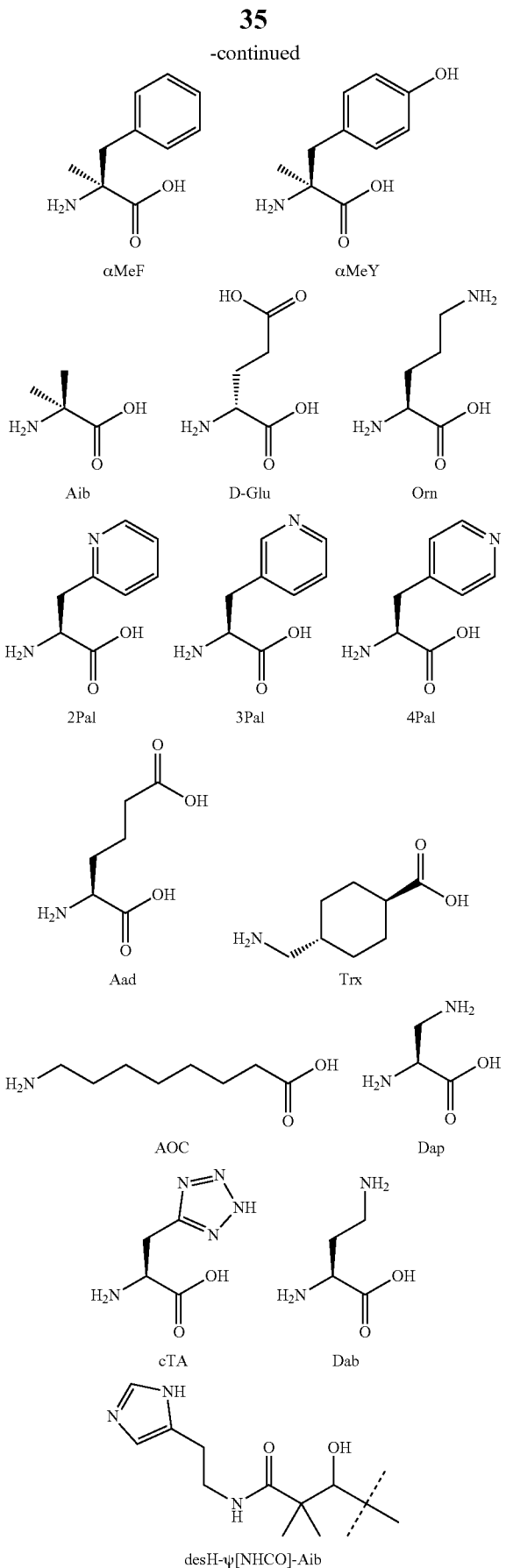

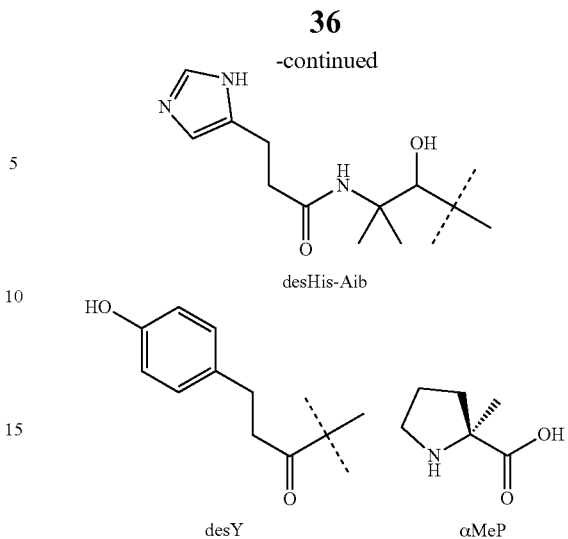

As used herein "Orn" means ornithine. As used herein "4Pal" means 3-(4-Pyridyl)-L-alanine. As used herein "αMeF (2F)" means alpha-methyl 2-Fl-phenylalanine.

As used herein "αMeY," "αMeK," and "αMeL" mean alpha methyl tyrosine, alpha methyl lysine, and alpha methyl leucine, respectively. As used herein, "e" and "D-Glu" mean D-glutamic acid.

When used herein, the term "amino acid conjugated to a $C_{16}$-$C_{22}$ fatty acid" refers to any natural or unnatural amino acid with a functional group that has been chemically modified to conjugate to a fatty acid by way of a direct bond to the fatty acid or, preferably, by way of a linker. Examples of such functional groups include amino, carboxyl, chloro, bromo, iodo, azido, alkynyl, alkenyl, and thiol groups. Examples of natural amino acids which include such functional groups include K(amino), C (thiol), E (carboxyl) and D (carboxyl). In an embodiment the conjugated amino acid is K.

The term "$C_{16}$-$C_{22}$ fatty acid" as used herein means a carboxylic acid with between 16 and 22 carbon atoms. In an embodiment, the $C_{16}$-$C_{22}$ fatty acid suitable for use herein can be a saturated diacid. In an embodiment, the fatty acid is $C_{20}$-$C_{22}$. In an embodiment q is selected from the group consisting of 14, 16, 18, and 20. In an embodiment q is selected from 18 and 20. In an embodiment q is 18. In an embodiment q is 20.

In an embodiment, specific saturated $C_{16}$-$C_{22}$ fatty acids that are suitable for the compounds and uses thereof disclosed herein include, but are not limited to, hexadecanedioic acid ($C_{16}$ diacid), heptadecanedioic acid ($C_{17}$ diacid), octadecanedioic acid ($C_{18}$ diacid), nonadecanedioic acid ($C_{19}$ diacid), eicosanedioic acid ($C_{20}$ diacid), heneicosanedioic acid ($C_{21}$ diacid), docosanedioic acid ($C_{22}$ diacid), including branched and substituted derivatives thereof.

In an embodiment, the $C_{16}$-$C_{22}$ fatty acid is selected from the group consisting of a saturated $C_{18}$ diacid, a saturated $C_{19}$ diacid, a saturated $C_{20}$ diacid, and branched and substituted derivatives thereof. In an embodiment, the $C_{16}$-$C_{22}$ fatty acid is selected from the group consisting of stearic acid, arachadic acid and eicosanedioic acid. In an embodiment, the $C_{16}$-$C_{22}$ fatty acid is arachadic acid.

As used herein "time-extension technology" means a peptide time-extension technology for example, recombinant human serum albumin ("rHSA"), peptide conjugation to a pharmaceutically acceptable polymer, such as polymeric sequence of amino acids ("XTEN"), unsulfated heparin-like carbohydrate polymer ("HEP"), hydroxyl ethyl starch ("HES"), llama heavy-chain antibody fragments ("VHH"), pegylation, Fc conjugation, bovine serum albumin ("BSA") (Sleep, D. *Epert Opin Drug Del* (2015) 12, 793-812; Podust V N et.al. J Control. Release, 2015; ePUB; Hey, T. et. al. in: R. Kontermann (Ed.), Therapeutic Proteins: Strategies to Modulate their Plasma Half-Lives, Wiley-VCH Verlag Gmbh & Co. KGaA, Weinheim, Germany, 2012, pp 117-140; DeAngelis, P L, *Drug Dev Delivery* (2013) January 12/31/2012. In an embodiment time-extension technology is applied using a linker group. In an embodiment, the time-extension technology is applied using 0, 1, 2, or 3 amino acid as linker.

A compound having a GIP potency ratio that is about 2.5 to about 10 times the receptor potentcy at the GLP-1 receptor may be further modified using a peptide time-extension technology for example, recombinant human serum albumin ("rHSA"), peptide conjugation to a pharmaceutically acceptable polymer, such as polymeric sequence of amino acids ("XTEN"), unsulfated heparin-like carbohydrate polymer ("HEP"), and hydroxyl ethyl starch ("HES").

In an embodiment is a GIP:GLP-1 Peptide of the formula:

(SEQ ID NO: 3)
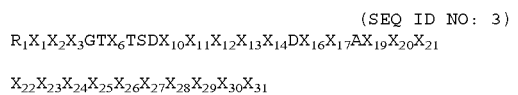
$X_{22}X_{23}X_{24}X_{25}X_{26}X_{27}X_{28}X_{29}X_{30}X_{31}$ wherein:
$R_1$ is a modification of the N-terminal amino group wherein the modification is selected from the group consisting of Ac and absent;
$X_1$ is selected from the group consisting of Y, H, D-Tyr, F, desH, and desY,
$X_2$ is selected from the group consisting of Aib, αMeP, A, P, and D-Ala;
or $X_1$ and $X_2$ combine to form desH-ψ[NHCO]-Aib;
$X_3$ is selected from the group consisting of E, N, Aad, and cTA;
$X_6$ is selected from the group consisting of F, αMeF, and αMeF (2F);
$X_{10}$ is selected from the group consisting of A, L, H, 3Pal, 4Pal, V, Y, E, αMeF, αMeF (2F), I, αMeY, Q, D-His, D-Tyr, cTA, and K(2-[2-(2-amino-ethoxy)-ethoxy]-acetyl) 2-(γ-Glu)-CO—$(CH_2)_q CO_2 H$;
$X_{11}$ is selected from the group consisting of S, αMeS, and D-Ser;
$X_{12}$ is selected from the group consisting of I, S, D-Ile, and K(2-[2-(2-amino-ethoxy)-ethoxy]-acetyl) 2-(γ-Glu)-CO—$(CH_2)_q CO_2 H$;
$X_{13}$ is selected from the group consisting of Nle, Aib, L, αMeL, and K(2-[2-(2-amino-ethoxy)-ethoxy]-acetyl) 2-(γ-Glu)-CO—$(CH_2)_q CO_2 H$;
$X_{14}$ is selected from the group consisting of L and K, wherein K is conjugated to a $C_{16}$-$C_{22}$ fatty acid wherein said fatty acid is optionally conjugated to said K via a linker;
$X_{16}$ is selected from the group consisting of K, E, Orn, Dab, Dap, S, T, H, Aib, αMeK, R, and K(2-[2-(2-amino-ethoxy)-ethoxy]-acetyl) 2-(γ-Glu)-CO—$(CH_2)_q CO_2 H$;
$X_{17}$ is selected from the group consisting of K, Q, I, and an amino acid conjugated to a $C_{16}$-$C_{22}$ fatty acid wherein said fatty acid is optionally conjugated to said amino acid via a linker;

$X_{19}$ is selected from the group consisting of Q, A, and K(2-[2-(2-amino-ethoxy)-ethoxy]-acetyl) 2-(γ-Glu)-CO—$(CH_2)_q CO_2 H$;
$X_{20}$ is selected from the group consisting of Aib, Q, H, R, K, αMeK, and K(2-[2-(2-amino-ethoxy)-ethoxy]-acetyl) 2-(γ-Glu)-CO—$(CH_2)_q CO_2 H$;
$X_{21}$ is selected from the group consisting of H, Aad, D, Aib, T, A, E, I, and K(2-[2-(2-amino-ethoxy)-ethoxy]-acetyl) 2-(γ-Glu)-CO—$(CH_2)_q CO_2 H$;
$X_{22}$ is selected from the group consisting of F and αMeF;
$X_{23}$ is selected from the group consisting of I, L, A, G, F, H, E, V, and K(2-[2-(2-amino-ethoxy)-ethoxy]-acetyl) 2-(γ-Glu)-CO—$(CH_2)_q CO_2 H$;
$X_{24}$ is selected from the group consisting of S, Aad, D-Glu, E, Aib, H, V, A, Q, D, P, and K(2-[2-(2-amino-ethoxy)-ethoxy]-acetyl) 2-(γ-Glu)-CO—$(CH_2)_q CO_2 H$;
$X_{25}$ is selected from the group consisting of Y and αMeY;
$X_{26}$ is selected from the group consisting of L, αMeL, and K(2-[2-(2-amino-ethoxy)-ethoxy]-acetyl) 2-(γ-Glu)-CO—$(CH_2)_q CO_2 H$;
$X_{27}$ is selected from the group consisting of L, I, and K(2-[2-(2-amino-ethoxy)-ethoxy]-acetyl) 2-(γ-Glu)-CO—$(CH_2)_q CO_2 H$;
$X_{28}$ is selected from the group consisting of E, A, S, D-Glu, and K(2-[2-(2-amino-ethoxy)-ethoxy]-acetyl) 2-(γ-Glu)-CO—$(CH_2)_q CO_2 H$;
$X_{29}$ is selected from the group consisting of Aib, G, A, and K(2-[2-(2-amino-ethoxy)-ethoxy]-acetyl) 2-(γ-Glu)-CO—$(CH_2)_q CO_2 H$;
$X_{30}$ is selected from the group consisting of C, G, G-R2 and K(2-[2-(2-amino-ethoxy)-ethoxy]-acetyl) 2-(γ-Glu)-CO—$(CH_2)_q$—$CO_2 H$;
$X_{31}$ is absent or is selected from the group consisting of $PX_{32}X_{33}X_{34}$—R2,
$X_{32}X_{33}X_{34}X_{35}X_{36}X_{37}X_{38}X_{39}$—R2,
$PX_{32}X_{33}X_{34}X_{35}X_{36}X_{37}X_{38}X_{39}X_{40}$—R2, K [(2-[2-(2-amino-ethoxy)-ethoxy]-acetyl) 2-(γ-Glu)-CO—$(CH_2)_q$—$CO_2 H]X_{32}X_{33}X_{34}$—R2, K [(2-[2-(2-amino-ethoxy)-ethoxy]-acetyl) 2-(γ-Glu)-CO—$(CH_2)_q$—$CO_2 H$]
$X_{32}X_{33}X_{34}X_{35}X_{36}X_{37}X_{38}X_{39}$—R2, and K [(2-[2-(2-amino-ethoxy)-ethoxy]-acetyl) 2-(γ-Glu)-CO—$(CH_2)_q$—$CO_2 H$]
$X_{32}X_{33}X_{34}X_{35}X_{36}X_{37}X_{38}X_{39}X_{40}$—R2;
wherein:
$X_{32}$ is S or K [(2-[2-(2-amino-ethoxy)-ethoxy]-acetyl) 2-(γ-Glu)-CO—$(CH_2)_q$—$CO_2 H$];
$X_{33}$ is S or K [(2-[2-(2-amino-ethoxy)-ethoxy]-acetyl) 2-(Y-Glu)-CO—$(CH_2)_q$—$CO_2 H$];
$X_{34}$ is selected from the group consisting of G, C, and K [(2-[2-(2-amino-ethoxy)-ethoxy]-acetyl) 2-(γ-Glu)-CO—$(CH_2)_q$—$CO_2 H$];
$X_{35}$ is A or K [(2-[2-(2-amino-ethoxy)-ethoxy]-acetyl) 2-(γ-Glu)-CO—$(CH_2)_q$—$CO_2 H$];
$X_{36}$ is P or K [(2-[2-(2-amino-ethoxy)-ethoxy]-acetyl) 2-(γ-Glu)-CO—$(CH_2)_q$—$CO_2 H$];
$X_{37}$ is P or K [(2-[2-(2-amino-ethoxy)-ethoxy]-acetyl) 2-(γ-Glu)-CO—$(CH_2)_q$—$CO_2 H$];
$X_{38}$ is P or K [(2-[2-(2-amino-ethoxy)-ethoxy]-acetyl) 2-(γ-Glu)-CO—$(CH_2)_q$—$CO_2 H$];
$X_{39}$ is selected from the group consisting of C, S, and K [(2-[2-(2-amino-ethoxy)-ethoxy]-acetyl) 2-(γ-Glu)-CO—$(CH_2)_q$—$CO_2 H$];
$X_{40}$ is selected from the group consisting of C and K [(2-[2-(2-amino-ethoxy)-ethoxy]-acetyl) 2-(γ-Glu)-CO—$(CH_2)_q$—$CO_2 H$];
q is selected from the group consisting of 14, 15, 16, 17, 18, 19, and 20; and R2 is a modification of the C-terminal group, wherein the modification is $NH_2$ or absent;

or a pharmaceutically acceptable salt thereof;

wherein if $X_{30}$ is G-R2, then $X_{31}$ is absent;

wherein no more than one of $X_{10}$, $X_{12}$, $X_{13}$, $X_{14}$, $X_{16}$, $X_{17}$, $X_{19}$, $X_{20}$, $X_{21}$, $X_{23}$, $X_{24}$, $X_{26}$, $X_{27}$, $X_{28}$, $X_{29}$, $X_{30}$, $X_{31}$, $X_{32}$, $X_{33}$, $X_{34}$, $X_{35}$, $X_{36}$, $X_{37}$, $X_{38}$, $X_{39}$, and $X_{40}$ may be a substituent that contains a fatty acid; and wherein no more than one of $X_{30}$, $X_{34}$, $X_{39}$, and $X_{40}$ may be C; and wherein if one of $X_{30}$, $X_{34}$, $X_{39}$, and $X_{40}$ is C, then none of $X_{10}$, $X_{12}$, $X_{13}$, $X_{14}$, $X_{16}$, $X_{17}$, $X_{19}$, $X_{20}$, $X_{21}$, $X_{23}$, $X_{24}$, $X_{26}$, $X_{27}$, $X_{28}$, $X_{29}$, $X_{30}$, $X_{31}$, $X_{32}$, $X_{33}$, $X_{34}$, $X_{35}$, $X_{36}$, $X_{37}$, $X_{38}$, $X_{39}$, and $X_{40}$ is a substituent that contains a fatty acid;

wherein the GIP:GLP-1 Peptide has a receptor agonist potency ratio that is about 2.5:1 to about 10:1.

A further embodiment provides a novel GIP:GLP-1 Peptide of SEQ ID NO:3, wherein the GIP:GLP-1 Peptide has a GIP:GLP-1 receptor agonist potency ratio that is about 2.5:1 to about 5:1. A further embodiment of the present invention is a novel GIP:GLP-1 Peptide of SEQ ID NO:3, wherein the GIP:GLP-1 Peptide has a GIP:GLP-1 receptor agonist potency ratio that is about 2.5:1 to about 3.5:1.

The invention is further illustrated by the following compounds demonstrating the desired GIP potency ratio that is about 2.5:1 to about 10 times greater than the receptor potentcy at the GLP-1 receptor using the cAMP casein assay, however, these example peptides are not to be construed as limiting.

PEPTIDE SYNTHESIS-Peptide 1

Y-Aib-EGT-αMeF (2F)-TSDYSI-αMeL-LDEK((2-[2-(2-Amino-ethoxy)-ethoxy]-acetyl) 2-(γGlu)-CO—($CH_2$) 18—$CO_2H$) AQ-Aib-EFI-(D-Glu)-YLIEGGPSSGAPPPS-$NH_2$ (SEQ ID NO:4)

The structure of SEQ ID NO:4 is depicted below using the standard single letter amino acid codes with the exception of residues Aib2, αMeF (2F) 6, αMeL13, K17, Aib20, D-Glu24, and Ser39 where the structures of these amino acid residues have been expanded:

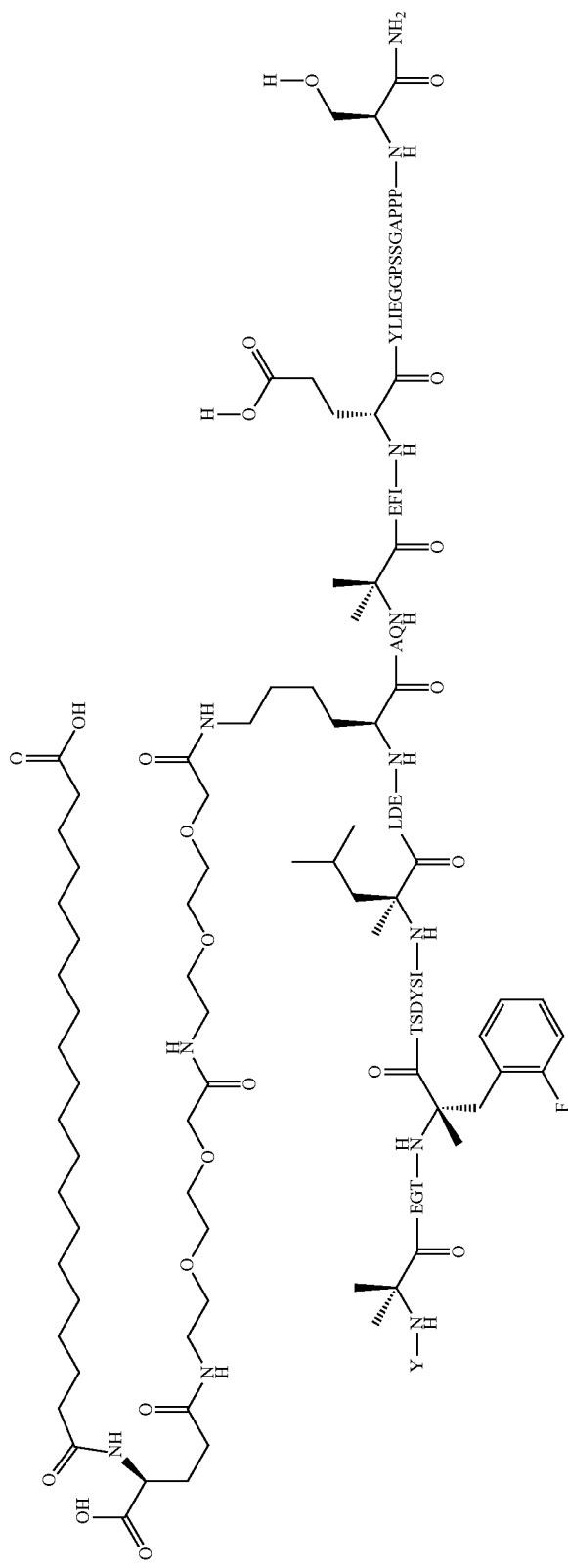

The peptide backbone of Peptide 1 is synthesized using Fluorenylmethyloxycarbonyl (Fmoc)/tert-Butyl (t-Bu) chemistry on a Symphony X peptide synthesizer (Gyros Protein Technologies. Tucson, AZ).

The resin consists of 1% DVB cross-linked polystyrene (Fmoc-Rink-MBHA Low Loading resin, 100-200 mesh, EMD Millipore) at a substitution of 0.3-0.4 meq/g. Standard side-chain protecting groups were used. Fmoc-Lys (Mtt)-OH is used for the lysine at position 17 and Boc-Tyr(tBu)-OH) was used for the tyrosine at position 1. Fmoc groups are removed prior to each coupling step (2×7 minutes) using 20% piperidine in DMF. All standard amino acid couplings are performed for 1 hour to a primary amine and 3 hour to a secondary amine, using an equal molar ratio of Fmoc amino acid (0.3 mM), diisopropylcarbodiimide (0.9 mM) and Oxyma (0.9 mM), at a 9-fold molar excess over the theoretical peptide loading. Exceptions are couplings to Cα-methylated amino acids, which are coupled for 3 hours. After completion of the synthesis of the peptide backbone, the resin is thoroughly washed with DCM for 6 times to remove residual DMF. The Mtt protecting group on the lysine at position 17 is selectively removed from the peptide resin using two treatments of 30% hexafluoroisopropanol (Oakwood Chemicals) in DCM (2×40-minute treatment).

Subsequent attachment of the fatty acid-linker moiety is accomplished by coupling of 2-[2-(2-Fmoc-amino-ethoxy)-ethoxy]-acetic acid (Fmoc-AEEA-OH, ChemPep, Inc.), Fmoc-glutamic acid α-t-butyl ester (Fmoc-Glu-OtBu, Ark Pharm, Inc.), eicosanedioic acid (WuXi AppTec, Shanghai, China). 3-Fold excess of reagents (AA: PyAOP: DIPEA=1: 1:1 mol/mol) are used for each coupling that is 1-hour long.

After the synthesis is complete, the peptide resin is washed with DCM, and then thoroughly air-dried. The dry resin is treated with 10 mL of cleavage cocktail (trifluoroacetic acid: water: triisopropylsilane, 95:2.5:2.5 v/v) for 2 hours at room temperature. The resin is filtered off, washed twice each with 2 mL of neat TFA, and the combined filtrates are treated with 5-fold excess volume of cold diethyl ether (−20° C.) to precipitate the crude peptide. The peptide/ether suspension is then centrifuged at 3500 rpm for 2 min to form a solid pellet, the supernatant is decanted, and the solid pellet is triturated with ether two additional times and dried in vacuo. The crude peptide is solubilized in 20% acetonitrile/20% Acetic acid/60% water and purified by RP-HPLC on a Luna 5 μm Phenyl-Hexyl preparative column (21×250 mm, Phenomenex) with linear gradients of 100% acetonitrile and 0.1% TFA/water buffer system (30-50% acetonitrile in 60 min). The purity of peptide is assessed using analytical RP-HPLC and pooling criteria is >95%. The main pool purity of compound 1 is found to be 98.0%. Subsequent lyophilization of the final main product pool yielded the lyophilized peptide TFA salt. The molecular weight is determined by LC-MS (obsd: M+3=1657.2; Calc M+3=1657.0).

Peptides 2 Through Peptide 265

The compounds according to Peptide 2 (SEQ ID NO:5) through Peptide 265 (SEQ ID NO:139), shown in Table 1 below, are prepared substantially as described by the procedures of Peptide 1.

Binding Assays

Glucagon (referred to as Gcg) is a Reference Standard prepared at Eli Lilly and Company. GLP-1, 7-36—NH$_2$ (referred to as GLP-1) is obtained from CPC Scientific (Sunnyvale, CA, 97.2% purity, 100 μM aliquots in 100% DMSO). GIP 1-42 (referred to as GIP) is prepared at Lilly Research Laboratories using peptide synthesis and HPLC chromatography as described above (>80% purity, 100 μM aliquots in 100% DMSO).]-radiolabeled Gcg, GLP-1, or GIP is prepared using [125I]-lactoperoxidase and obtained from Perkin Elmer (Boston, MA).

Stably transfected cell lines are prepared by subcloning receptor cDNA into a pcDNA3 expression plasmid and transfected into human embryonic kidney (HEK) 293 (hGcgR and hGLP-1R) or Chinese Hamster Ovary (CHO) (hGIPR) cells followed by selection with Geneticin (hGLP-1R and hGIPR) or hygromycin B (hGcgR).

Two methods are used for the preparation of crude cell membranes.

Method 1: Frozen cell pellets are lysed on ice in hypotonic buffer containing 50 mM Tris HCl, pH 7.5, and Roche Complete™ Protease Inhibitors with EDTA. The cell suspension is disrupted using a glass Potter-Elvehjem homogenizer fitted with a Teflon® pestle for 25 strokes. The homogenate is centrifuged at 4° C. at 1100×g for 10 minutes. The supernatant is collected and stored on ice while the pellets are resuspended in homogenization buffer and rehomogenized as described above. The homogenate is centrifuged at 1100×g for 10 minutes. The second supernatant is combined with the first supernatant and centrifuged at 35000×g for 1 hour at 4° C. The resulting membrane pellet is resuspended in homogenization buffer containing protease inhibitors at approximately 1 to 3 mg/mL, quick frozen in liquid nitrogen and stored as aliquots in a −80° C. freezer until use.

Method 2: Frozen cell pellets are lysed on ice in hypotonic buffer containing 50 mM Tris HCl, pH 7.5, 1 mM MgCl$_2$, Roche Complete™ EDTA-free Protease Inhibitors and 25 units/ml DNAse I (Invitrogen). The cell suspension is disrupted using a glass Potter-Elvehjem homogenizer fitted with a Teflon® pestle for 20 to 25 strokes. The homogenate is centrifuged at 4° C. at 1800×g for 15 minutes. The supernatant is collected and stored on ice while the pellets are resuspended in homogenization buffer (without DNAse I) and rehomogenized as described above. The homogenate is centrifuged at 1800×g for 15 minutes. The second supernatant is combined with the first supernatant and centrifuged an additional time at 1800×g for 15 minutes. The overall supernatant is then centrifuged at 25000×g for 30 minutes at 4° C. The resulting membrane pellet is resuspended in homogenization buffer (without DNAse I) containing protease inhibitors at approximately 1 to 3 mg/mL and stored as aliquots in a −80° C. freezer until use.

Binding Determination Methods

The equilibrium binding dissociation constants ($K_d$) for the various receptor/radioligand interactions are determined from homologous competition binding analysis instead of saturation binding due to high propanol content in the [$^{125}$I] stock material. The $K_d$ values determined for the receptor preparations were as follows: hGcgR (3.9 nM), hGLP-1R (1.2 nM) and hGIPR (0.14 nM).

[$^{125}$I]-Glucagon Binding

The human Gcg receptor binding assays are performed using a Scintillation Proximity Assay (SPA) format with wheat germ agglutinin (WGA) beads (Perkin Elmer). The binding buffer contains 25 mM 4-(2-hydroxyethyl)-1-piperazineethanesulfonic acid (HEPES), pH 7.4, 2.5 mM CaCl$_2$, 1 mM MgCl$_2$, 0.1% (w/v) bacitracin (Research Products), 0.003% (w/v) Polyoxyethylenesorbitan monolaurate (TWEEN®-20), and Roche Complete™ Protease Inhibitors without EDTA. Peptides and Gcg are thawed and 3-fold serially diluted in 100% DMSO (10 point concentration response curves). Next, 5 μL serially diluted compound or DMSO is transferred into Corning® 3632 clear bottom assay plates containing 45 μL assay binding buffer or unlabeled Gcg control (non-specific binding or NSB, at 1 µM final). Then, 50 µL [125I]-Gcg (0.15 nM final), 50 µL human GcgR membranes (1.5 µg/well) and 50 µL of WGA SPA beads (80 to 150 µg/well) are added with a Biotek Multiflo dispenser. Plates are sealed and mixed on a plate shaker (setting 6) for 1 minute and read with a PerkinElmer Trilux MicroBeta® scintillation counter after 12 hours of incubation/settling time at room temperature. Final assay concentration ranges for peptides tested in response curves is typically 1150 nM to 0.058 nM and for the control Gcg from 1000 nM to 0.05 nM.

[$^{125}$I]-GLP-1 Binding

The human GLP-1 receptor binding assay is performed using an SPA format with WGA beads. The binding buffer contains 25 mM HEPES, pH 7.4, 2.5 mM CaCl$_2$), 1 mM MgCl$_2$, 0.1% (w/v) bacitracin, 0.003% (w/v) TWEEN®-20, and Roche Complete™ Protease Inhibitors without EDTA. Peptides and GLP-1 are thawed and 3-fold serially diluted in 100% DMSO (10 point concentration response curves). Next, 5 µL serially diluted compound or DMSO is transferred into Corning® 3632 clear bottom assay plates containing 45 µL assay binding buffer or unlabeled GLP-1 control (non-specific binding or NSB, at 0.25 µM final). Then, 50 µL [125I]-GLP-1 (0.15 nM final), 50 µL human GLP-1R membranes (0.5 µg/well and 50 µL of WGA SPA beads (100 to 150 µg/well) are added with a Biotek Multiflo dispenser. Plates are sealed and mixed on a plate shaker (setting 6) for 1 minute and read with a PerkinElmer Trilux MicroBeta® scintillation counter after 5 to 12 hours of incubation/settling time at room temperature. Final assay concentration ranges for peptides tested in response curves are typically 1150 nM to 0.058 nM and for the control GLP-1, 250 nM to 0.013 nM.

[125I]-GIP Binding

The human GIP receptor binding assay is performed using an SPA format with WGA beads. The binding buffer contains 25 mM HEPES, pH 7.4, 2.5 mM CaCl$_2$), 1 mM MgCl$_2$, 0.1% (w/v) bacitracin, 0.003% (w/v) TWEEN®-20, and Roche Complete™ Protease Inhibitors without EDTA. Peptides and GIP are thawed and 3 fold serially diluted in 100% DMSO (10 point concentration response curves). Next, 5 µL serially diluted compound or DMSO is transferred into Corning® 3632 clear bottom assay plates containing 45 µL assay binding buffer or unlabeled GIP control (non-specific binding or NSB, at 0.25 µM final). Then, 50 µL [125I]-GIP (0.075-0.15 nM final), 50 µL human GIPR membranes (3 µg/well) and 50 µL of WGA SPA beads (100 to 150 µg/well) are added with a Biotek Multiflo dispenser. Plates are sealed and mixed on a plate shaker (setting 6) for 1 minute and read with a PerkinElmer Trilux MicroBeta® scintillation counter after 2.5 to 12 hours of incubation/settling time at room temperature. Final assay concentration ranges for peptides tested in response curves is typically 1150 to 0.058 nM or 115 nM to 0.0058 nM and for the control GIP, 250 nM to 0.013 nM.

Binding Assay Data Normalization

Raw CPM data for concentration curves of peptides, Gcg, GLP-1, or GIP are converted to percent inhibition by subtracting nonspecific binding (binding in the presence of excess unlabeled Gcg, GLP-1, or GIP, respectively) from the individual CPM values and dividing by the total binding signal, also corrected by subtracting nonspecific binding. Data are analyzed using four-parameter (curve maximum, curve minimum, IC$_{50}$, Hill slope) nonlinear regression routines (Genedata Screener, version 12.0.4, Genedata AG, Basal, Switzerland). The affinity constant (Ki) is calculated from the absolute IC$_{50}$ value based upon the equation Ki=IC$_{50}$/(1+D/K$_d$) where D=the concentration of radioligand used in the experiment, IC$_{50}$ is the concentration causing 50% inhibition of binding and Kais the equilibrium binding dissociation constant of the radioligand (described above). Values for Ki are reported as the geometric mean, with error expressed as the standard error of the mean (SEM) and n is equal to the number of independent replicates (determined in assays performed on different days). Geometric Means are calculated as follows:

Geometric Mean=10 (Arithmetic Mean of Log Ki Values))

The Ki Ratio (Ki for native control peptide/Ki for test compound) at each receptor and each species is calculated. The Ki Ratio is a rapid indication of the apparent affinity of a peptide compared to the native control peptide. A Ki Ratio <1 indicates that the test peptide has a lower affinity (higher Ki value) for the receptor than the native peptide, whereas a Ki Ratio >1 indicates that the test peptide has a higher affinity (lower Ki value) for the receptor than the native peptide.

EXAMPLE 1

CAMP Pharmacological Functional Assay in Presence of Casein

An additional set of cAMP assays are conducted in HEK293 cells expressing the human GLP-1 receptor (GLP-1R), gastric inhibitory peptide receptor (GIPR), Glucagon receptor (GcgR). Pharmacological activity of the hGLP1R/GIPR peptides are determined in HEK293 cells stably expressing the human GLP-1 receptor (GLP-1R), gastric inhibitory peptide receptor (GIPR), or GLP-2 receptor (GLP-2R). Each receptor over-expressing cell line (20 µl) is treated with the test peptide in DMEM (Gibco Cat #31053) supplemented with 0.1% Casein (Sigma Cat #C$_{4765}$), 250 µM IBMX, 1X GlutaMAX™ (Gibco Cat #35050), and 20 mM HEPES (HyClone Cat #SH30237.01) in a 20 µl assay volume. After 60 minute incubation at room temperature, the resulting increase in intracellular CAMP is quantitatively determined using the CisBio CAMP Dynamic 2 HTRF Assay Kit (62AM4PEJ). The Lysis buffer containing cAMP-d2 conjugate (20 µl) and the antibody anti-cAMP-Eu3+-Cryptate (20 µl) are then added to determine the CAMP level. After 1 hour-incubation at room temperature, HTRF signal is detected with an Envision 2104 plate reader (PerkinElmer). Each of the two incubation steps (60 minutes and 1 hour) may be conducted at about room temperature or about 37C, so long as both the 60 minute and 1 hour incubations are completed at about the same temperature for each run of the assay. Fluorescent emission at 620 nm and at 665 nm is measured and the ratio between 620 nm and at 665 nm is calculated and then are converted to nM CAMP per well using a cAMP standard curve. Dose response curves of compounds are plotted as the percentage of stimulation normalized to minimum (buffer only) and maximum (maximum concentration of each control ligand) values and analyzed using a four parameter non-liner regression fit with a variable slope (Genedata Screener 13). EC$_{50}$ is the concentration of compound causing half-maximal simulation in a dose response curve. A relative EC$_{50}$ value is derived by non-linear regression analysis using the percent maximal response vs. the concentration of peptide added, fitted to a four-parameter logistic equation.

Using Homogeneous Time Resolved Fluorescence methods, assays are conducted to determine the intrinsic potency of Example and comparator molecules performed in the presence of casein (instead of serum albumin) as a nonspecific blocker, which does not interact with the fatty acid moieties of the analyzed molecules. Intracellular cAMP levels are determined by extrapolation using a standard curve. Dose response curves of compounds are plotted as the percentage of stimulation normalized to minimum (buffer only) and maximum (maximum concentration of each control ligand) values and analyzed using a four parameter non-linear regression fit with a variable slope (Genedata Screener 13). $EC_{50}$ is the concentration of compound causing half-maximal simulation in a dose response curve. Each relative $EC_{50}$ value for the Geometric mean calculation is determined from a curve fitting.

Concentration response curves of compounds are plotted as the percentage of stimulation normalized to minimum (buffer only) and maximum (maximum concentration of each control ligand) values and analyzed using a four parameter non-liner regression fit with a variable slope (Genedata Screener 13). $EC_{50}$ is the concentration of compound causing half-maximal simulation in a dose response curve. The $EC_{50}$ summary statistics are computed as follows:

Geometric Mean:

$$GM = 10 \wedge (\text{arithmetic mean of } \log_{10} \text{ transformed } EC_{50} \text{ values}).$$

The standard error of the mean is reported:

$$SEM = \text{geometric mean} \times (\text{standard deviation of } \log_{10} \text{ transformed}$$
$$EC_{50} \text{ values/square root of the \# of runs}) \times \log_e \text{ of } 10.$$

The log transform accounts for the $EC_{50}$ values falling on a multiplicative, rather than an arithmetic scale.

Each day the assay is run, the test peptides are run plus the native ligands GIP and GLP-1 and buffer only as baseline (minimum), and the highest concentration of the respective GIP and GLP-1 standard that day is used as a maximum for the calculation.

TABLE 1

Functional activation of hGLP-1R and hGIPR in the presence of 0.1% Casein.

| Peptide Number | Compound Name | SEQ ID NO | hGIPR CAMP $EC_{50}$ ratio | hGLP1R CAMP $EC_{50}$ ratio | [hGIPR/hGLP1R] $EC_{50}$ Ratio |
|---|---|---|---|---|---|
| 1 | Y-Aib-EGT-αMeF(2F)-TSDYSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFI-(D-Glu)-YLIEGGPSSGAPPPS-NH$_2$ | 4 | 4.65 | 1.12 | 4.15 |
| 2 | Y-Aib-EGT-αMeF(2F)-TSDYSI-αMeL-LD-Orn-K((2-[2-(2-Amino-ethoxy)-ethoxy]-acetyl)$_2$-(γGlu)-CO—(CH$_2$)$_{16}$—CO$_2$H)AQ-Aib-EFI-(D-Glu)-YLIEGGPSSGAPPPS-NH$_2$ | 5 | 5.89 | 0.888 | 6.63 |
| 3 | Y-Aib-EGT-αMeF(2F)-TSDYSI-αMeL-LD-Orn-K((2-[2-(2-Amino-ethoxy)-ethoxy]-acetyl)$_2$-(γGlu)-CO—(CH$_2$)$_{18}$—CO$_2$H)AQ-Aib-EFI-(D-Glu)-YLIEGGPSSGAPPPS-NH$_2$ | 6 | 4.51 | 1.25 | 3.61 |
| 4 | Y-Aib-EGT-αMeF(2F)-TSD-4Pal-SI-αMeL-LD-Orn-K((2-[2-(2-Amino-ethoxy)-ethoxy]-acetyl)$_2$-(γGlu)-CO—(CH$_2$)$_{16}$—CO$_2$H)AQ-Aib-EFI-(D-Glu)-αMeY-LIEGGPSSGAPPPS-NH$_2$ | 7 | 5.95 | 1.41 | 4.22 |
| 8 | Y-Aib-EGTFTSDYSILLDKK((2-[2-(2-Amino-ethoxy)-ethoxy]-acetyl)$_2$-(γGlu)-CO—(CH$_2$)$_{18}$—CO$_2$H)AQ-Aib-AFIEYLIEGGPSSGAPPPS-NH$_2$ | 8 | 1.97 | 0.419 | 4.70 |
| 9 | Y-Aib-EGTFTSDYSILLDSK((2-[2-(2-Amino-ethoxy)-ethoxy]-acetyl)$_2$-(γGlu)-CO—(CH$_2$)$_{18}$—CO$_2$H)AQ-Aib-AFIEYLIEGGPSSGAPPPS-NH$_2$ | 9 | 0.768 | 0.314 | 2.45 |
| 20 | Y-Aib-EGTFTSDYSI-αMeL-LDKK((2-[2-(2-Amino-ethoxy)-ethoxy]-acetyl)$_2$-(γGlu)-CO—(CH$_2$)$_{18}$—CO$_2$H)AQ-Aib-AFIEYLIEGGPSSGAPPPS-NH$_2$ | 10 | 2.81 | 0.577 | 4.87 |
| 21 | Y-Aib-EGTFTSDYSI-αMeL-LDEK((2-[2-(2-Amino-ethoxy)-ethoxy]-acetyl)$_2$-(γGlu)-CO—(CH$_2$)$_{18}$—CO$_2$H)AQ-αMeK-AFIEYLLEGGPSSGAPPPS-NH$_2$ | 11 | 1.95 | 0.402 | 4.85 |
| 22 | Y-Aib-EGTFTSDYSI-αMeL-LDEK((2-[2-(2-Amino-ethoxy)-ethoxy]-acetyl)$_2$-(γGlu)-CO—(CH$_2$)$_{18}$—CO$_2$H)AQ-αMeK-AFIEYLLE-Aib-GPSSGAPPPS-NH$_2$ | 12 | 1.86 | 0.29 | 6.41 |
| 25 | Y-Aib-EGTFTSDYSK((2-[2-(2-Amino-ethoxy)-ethoxy]-acetyl)$_2$-(γGlu)-CO—(CH$_2$)$_{18}$—CO$_2$H)LLDKIAQ-Aib-AFIEYLIEGGPSSGAPPPS-NH$_2$ | 13 | 0.636 | 0.197 | 3.23 |

TABLE 1-continued

Functional activation of hGLP-1R and hGIPR in the presence of 0.1% Casein.

| Peptide Number | Compound Name | SEQ ID NO | hGIPR CAMP $EC_{50}$ ratio | hGLP1R CAMP $EC_{50}$ ratio | [hGIPR/ hGLP1R] $EC_{50}$ Ratio |
|---|---|---|---|---|---|
| 26 | Y-Aib-EGTFTSDYSIK((2-[2-(2-Amino-ethoxy)-ethoxy]-acetyl)$_2$-(γGlu)-CO—(CH$_2$)$_{18}$—CO$_2$H)LDKIAQ-Aib-AFIEYLIEGGPSSGAPPPS-NH$_2$ | 14 | 0.585 | 0.238 | 2.46 |
| 29 | Y-Aib-EGTFTSDYSILLDK((2-[2-(2-Amino-ethoxy)-ethoxy]-acetyl)$_2$-(γGlu)-CO—(CH$_2$)$_{18}$—CO$_2$H)IAQ-Aib-AFIEYLIEGGPSSGAPPPS-NH$_2$ | 15 | 0.536 | 0.0671 | 7.99 |
| 31 | Y-Aib-EGTFTSDYSILLDKIAK((2-[2-(2-Amino-ethoxy)-ethoxy]-acetyl)$_2$-(γGlu)-CO—(CH$_2$)$_{18}$—CO$_2$H)-Aib-AFIEYLIEGGPSSGAPPPS-NH$_2$ | 16 | 0.456 | 0.0708 | 6.44 |
| 32 | Y-Aib-EGTFTSDYSILLDKIAQ-Aib-K((2-[2-(2-Amino-ethoxy)-ethoxy]-acetyl)$_2$-(γGlu)-CO—(CH$_2$)$_{18}$—CO$_2$H)FIEYLIEGGPSSGAPPPS-NH$_2$ | 17 | 0.84 | 0.136 | 6.18 |
| 33 | Y-Aib-EGTFTSDYSILLDKIAQ-Aib-AFK((2-[2-(2-Amino-ethoxy)-ethoxy]-acetyl)$_2$-(γGlu)-CO—(CH$_2$)$_{18}$—CO$_2$H)EYLIEGGPSSGAPPPS-NH$_2$ | 18 | 0.00222 | 0.000256 | 8.67 |
| 34 | Y-Aib-EGTFTSDYSILLDKIAQ-Aib-AFIK((2-[2-(2-Amino-ethoxy)-ethoxy]-acetyl)$_2$-(γGlu)-CO—(CH$_2$)$_{18}$—CO$_2$H)YLIEGGPSSGAPPPS-NH$_2$ | 19 | 0.393 | 0.0392 | 10.03 |
| 37 | Y-Aib-EGTFTSDYSILLDKIAQ-Aib-AFIEYLIK((2-[2-(2-Amino-ethoxy)-ethoxy]-acetyl)$_2$-(γGlu)-CO—(CH$_2$)$_{18}$—CO$_2$H)GGPSSGAPPPS-NH$_2$ | 20 | 0.532 | 0.0533 | 9.98 |
| 41 | Y-Aib-EGTFTSDYSILLDKIAQ-Aib-AFIEYLIEGGPK((2-[2-(2-Amino-ethoxy)-ethoxy]-acetyl)$_2$-(γGlu)-CO—(CH$_2$)$_{18}$—CO$_2$H)SGAPPPS-NH$_2$ | 21 | 0.637 | 0.0637 | 10.00 |
| 46 | Y-Aib-EGTFTSDYSILLDKIAQ-Aib-AFIEYLIEGGPSSGAPK((2-[2-(2-Amino-ethoxy)-ethoxy]-acetyl)$_2$-(γGlu)-CO—(CH$_2$)$_{18}$—CO$_2$H)PS-NH$_2$ | 22 | 0.828 | 0.0969 | 8.54 |
| 47 | Y-Aib-EGTFTSDYSILLDKIAQ-Aib-AFIEYLIEGGPSSGAPPK((2-[2-(2-Amino-ethoxy)-ethoxy]-acetyl)$_2$-(γGlu)-CO—(CH$_2$)$_{18}$—CO$_2$H)S-NH$_2$ | 23 | 0.654 | 0.089 | 7.35 |
| 48 | Y-Aib-EGTFTSDYSILLDKIAQ-Aib-AFIEYLIEGGPSSGAPPPK((2-[2-(2-Amino-ethoxy)-ethoxy]-acetyl)$_2$-(γGlu)-CO—(CH$_2$)$_{18}$—CO$_2$H)—NH$_2$ | 23 | 0.863 | 0.0966 | 8.93 |
| 50 | Y-Aib-EGTFTSDYSILLDKK((2-[2-(2-Amino-ethoxy)-ethoxy]-acetyl)$_2$-(γGlu)-CO—(CH$_2$)$_{18}$—CO$_2$H)AQ-Aib-AFIEYLIEGGPSSG-NH$_2$ | 25 | 1.96 | 0.675 | 2.90 |
| 51 | Y-Aib-EGTFTSDYSILLDKK((2-[2-(2-Amino-ethoxy)-ethoxy]-acetyl)$_2$-(γGlu)-CO—(CH$_2$)$_{18}$—CO$_2$H)AQ-Aib-AFIEYLIEGG-NH$_2$ | 26 | 1.69 | 0.426 | 3.97 |
| 52 | Y-Aib-EGTFTSDYSI-αMeL-LDSK((2-[2-(2-Amino-ethoxy)-ethoxy]-acetyl)$_2$-(γGlu)-CO—(CH$_2$)$_{18}$—CO$_2$H)AQ-Aib-AFIEYLIEGGPSSGAPPPS-NH$_2$ | 27 | 1.4 | 0.514 | 2.72 |
| 60 | Y-Aib-EGTFTSDYSI-αMeL-LD-Aib-K((2-[2-(2-Amino-ethoxy)-ethoxy]-acetyl)$_2$-(γGlu)-CO—(CH$_2$)$_{18}$—CO$_2$H)AQ-Aib-AFIEYLIEGGPSSGAPPPS-NH$_2$ | 28 | 1.06 | 0.237 | 4.47 |
| 62 | Y-Aib-EGTFTSDYSI-αMeL-LDKK((2-[2-(2-Amino-ethoxy)-ethoxy]-acetyl)$_2$-(γGlu)-CO—(CH$_2$)$_{18}$—CO$_2$H)AQ-Aib-AFIEYLIEGG-NH$_2$ | 29 | 2.33 | 0.463 | 5.03 |
| 63 | Y-Aib-EGTFTSDYSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-AFIEYLIEGG-NH$_2$ | 30 | 1.58 | 0.386 | 4.09 |
| 64 | Y-Aib-EGTFTSDYSI-αMeL-LDSK((2-[2-(2-Amino-ethoxy)-ethoxy]-acetyl)$_2$-(γGlu)-CO—(CH$_2$)$_{18}$—CO$_2$H)AQ-Aib-AFIEYLIEGG-NH$_2$ | 31 | 1.57 | 0.429 | 3.66 |

TABLE 1-continued

Functional activation of hGLP-1R and hGIPR in the presence of 0.1% Casein.

| Peptide Number | Compound Name | SEQ ID NO | hGIPR CAMP $EC_{50}$ ratio | hGLP1R CAMP $EC_{50}$ ratio | [hGIPR/ hGLP1R] $EC_{50}$ Ratio |
|---|---|---|---|---|---|
| 65 | Y-Aib-EGTFTSDYSI-αMeL-LDTK((2-[2-(2-Amino-ethoxy)-ethoxy]-acetyl)$_2$-(γGlu)-CO—(CH$_2$)$_{18}$—CO$_2$H)AQ-Aib-AFIEYLIEGG-NH$_2$ | 32 | 1.04 | 0.233 | 4.46 |
| 66 | Y-Aib-EGTFTSDYSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-AFIEYLLEGGPSSGAPPPS-NH$_2$ | 33 | 1.89 | 0.255 | 7.41 |
| 68 | Y-Aib-EGTFTSDY-αMeS-ILLDKK((2-[2-(2-Amino-ethoxy)-ethoxy]-acetyl)$_2$-(γGlu)-CO—(CH$_2$)$_{18}$—CO$_2$H)AQ-Aib-AFIEYLIEGGPSSGAPPPS-NH$_2$ | 34 | 1.67 | 0.354 | 4.72 |
| 69 | Y-Aib-EGT-αMeF-TSDYSI-αMeL-LDKK((2-[2-(2-Amino-ethoxy)-ethoxy]-acetyl)$_2$-(γGlu)-CO—(CH$_2$)$_{18}$—CO$_2$H)AQ-Aib-AFIEYLIEGGPSSGAPPPS-NH$_2$ | 35 | 2.73 | 0.85 | 3.21 |
| 73 | Y-Aib-EGTFTSDYSILLDKIAQ-Aib-AFIEYLIK((2-[2-(2-Amino-ethoxy)-ethoxy]-acetyl)$_2$-(γGlu)-CO—(CH$_2$)$_{18}$—CO$_2$H)GG-NH$_2$ | 36 | 0.174 | 0.0225 | 7.73 |
| 80 | Y-(D-Ala)-EGTFTSDYSILLDKK((2-[2-(2-Amino-ethoxy)-ethoxy]-acetyl)$_2$-(γGlu)-CO—(CH$_2$)$_{18}$—CO$_2$H)AQ-Aib-AFIEYLIEGGPSSGAPPPS-NH$_2$ | 37 | 1.09 | 0.227 | 4.80 |
| 81 | Y-Aib-EGTFTSDY-(D-Ser)-ILLDKK((2-[2-(2-Amino-ethoxy)-ethoxy]-acetyl)$_2$-(γGlu)-CO—(CH$_2$)$_{18}$—CO$_2$H)AQ-Aib-AFIEYLIEGGPSSGAPPPS-NH$_2$ | 38 | 0.373 | 0.063 | 5.92 |
| 83 | Y-Aib-EGTFTSDYSILLDKK((2-[2-(2-Amino-ethoxy)-ethoxy]-acetyl)$_2$-(γGlu)-CO—(CH$_2$)$_{18}$—CO$_2$H)AQ-Aib-AFIEYLI-(D-Glu)-GGPSSGAPPPS-NH$_2$ | 39 | 0.804 | 0.166 | 4.84 |
| 84 | Y-Aib-EGTFTSDYSILLDKK((2-[2-(2-Amino-ethoxy)-ethoxy]-acetyl)$_2$-(γGlu)-CO—(CH$_2$)$_{18}$—CO$_2$H)AQ-Aib-AFI-(D-Glu)-YLIEGGPSSGAPPPS-NH$_2$ | 40 | 1.59 | 0.173 | 9.19 |
| 88 | Y-Pro-EGTFTSDYSILLDKK((2-[2-(2-Amino-ethoxy)-ethoxy]-acetyl)$_2$-(γGlu)-CO—(CH$_2$)$_{18}$—CO$_2$H)AQ-Aib-AFIEYLIEGGPSSGAPPPS-NH$_2$ | 41 | 0.392 | 0.0918 | 4.27 |
| 89 | Y-Aib-Aad-GTFTSDYSILLDKK((2-[2-(2-Amino-ethoxy)-ethoxy]-acetyl)$_2$-(γGlu)-CO—(CH$_2$)$_{18}$—CO$_2$H)AQ-Aib-AFIEYLIEGGPSSGAPPPS-NH$_2$ | 42 | 1.57 | 0.175 | 8.97 |
| 95 | Y-Aib-EGT-αMeF-TSDYSILLDKIAQ-Aib-AFIEYLIK((2-[2-(2-Amino-ethoxy)-ethoxy]-acetyl)$_2$-(γGlu)-CO—(CH$_2$)$_{18}$—CO$_2$H)GG-NH$_2$ | 43 | 0.145 | 0.0576 | 2.52 |
| 97 | Y-Aib-EGTFTSDYSI-αMeL-LDKIAQ-Aib-AFIEYLIK((2-[2-(2-Amino-ethoxy)-ethoxy]-acetyl)$_2$-(γGlu)-CO—(CH$_2$)$_{18}$—CO$_2$H)GG-NH$_2$ | 44 | 0.0953 | 0.0268 | 3.56 |
| 98 | Y-Aib-EGT-αMeF-TSDYSILLDKK((2-[2-(2-Amino-ethoxy)-ethoxy]-acetyl)$_2$-(γGlu)-CO—(CH$_2$)$_{18}$—CO$_2$H)AQ-Aib-AFIEYLIEGGPSSG-NH$_2$ | 45 | 2.43 | 0.384 | 6.33 |
| 99 | Y-Aib-EGT-αMeF-TSDYSI-αMeL-LDSK((2-[2-(2-Amino-ethoxy)-ethoxy]-acetyl)$_2$-(γGlu)-CO—(CH$_2$)$_{18}$—CO$_2$H)AQ-Aib-AFIEYLIEGGPSSG-NH$_2$ | 46 | 2.27 | 0.629 | 3.61 |
| 103 | Y-Aib-EGT-αMeF(2F)-TSDYSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFIEYLIEGG-NH$_2$ | 47 | 2.01 | 0.655 | 3.07 |
| 104 | Y-Aib-EGT-αMeF(2F)-TSDYSI-αMeL-LDEK((2-[2-(2-Amino-ethoxy)-ethoxy]-acetyl)$_2$-(γGlu)-CO—(CH$_2$)$_{16}$—CO$_2$H)AQ-Aib-EFIEYLIEGG-NH$_2$ | 48 | 4.93 | 1.85 | 2.66 |
| 108 | Y-Aib-EGTFTSDYSILLDKK((2-[2-(2-Amino-ethoxy)-ethoxy]-acetyl)-AOC-(γGlu)-CO—(CH$_2$)$_{18}$—CO$_2$H)AQ-Aib-AFIEYLIEGGPSSGAPPPS-NH$_2$ | 49 | 2.19 | 0.218 | 10.05 |

TABLE 1-continued

Functional activation of hGLP-1R and hGIPR in the presence of 0.1% Casein.

| Peptide Number | Compound Name | SEQ ID NO | hGIPR cAMP EC$_{50}$ ratio | hGLP1R cAMP EC$_{50}$ ratio | [hGIPR/hGLP1R] EC$_{50}$ Ratio |
|---|---|---|---|---|---|
| 109 | Y-Aib-EGTFTSDYSILLDKK(AOC-(2-[2-(2-Amino-ethoxy)-ethoxy]-acetyl)-(γGlu)-CO—(CH$_2$)$_{18}$—CO$_2$H)AQ-Aib-AFIEYLIEGGPSSGAPPPS-NH2 | 50 | 1.83 | 0.182 | 10.05 |
| 110 | Y-Aib-EGTFTSDYSILLDKK((2-[2-(2-Amino-ethoxy)-ethoxy]-acetyl)-(γGlu)-(Trx)-CO—(CH$_2$)$_{18}$—CO$_2$H)AQ-Aib-AFIEYLIEGGPSSGAPPPS-NH$_2$ | 51 | 0.929 | 0.358 | 2.59 |
| 111 | Y-Aib-EGTFTSDYSILLDKK((2-[2-(2-Amino-ethoxy)-ethoxy]-acetyl)-(Trx)-(γGlu)-CO—(CH$_2$)$_{18}$—CO$_2$H)AQ-Aib-AFIEYLIEGGPSSGAPPPS-NH$_2$ | 52 | 1.1 | 0.209 | 5.26 |
| 112 | Y-Aib-EGTFTSDYSILLDKK((2-[2-(2-Amino-ethoxy)-ethoxy]-acetyl)-(εK)-(γGlu)-CO—(CH$_2$)$_{18}$—CO$_2$H)AQ-Aib-AFIEYLIEGGPSSGAPPPS-NH$_2$ | 53 | 1.53 | 0.402 | 3.81 |
| 113 | Y-Aib-EGTFTSDYSILLDKK((2-[2-(2-Amino-ethoxy)-ethoxy]-acetyl)$_2$-(εK)-CO—(CH$_2$)$_{18}$—CO$_2$H)AQ-Aib-AFIEYLIEGGPSSGAPPPS-NH$_2$ | 54 | 1.39 | 0.275 | 5.05 |
| 114 | Y-Aib-EGTFTSDYSILLDKK((2-[2-(2-Amino-ethoxy)-ethoxy]-acetyl)-(εK)-(εK)-CO—(CH$_2$)$_{18}$—CO$_2$H)AQ-Aib-AFIEYLIEGGPSSGAPPPS-NH$_2$ | 55 | 1.65 | 0.234 | 7.05 |
| 115 | Y-Aib-EGT-αMeF-TSDYSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-AFIEYLIEGGPSSGAPPPS-NH$_2$ | 56 | 1.85 | 0.743 | 2.49 |
| 118 | Y-Aib-EGT-αMeF(2F)-TSDYSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFIEYLIEGGPSSGAPPPS-NH$_2$ | 57 | 3.42 | 1.13 | 3.03 |
| 120 | Y-Aib-cTA-GT-αMeF-TSDYSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-AFIEYLIEGGPSSGAPPPS-NH$_2$ | 58 | 1.67 | 0.319 | 5.24 |
| 123 | Y-Aib-EGT-αMeF-TSDYSI-αMeL-LDKK((2-[2-(2-Amino-ethoxy)-ethoxy]-acetyl)$_2$-(γGlu)-CO—(CH$_2$)$_{18}$—CO$_2$H)AQ-Aib-EFIEYLIEGGPSSG-NH$_2$ | 59 | 4.04 | 1.58 | 2.56 |
| 125 | Y-Aib-EGT-αMeF-TSDYSI-αMeL-LDKK((2-[2-(2-Amino-ethoxy)-ethoxy]-acetyl)$_2$-(γGlu)$_2$-CO—(CH$_2$)$_{18}$—CO$_2$H)AQ-Aib-AFIEYLIEGGPSSGAPPPS-NH$_2$ | 60 | 3.79 | 1.31 | 2.89 |
| 126 | Y-Aib-EGT-αMeF-TSDYSI-αMeL-LDKK((2-[2-(2-Amino-ethoxy)-ethoxy]-acetyl)$_2$-(γGlu)-CO—(CH$_2$)$_{18}$—CO$_2$H)AQ-Aib-AFIEYLIEAGPSSGAPPPS-NH$_2$ | 61 | 2.53 | 0.869 | 2.91 |
| 128 | Y-Aib-EGT-αMeF-TSDHSILLDKK((2-[2-(2-Amino-ethoxy)-ethoxy]-acetyl)$_2$-(γGlu)-CO—(CH$_2$)$_{18}$—CO$_2$H)AQ-Aib-AFIEYLIEGGPSSGAPPPS-NH$_2$ | 62 | 2.46 | 0.7 | 3.51 |
| 129 | Y-Aib-EGT-αMeF-TSDLSILLDKK((2-[2-(2-Amino-ethoxy)-ethoxy]-acetyl)$_2$-(γGlu)-CO—(CH$_2$)$_{18}$—CO$_2$H)AQ-Aib-AFIEYLIEGGPSSGAPPPS-NH$_2$ | 63 | 1.88 | 0.543 | 3.46 |
| 137 | Y-Aib-EGT-αMeF-TSDYSI-αMeL-LDKK((2-[2-(2-Amino-ethoxy)-ethoxy]-acetyl)$_2$-(γGlu)-CO—(CH$_2$)$_{18}$—CO$_2$H)AQ-Aib-Aad-FIEYLIEGGPSSGAPPPS-NH$_2$ | 64 | 4.47 | 1.25 | 3.58 |
| 139 | Y-Aib-EGT-αMeF-TSDYSI-αMeL-LDKK((2-[2-(2-Amino-ethoxy)-ethoxy]-acetyl)$_2$-(γGlu)-CO—(CH$_2$)$_{18}$—CO$_2$H)AQ-Aib-TFIEYLIEGGPSSGAPPPS-NH$_2$ | 65 | 3.61 | 1.13 | 3.19 |
| 140 | Y-Aib-EGT-αMeF-TSDYSI-αMeL-LDKK((2-[2-(2-Amino-ethoxy)-ethoxy]-acetyl)$_2$-(γGlu)-CO—(CH$_2$)$_{18}$—CO$_2$H)AQ-Aib-DFIEYLIEGGPSSGAPPPS-NH$_2$ | 66 | 3.76 | 1.16 | 3.24 |
| 143 | Y-Aib-EGT-αMeF-TSDYSI-αMeL-LDKK((2-[2-(2-Amino-ethoxy)-ethoxy]-acetyl)$_2$-(γGlu)-CO—(CH$_2$)$_{18}$—CO$_2$H)AQ-Aib-Aib-FIEYLIEGGPSSGAPPPS-NH$_2$ | 67 | 2.78 | 0.714 | 3.89 |

TABLE 1-continued

Functional activation of hGLP-1R and hGIPR in the presence of 0.1% Casein.

| Peptide Number | Compound Name | SEQ ID NO | hGIPR CAMP $EC_{50}$ ratio | hGLP1R CAMP $EC_{50}$ ratio | [hGIPR/ hGLP1R] $EC_{50}$ Ratio |
|---|---|---|---|---|---|
| 144 | Y-Aib-EGT-αMeF-TSDYSI-αMeL-LDKK((2-[2-(2-Amino-ethoxy)-ethoxy]-acetyl)$_2$-(γGlu)-CO—(CH$_2$)$_{18}$—CO$_2$H)AQH-Aib-FIEYLIEGGPSSGAPPPS-NH$_2$ | 68 | 3.6 | 0.851 | 4.23 |
| 147 | Y-Aib-EGT-αMeF(2F)-TSDYSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFI-Aad-YLIEGGPSSGAPPPS-NH$_2$ | 69 | 4.14 | 1.13 | 3.66 |
| 148 | Y-Aib-EGT-αMeF(2F)-TSDYSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFIAYLIEGGPSSGAPPPS-NH$_2$ | 70 | 2.7 | 0.859 | 3.14 |
| 149 | Y-Aib-EGT-αMeF(2F)-TSDYSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFIVYLIEGGPSSGAPPPS-NH$_2$ | 71 | 1.82 | 0.484 | 3.76 |
| 150 | Y-Aib-EGT-αMeF(2F)-TSDYSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFISYLIEGGPSSGAPPPS-NH$_2$ | 72 | 2.64 | 0.79 | 3.34 |
| 151 | Y-Aib-EGT-αMeF(2F)-TSDYSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFIPYLIEGGPSSGAPPPS-NH$_2$ | 73 | 0.262 | 0.0278 | 9.42 |
| 152 | Y-Aib-EGT-αMeF(2F)-TSDYSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFI-Aib-YLIEGGPSSGAPPPS-NH$_2$ | 74 | 2.57 | 0.484 | 5.31 |
| 153 | Y-Aib-EGT-αMeF(2F)-TSDYSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFIHYLIEGGPSSGAPPPS-NH$_2$ | 75 | 1.7 | 0.501 | 3.39 |
| 154 | Y-Aib-EGT-αMeF(2F)-TSDHSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFIEYLIEGGPSSGAPPPS-NH$_2$ | 76 | 5.9 | 1.23 | 4.80 |
| 155 | Y-Aib-EGT-αMeF(2F)-TSD-cTA-SI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFIEYLIEGGPSSGAPPPS-NH$_2$ | 77 | 0.584 | 0.0978 | 5.97 |
| 157 | Y-Aib-EGT-αMeF(2F)-TSD-3Pal-SI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFIEYLIEGGPSSGAPPPS-NH$_2$ | 78 | 3.15 | 1.25 | 2.52 |
| 167 | Y-Aib-EGT-αMeF(2F)-TSDHSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-TFI-(D-Glu)-YLIEGGPSSG-NH$_2$ | 79 | 0.291 | 0.0487 | 5.98 |
| 168 | Y-Aib-EGT-αMeF(2F)-TSDHSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-TFI-(D-Glu)-YLIEGGPSSGAPPPS-NH$_2$ | 80 | 0.313 | 0.0323 | 9.69 |
| 169 | Y-Aib-EGT-αMeF(2F)-TSDHSI-αMeL-LDEK((2-[2-(2-Amino-ethoxy)-ethoxy]-acetyl)$_2$-(γGlu)-CO—(CH$_2$)$_{16}$—CO$_2$H)AQ-Aib-TFI-(D-Glu)-YLIEGGPSSGAPPPS-NH$_2$ | 81 | 0.122 | 0.0136 | 8.97 |
| 171 | Y-Aib-EGT-αMeF(2F)-TSDHSI-αMeL-LD-Orn-K((2-[2-(2-Amino-ethoxy)-ethoxy]-acetyl)$_2$-(γGlu)-CO—(CH$_2$)$_{18}$—CO$_2$H)AQ-Aib-TFI-(D-Glu)-YLIEGGPSSGAPPPS-NH$_2$ | 82 | 0.471 | 0.0609 | 7.73 |
| 172 | Y-Aib-EGT-αMeF(2F)-TSDHSI-αMeL-LD-Dab-K((2-[2-(2-Amino-ethoxy)-ethoxy]-acetyl)$_2$-(γGlu)-CO—(CH$_2$)$_{18}$—CO$_2$H)AQ-Aib-TFI-(D-Glu)-YLIEGGPSSGAPPPS-NH$_2$ | 83 | 0.1 | 0.038 | 2.63 |

TABLE 1-continued

Functional activation of hGLP-1R and hGIPR in the presence of 0.1% Casein.

| Peptide Number | Compound Name | SEQ ID NO | hGIPR CAMP $EC_{50}$ ratio | hGLP1R CAMP $EC_{50}$ ratio | [hGIPR/ hGLP1R] $EC_{50}$ Ratio |
|---|---|---|---|---|---|
| 173 | Y-Aib-EGT-αMeF(2F)-TSDHSI-αMeL-LD-Dap-K((2-[2-(2-Amino-ethoxy)-ethoxy]-acetyl)$_2$-(γGlu)-CO—(CH$_2$)$_{18}$—CO$_2$H)AQ-Aib-TFI-(D-Glu)-YLIEGGPSSGAPPPS-NH$_2$ | 84 | 0.179 | 0.0373 | 4.80 |
| 174 | Y-Aib-EGT-αMeF(2F)-TSDHSI-αMeL-LDEK((2-[2-(2-Amino-ethoxy)-ethoxy]-acetyl)$_2$-CO—(CH$_2$)$_{18}$—CO$_2$H)AQ-Aib-TFI-(D-Glu)-YLIEGGPSSGAPPPS-NH$_2$ | 85 | 0.483 | 0.0968 | 4.99 |
| 176 | Y-Aib-EGT-αMeF(2F)-TSDHSI-αMeL-LDEK((2-[2-(2-Amino-ethoxy)-ethoxy]-acetyl)$_2$-(εK)-CO—(CH$_2$)$_{16}$—CO$_2$H)AQ-Aib-TFI-(D-Glu)-YLIEGGPSSGAPPPS-NH$_2$ | 86 | 0.201 | 0.0427 | 4.71 |
| 178 | Y-Aib-EGT-αMeF(2F)-TSDHSI-αMeL-LDEK((2-[2-(2-Amino-ethoxy)-ethoxy]-acetyl)$_2$-(γGlu)-CO—(CH$_2$)$_{14}$—CO$_2$H)AQ-Aib-HFI-(D-Glu)-YLIEGGPSSGAPPPS-NH$_2$ | 87 | 0.0341 | 0.00349 | 9.77 |
| 179 | Y-Aib-EGT-αMeF(2F)-TSDHSI-αMeL-LDEK((2-[2-(2-Amino-ethoxy)-ethoxy]-acetyl)$_2$-(γGlu)-CO—(CH$_2$)$_{16}$—CO$_2$H)AQ-Aib-HFI-(D-Glu)-YLIEGGPSSG-NH$_2$ | 88 | 0.0575 | 0.0169 | 3.40 |
| 180 | Y-Aib-EGT-αMeF(2F)-TSDHSI-αMeL-LDEK((2-[2-(2-Amino-ethoxy)-ethoxy]-acetyl)$_2$-(γGlu)-CO—(CH$_2$)$_{16}$—CO$_2$H)AQ-Aib-HFI-(D-Glu)-YLIEGG-NH$_2$ | 89 | 0.133 | 0.0212 | 6.27 |
| 181 | Y-Aib-EGT-αMeF(2F)-TSD-3Pal-SI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFI-(D-Glu)-YLIEGGPSSGAPPPS-NH$_2$ | 90 | 4.1 | 0.718 | 5.71 |
| 182 | Y-Aib-EGT-αMeF(2F)-TSD-4Pal-SI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFI-(D-Glu)-YLIEGGPSSGAPPPS-NH$_2$ | 91 | 4.37 | 0.873 | 5.01 |
| 183 | Y-Aib-EGT-αMeF(2F)-TSDLSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFI-(D-Glu)-YLIEGGPSSGAPPPS-NH$_2$ | 92 | 3.1 | 0.843 | 3.68 |
| 187 | Y-Aib-EGT-αMeF(2F)-TSDQSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFI-(D-Glu)-YLIEGGPSSGAPPPS-NH$_2$ | 93 | 4.61 | 0.702 | 6.57 |
| 189 | Y-Aib-EGT-αMeF(2F)-TSD-4Pal-SI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFI-Aib-YLIEGGPSSGAPPPS-NH$_2$ | 94 | 2.41 | 0.668 | 3.61 |
| 197 | Y-αMePro-EGTFTSDYSILLDEK((2-[2-(2-Amino-ethoxy)-ethoxy]-acetyl)$_2$-(γGlu)-CO—(CH$_2$)$_{16}$—CO$_2$H)AQQAFIEYLIEGGPSSG-NH$_2$ | 95 | 0.855 | 0.189 | 4.52 |
| 202 | Y-Aib-EGT-αMeF(2F)-TSD-4Pal-SI-αMeL-LDKK((2-[2-(2-Amino-ethoxy)-ethoxy]-acetyl)-(γGlu)-(2-[2-(2-Amino-ethoxy)-ethoxy]-acetyl)-CO—(CH$_2$)$_{18}$—CO$_2$H)AQ-Aib-EFI-(D-Glu)-YLIEGGPSSGAPPPS-NH$_2$ | 96 | 4.79 | 0.712 | 6.73 |
| 203 | Y-Aib-EGT-αMeF(2F)-TSD-4Pal-SI-αMeL-LDKK((2-[2-(2-Amino-ethoxy)-ethoxy]-acetyl)$_2$-(γGlu)-CO—(CH$_2$)$_{18}$—CO$_2$H)AQ-Aib-EFI-(D-Glu)-YLIEGGPSSGAPPPS-NH$_2$ | 97 | 4.95 | 0.671 | 7.38 |
| 204 | Y-Aib-EGT-αMeF(2F)-TSD-4Pal-SI-αMeL-LDEK((2-[2-(2-Amino-ethoxy)-ethoxy]-acetyl)$_2$-(γGlu)-CO—(CH$_2$)$_{16}$—CO$_2$H)AQ-Aib-EFI-(D-Glu)-YLIEGGPSSGAPPPS-NH$_2$ | 98 | 4.58 | 0.689 | 6.65 |

TABLE 1-continued

Functional activation of hGLP-1R and hGIPR in the presence of 0.1% Casein.

| Peptide Number | Compound Name | SEQ ID NO | hGIPR CAMP $EC_{50}$ ratio | hGLP1R CAMP $EC_{50}$ ratio | [hGIPR/ hGLP1R] $EC_{50}$ Ratio |
|---|---|---|---|---|---|
| 205 | Y-Aib-EGT-αMeF(2F)-TSD-4Pal-SI-αMeL-LDEK((2-[2-(2-Amino-ethoxy)-ethoxy]-acetyl)$_2$-CO—(CH$_2$)$_{16}$—CO$_2$H)AQ-Aib-EFI-(D-Glu)-YLIEGGPSSGAPPPS-NH$_2$ | 99 | 5.71 | 1.46 | 3.91 |
| 206 | Y-Aib-EGT-αMeF(2F)-TSD-4Pal-SI-αMeL-LDEK((2-[2-(2-Amino-ethoxy)-ethoxy]-acetyl)$_2$CO—(CH$_2$)$_{18}$—CO$_2$H)AQ-Aib-EFI-(D-Glu)-YLIEGGPSSGAPPPS-NH$_2$ | 100 | 4.75 | 1.42 | 3.35 |
| 207 | Y-Aib-EGT-αMeF(2F)-TSD-4Pal-SI-αMeL-LDEK((2-[2-(2-Amino-ethoxy)-ethoxy]-acetyl)$_2$-(εK)-CO—(CH$_2$)$_{18}$—CO$_2$H)AQ-Aib-EFI-(D-Glu)-YLIEGGPSSGAPPPS-NH$_2$ | 101 | 4.76 | 1.23 | 3.87 |
| 208 | Y-Aib-EGT-αMeF(2F)-TSDYSI-αMeL-LDEK((2-[2-(2-Amino-ethoxy)-ethoxy]-acetyl)$_2$-(γGlu)-CO—(CH$_2$)$_{14}$—CO$_2$H)AQ-Aib-EFI-(D-Glu)-YLIEGGPSSGAPPPS-NH$_2$ | 102 | 5.33 | 0.587 | 9.08 |
| 209 | Y-Aib-EGT-αMeF(2F)-TSDYSI-αMeL-LD-Dab-K((2-[2-(2-Amino-ethoxy)-ethoxy]-acetyl)$_2$-(γGlu)-CO—(CH$_2$)$_{16}$—CO$_2$H)AQ-Aib-EFI-(D-Glu)-YLIEGGPSSGAPPPS-NH$_2$ | 203 | 5.73 | 1.12 | 5.12 |
| 210 | Y-Aib-EGT-αMeF(2F)-TSDYSI-αMeL-LD-Dap-K((2-[2-(2-Amino-ethoxy)-ethoxy]-acetyl)$_2$-(γGlu)-CO—(CH$_2$)$_{16}$—CO$_2$H)AQ-Aib-EFI-(D-Glu)-YLIEGGPSSGAPPPS-NH$_2$ | 104 | 5.4 | 1.03 | 5.24 |
| 211 | Y-Aib-EGT-αMeF(2F)-TSDYSI-αMeL-LDKK((2-[2-(2-Amino-ethoxy)-ethoxy]-acetyl)-(γGlu)-(2-[2-(2-Amino-ethoxy)-ethoxy]-acetyl)-CO—(CH$_2$)$_{18}$—CO$_2$H)AQ-Aib-EFI-(D-Glu)-YLIEGGPSSGAPPPS-NH$_2$ | 105 | 4.59 | 1.28 | 3.59 |
| 212 | Y-Aib-EGT-αMeF(2F)-TSDYSI-αMeL-LDKK((2-[2-(2-Amino-ethoxy)-ethoxy]-acetyl)$_2$-CO—(CH$_2$)$_{18}$—CO$_2$H)AQ-Aib-EFI-(D-Glu)-YLIEGGPSSGAPPPS-NH$_2$ | 106 | 4.17 | 0.771 | 5.41 |
| 213 | Y-Aib-EGT-αMeF-TSDYSI-αMeL-LDEK((2-[2-(2-Amino-ethoxy)-ethoxy]-acetyl)$_2$-(γGlu)-CO—(CH$_2$)$_{16}$—CO$_2$H)AQ-Aib-EFI-(D-Glu)-YLIEGGPSSGAPPPS-NH$_2$ | 107 | 3.87 | 0.694 | 5.58 |
| 214 | Y-Aib-EGT-αMeF(2F)-TSDYSI-αMeL-LDEK((2-[2-(2-Amino-ethoxy)-ethoxy]-acetyl)$_2$-CO—(CH$_2$)$_{16}$—CO$_2$H)AQ-Aib-EFI-(D-Glu)-YLIEGGPSSGAPPPS-NH$_2$ | 108 | 6.92 | 1.74 | 3.98 |
| 215 | Y-Aib-EGT-αMeF(2F)-TSDYSI-αMeL-LDEK((2-[2-(2-Amino-ethoxy)-ethoxy]-acetyl)$_2$-CO—(CH$_2$)$_{18}$—CO$_2$H)AQ-Aib-EFI-(D-Glu)-YLIEGGPSSGAPPPS-NH$_2$ | 109 | 3.53 | 0.813 | 4.34 |
| 216 | Y-Aib-EGT-αMeF(2F)-TSDYSI-αMeL-LDEK((2-[2-(2-Amino-ethoxy)-ethoxy]-acetyl)$_2$-(εK)-CO—(CH$_2$)$_{18}$—CO$_2$H)AQ-Aib-EFI-(D-Glu)-YLIEGGPSSGAPPPS-NH$_2$ | 110 | 4.91 | 1.31 | 3.75 |
| 217 | Y-Aib-EGT-αMeF(2F)-TSDYSI-αMeL-LD-Dab-K((2-[2-(2-Amino-ethoxy)-ethoxy]-acetyl)$_2$-(γGlu)-CO—(CH$_2$)$_{18}$—CO$_2$H)AQ-Aib-EFI-(D-Glu)-YLIEGGPSSGAPPPS-NH$_2$ | 111 | 3.41 | 1.14 | 2.99 |
| 218 | Y-Aib-EGT-αMeF(2F)-TSDYSI-αMeL-LD-Dap-K((2-[2-(2-Amino-ethoxy)-ethoxy]-acetyl)$_2$-(γGlu)-CO—(CH$_2$)$_{18}$—CO$_2$H)AQ-Aib-EFI-(D-Glu)-YLIEGGPSSGAPPPS-NH$_2$ | 112 | 4.43 | 1.02 | 4.34 |

TABLE 1-continued

Functional activation of hGLP-1R and hGIPR in the presence of 0.1% Casein.

| Peptide Number | Compound Name | SEQ ID NO | hGIPR CAMP EC$_{50}$ ratio | hGLP1R CAMP EC$_{50}$ ratio | [hGIPR/ hGLP1R] EC$_{50}$ Ratio |
|---|---|---|---|---|---|
| 219 | Y-Aib-EGT-αMeF(2F)-TSDYSI-αMeL-LDEK((2-[2-(2-Amino-ethoxy)-ethoxy]-acetyl)$_2$-(γGlu)-CO—(CH$_2$)$_{16}$—CO$_2$H)AQ-Aib-EFI-(D-Glu)-YLIEGGPSSG-NH$_2$ | 113 | 5.86 | 1.03 | 5.69 |
| 220 | Y-Aib-EGT-αMeF(2F)-TSDYSI-αMeL-LDEK((2-[2-(2-Amino-ethoxy)-ethoxy]-acetyl)$_2$-(γGlu)-CO—(CH$_2$)$_{16}$—CO$_2$H)AQ-Aib-EFI-(D-Glu)-YLIEGG-NH$_2$ | 114 | 6.3 | 1.36 | 4.63 |
| 221 | Y-Aib-EGT-αMeF(2F)-TSDYSI-αMeL-LDEK((2-[2-(2-Amino-ethoxy)-ethoxy]-acetyl)$_2$-(γGlu)-CO—(CH$_2$)$_{16}$—CO$_2$H)AQ-Aib-EFI-(D-Glu)-YLIEGGPSSGAPPPS-NH$_2$ | 115 | 4.5 | 0.795 | 5.66 |
| 222 | Y-Aib-EGT-αMeF(2F)-TSDYSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFI-(D-Glu)--αMeY-LIEGGPSSGAPPPS-NH$_2$ | 116 | 5.84 | 1.55 | 3.77 |
| 223 | Y-Aib-EGT-αMeF(2F)-TSDYSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFIE-αMeY-LIEGGPSSGAPPPS-NH$_2$ | 117 | 2.93 | 0.962 | 3.05 |
| 224 | Y-Aib-EGT-αMeF(2F)-TSDYSI-Aib-LDEK((2-[2-(2-Amino-ethoxy)-ethoxy]-acetyl)$_2$-(γGlu)-CO—(CH$_2$)$_{18}$—CO$_2$H)AQ-Aib-EFI-(D-Glu)-YLIEGGPSSGAPPPS-NH$_2$ | 118 | 3.52 | 1.06 | 3.32 |
| 225 | Y-Aib-EGT-αMeF-TSDYSI-Aib-LDEK((2-[2-(2-Amino-ethoxy)-ethoxy]-acetyl)$_2$-(γGlu)-CO—(CH$_2$)$_{18}$—CO$_2$H)AQ-Aib-EFI-(D-Glu)-YLIEGGPSSGAPPPS-NH$_2$ | 119 | 1.99 | 0.523 | 3.80 |
| 226 | Y-Aib-EGT-αMeF(2F)-TSDYSILLDEK((2-[2-(2-Amino-ethoxy)-ethoxy]-acetyl)$_2$-(γGlu)-CO—(CH$_2$)$_{18}$—CO$_2$H)AQ-Aib-EFI-(D-Glu)-YLIEGGPSSGAPPPS-NH$_2$ | 120 | 4.27 | 1.25 | 3.42 |
| 227 | Y-Aib-EGT-αMeF-TSDYSI-αMeL-LDEK((2-[2-(2-Amino-ethoxy)-ethoxy]-acetyl)$_2$-(γGlu)-CO—(CH$_2$)$_{18}$—CO$_2$H)AQ-Aib-EFI-(D-Glu)-YLIEGGPSSGAPPPS-NH$_2$ | 121 | 4.73 | 1.07 | 4.42 |
| 228 | Y-Aib-EGT-αMeF-TSDYSI-αMeL-LDKK((2-[2-(2-Amino-ethoxy)-ethoxy]-acetyl)$_2$-(γGlu)-CO—(CH$_2$)$_{18}$—CO$_2$H)AQ-Aib-EFI-(D-Glu)-YLIEGGPSSG-NH$_2$ | 122 | 3.86 | 1.1 | 3.51 |
| 230 | Y-Aib-EGT-αMeF(2F)-TSDYSI-αMeL-LDHK((2-[2-(2-Amino-ethoxy)-ethoxy]-acetyl)$_2$-(γGlu)-CO—(CH$_2$)$_{18}$—CO$_2$H)AQ-Aib-EFI-(D-Glu)-YLIEGGPSSGAPPPS-NH$_2$ | 123 | 3.31 | 0.599 | 5.53 |
| 233 | Y-Aib-EGT-αMeF(2F)-TSD-4Pal-SI-αMeL-LD-Dab-K((2-[2-(2-Amino-ethoxy)-ethoxy]-acetyl)$_2$-(γGlu)-CO—(CH$_2$)$_{16}$—CO$_2$H)AQ-Aib-EFI-(D-Glu)-YLIEGGPSSGAPPPS-NH$_2$ | 124 | 4.95 | 0.535 | 9.25 |
| 236 | Y-Aib-EGT-αMeF(2F)-TSDYSI-αMeL-LD-Orn-K((2-[2-(2-Amino-ethoxy)-ethoxy]-acetyl)$_2$-(γGlu)-CO—(CH$_2$)$_{16}$—CO$_2$H)AQ-Aib-EFI (D-Glu)-αMeY-LIEGGPSSGAPPPS-NH$_2$ | 125 | 6.76 | 1.65 | 4.10 |
| 238 | Y-Aib-EGT-αMeF(2F)-TSDLSI-αMeL-LD-Orn-K((2-[2-(2-Amino-ethoxy)-ethoxy]-acetyl)$_2$-(γGlu)-CO—(CH$_2$)$_{16}$—CO$_2$H)AQ-Aib-EFI-(D-Glu)-αMeY-LIEGGPSSGAPPPS-NH$_2$ | 126 | 7.33 | 1.15 | 6.37 |
| 239 | Y-Aib-EGT-αMeF(2F)-TSD-4Pal-SI-αMeL-LD-Orn-K((2-[2-(2-Amino-ethoxy)-ethoxy]-acetyl)$_2$-(γGlu)-CO—(CH$_2$)$_{16}$—CO$_2$H)AQ-Aib-TFI-(D-Glu)-αMeY-LIEGGPSSGAPPPS-NH$_2$ | 127 | 5.27 | 0.987 | 5.34 |

TABLE 1-continued

Functional activation of hGLP-1R and hGIPR in the presence of 0.1% Casein.

| Peptide Number | Compound Name | SEQ ID NO | hGIPR CAMP $EC_{50}$ ratio | hGLP1R CAMP $EC_{50}$ ratio | [hGIPR/ hGLP1R] $EC_{50}$ Ratio |
|---|---|---|---|---|---|
| 241 | Y-Aib-EGT-αMeF(2F)-TSDVSI-αMeL-LD-Orn-K((2-[2-(2-Amino-ethoxy)-ethoxy]-acetyl)$_2$-(γGlu)-CO—(CH$_2$)$_{16}$—CO$_2$H)AQ-Aib-TFI-(D-Glu)-αMeY-LIEGGPSSGAPPPS-NH$_2$ | 128 | 7.12 | 1.89 | 3.77 |
| 242 | Y-Aib-EGT-αMeF(2F)-TSDVSI-αMeL-LD-Orn-K((2-[2-(2-Amino-ethoxy)-ethoxy]-acetyl)$_2$-(γGlu)-CO—(CH$_2$)$_{16}$—CO$_2$H)AQ-Aib-AFI-(D-Glu)-αMeY-LIEGGPSSGAPPPS-NH$_2$ | 129 | 5.58 | 1.96 | 2.85 |
| 243 | Y-Aib-EGT-αMeF(2F)-TSDLSI-αMeL-LD-Orn-K((2-[2-(2-Amino-ethoxy)-ethoxy]-acetyl)$_2$-(γGlu)-CO—(CH$_2$)$_{16}$—CO$_2$H)AQ-Aib-TFI-(D-Glu)-αMeY-LIEGGPSSGAPPPS-NH$_2$ | 130 | 8.69 | 1.22 | 7.12 |
| 244 | Y-Aib-EGT-αMeF(2F)-TSDLSI-αMeL-LD-Orn-K((2-[2-(2-Amino-ethoxy)-ethoxy]-acetyl)$_2$-(γGlu)-CO—(CH$_2$)$_{16}$—CO$_2$H)AQ-Aib-AFI-(D-Glu)-αMeY-LIEGGPSSGAPPPS-NH$_2$ | 131 | 8.27 | 1.29 | 6.41 |
| 246 | Y-Aib-EGT-αMeF(2F)-TSDASI-αMeL-LD-Orn-K((2-[2-(2-Amino-ethoxy)-ethoxy]-acetyl)$_2$-(γGlu)-CO—(CH$_2$)$_{16}$—CO$_2$H)AQ-Aib-AFI-(D-Glu)-αMeY-LIEGGPSSGAPPPS-NH$_2$ | 132 | 6.36 | 2.56 | 2.48 |
| 247 | Y-Aib-EGT-αMeF(2F)-TSDYSI-Aib-LD-Orn-K((2-[2-(2-Amino-ethoxy)-ethoxy]-acetyl)$_2$-(γGlu)-CO—(CH$_2$)$_{16}$—CO$_2$H)AQ-Aib-EFI-(D-Glu)-YLIEGGPSSGAPPPS-NH$_2$ | 133 | 2.58 | 0.614 | 4.20 |
| 248 | Y-Aib-EGT-αMeF(2F)-TSDYSILLD-Orn-K((2-[2-(2-Amino-ethoxy)-ethoxy]-acetyl)$_2$-(γGlu)-CO—(CH$_2$)$_{16}$—CO$_2$H)AQ-Aib-EFI-(D-Glu)-YLIEGGPSSGAPPPS-NH$_2$ | 134 | 5.08 | 0.8 | 6.35 |
| 249 | Y-Aib-EGT-αMeF(2F)-TSDYSI-Nle-LD-Orn-K((2-[2-(2-Amino-ethoxy)-ethoxy]-acetyl)$_2$-(γGlu)-CO—(CH$_2$)$_{16}$—CO$_2$H)AQ-Aib-EFI-(D-Glu)-YLIEGGPSSGAPPPS-NH$_2$ | 135 | 3.84 | 0.778 | 4.94 |
| 250 | Y-Aib-EGT-αMeF(2F)-TSDYSI-Aib-LD-Orn-K((2-[2-(2-Amino-ethoxy)-ethoxy]-acetyl)$_2$-(γGlu)-CO—(CH$_2$)$_{18}$—CO$_2$H)AQ-Aib-EFI-(D-Glu)-YLIEGGPSSGAPPPS-NH$_2$ | 136 | 4.27 | 0.985 | 4.34 |
| 251 | Y-Aib-EGT-αMeF(2F)-TSD-4Pal-SI-αMeL-LD-Orn-K((2-[2-(2-Amino-ethoxy)-ethoxy]-acetyl)$_2$-(εK)-CO—(CH$_2$)$_{18}$—CO$_2$H)AQ-Aib-AFI-(D-Glu)-αMeY-LIEGGPSSGAPPPS-NH$_2$ | 137 | 5.12 | 1.37 | 3.74 |
| 264 | Y-Aib-EGT-αMeF(2F)-TSD-4Pal-SI-αMeL-LD-Orn-K((2-[2-(2-Amino-ethoxy)-ethoxy]-acetyl)$_2$-(γGlu)-CO—(CH$_2$)$_{16}$—CO$_2$H)AQ-Aib-EFI-(D-Glu)-αMeY-LIEGGPSSG-NH$_2$ | 138 | 8.4 | 3.19 | 2.63 |
| 265 | Y-Aib-EGT-αMeF(2F)-TSD-4Pal-SI-αMeL-LD-Orn-K((2-[2-(2-Amino-ethoxy)-ethoxy]-acetyl)$_2$-(γGlu)-CO—(CH$_2$)$_{16}$—CO$_2$H)AQ-Aib-EFI-(D-Glu)-αMeY-LIEGG-NH$_2$ | 139 | 9.77 | 3.27 | 2.99 |

As demonstrated by data in Table 1, the peptides, normalized to baseline and native peptides, stimulate cAMP from human GLP-1R and GIPR in the presence of 0.1% casein with a GIP potency ratio that is about 2.5 to about 10 times the GLP-1 receptor potency.

In an embodiment, is a GIP:GLP-1 coagonist compound wherein the peptide is a potent GIPR/GLP-1R dual agonist that is a partial agonist on the GLP-IR as shown by Cell Membrane Guanosine 5'-(gamma-thio) Triphosphate-[35S] (GTPγS) Binding Assay, and a partial agonist on the GLP-IR as shown by the β-arrestin-2 recruitment assay. An embodiment, is a GIP;GLP-1 co-agonist compound, or pharmaceutically acceptable salt thereof, wherein the compound stimulates GLP-1R induced activation of Gαs in the GLP-1R HEK293 Cell Membrane Guanosine 5'-(gamma-thio) Triphosphate-[35S] (GTPγS) Binding Assay. In an embodiment, is a compound showing partial agonism of 75% or less in the GLP-1R HEK293 Cell Membrane Guanosine 5'-

(gamma-thio) Triphosphate-[35S] (GTPγS) Binding Assay, and 35% or less in the GLP-CHO Cell β-Arrestin.Recruitment Assay. In an embodiment is a method for treating diabetes comprising administering an effective amount of a compound showing partial agonism of 75% or less in the GLP-1R HEK293 Cell Membrane Guanosine 5'-(gamma-thio) Triphosphate-[35S] (GTPYS) Binding Assay, and an effective amount of a compound that is a GIP agonist. In an embodiment, the compound showing partial agonism in the GLP-1R HEK293 Cell Membrane Guanosine 5'-(gamma-thio) Triphosphate-[35S] (GTPγS) Binding Assay is co-administered with a compound having GIP agonist activity. In an embodiment, the compound showing partial agonism in the GLP-1R HEK293 Cell Membrane Guanosine 5'-(gamma-thio) Triphosphate-[35S] (GTPγS) Binding Assay is administered as an active agent within one week before or after a compound having GIP agonist activity. In an embodiment, a method for treating diabetes comprises administering an effective amount of a compound showing 35% or less in the GLP-CHO Cell β-Arrestin. Recruitment Assay and administering an effective amount of a compound showing partial agonism of 75% or less in the GLP-1R HEK293 Cell Membrane Guanosine 5'-(gamma-thio) Triphosphate-[$^{35}$S] (GTPγS) Binding Assay.

GLP-1R HEK293 Cell Membrane [35S] GTPYS Binding Assay

The GLP-1 receptor is a G-protein coupled receptor that increases GTP-bound $Gα_s$ upon ligand induced receptor activation. The potency of peptides to stimulate-GLP-1R induced activation of Gas is determined using preparations of purified membranes from HEK293 cells expressing the human GLP-1R. The assay is performed similarly to that as previously described (Bueno et al., J. Biol. Chem., (2016) 291, 10700 and Willard et al., Mol. Pharmacol. (2012) 82,1066). The test peptides are solubilized in DMSO and diluted in reaction buffer containing 5 µg of membrane in 20 mM HEPES pH 7.4, 50 mM NaCl, 5 mM $MgCl_2$, 40 µg/ml saponin, 0.1% BSA, and 500 µM 35S-labeled GTPγS for 30 minutes at room temperature. Reactions are terminated by addition of 0.2% Nonidet P-40 detergent containing rabbit anti-Gas polyclonal antibody and 0.5 mg of anti-rabbit polyvinyltoluene beads. Mixtures are developed for 30 minutes, centrifuged at 80×g for 10 minutes, and counted for 1 minute/well using a MicroBeta TriLux instrument. Peptide concentration-response curves fit to a four-parameter logistic model to calculate potency as an $EC_{50}$. Data normalization to % stimulation is performed using DMSO and GLP-1 (7-36) as minimum and maximum controls for the receptor (Campbell et al, Assay Guidance Manual 2017). The potency of a sample peptide to stimulate GIPR induced activation of Gas is determined. Assay results identify a petpide that is a partial agonist on the GLP-1R with respect to GLP-1R induced activation of Gas.

GLP-1R CHO Cell β-Arrestin Recruitment Assay

Activated G-protein coupled receptors can interact with the β-arrestin family of signalling proteins. The potency of peptides for GLP-1R induced arrestin recruitment is determined using the PathHunter Enzyme Fragment Complementation approach substantially as described (von Degenfeld et al., FASEB J., 2007 (14): 3819-26 and Hamdouchi et al., J. Med Chem., 2016 59 (24): 10891-10916). CHO-K1 cells expressing Pro-Link-tagged Human GLP-1R and enzyme-acceptor-tagged β-arrestin-2 may be obtained from DiscoveRx and prepared as assay-ready frozen cells. Test peptides are solubilized in DMSO and serial dilutions are perfomed using the Echo acoustic dispenser (LabCyte). Assay media is the PathHunter Cell Assay Buffer (DiscoveRx) containing 0.1% w/v hydrolyzed Casein (Sigma). 100 nl of peptide is dispensed into 10 µl of assay media in a 384 well plate and then 10 µl of cells in assay media are added to give 5000 cells per well. Plates are incubated for 90 minutes in a 37'C/5% $CO_2$ incubator and 10 µl of PathHunter detection reagent is added (DiscoveRx) and plates are incubated at room temperature for 60 minutes. Luminescence signal is measured. Peptide concentration-response curves fit to a four-parameter logistic model to calculate potency as an $EC_{50}$. Data normalization to % stimulation is performed using DMSO and GLP-1 (7-36) as minimum and maximum controls (Campbell et al, Assay Guidance Manual 2017). The potency of a sample peptide to stimulate GLP-1R induced β-arrestin recruitment is determined. Assay results identify a peptide that is a partial agonist on the GLP-1R with respect to β-arrestin-2 recruitment.

Clinical Study to Determine GIP:GLP-1 Peptide Maintenance Dose

A 6-month (26-week) Phase 2 double-blind clinical study is designed to evaluate the safety, efficacy, and PK/PD of 4 dose levels (1 mg, 5 mg, 10 mg and 15 mg respectively) of a GIP:GLP-1 Peptide administered once weekly by subcutaneous injection compared with dulaglutide 1.5 mg administered once weekly (QW) and placebo QW in patients with T2DM who have inadequate glycemic control with diet and exercise with or without a stable dose of metformin. The GIP:GLP Peptide dose was up-titrated to the maintenance dose using the following weekly dose increments:

| GIP:GLP-1 Peptide dose: | Weekly GIP:GLP-1 Peptide Dose Increments: |
|---|---|
| 1 mg | Week 0-26: 1 mg QW |
| 5 mg | Week 0-26: 5 mg QW |
| 10 mg | Week 0: 5 mg |
|  | Week 1: 5 mg |
|  | Week 2-26: 10 mg |
| 15 mg | Week 0: 5 mg |
|  | Week 1: 5 mg |
|  | Week 2: 10 mg |
|  | Week 3: 10 mg |
|  | Week 4: 10 mg |
|  | Week 5: 10 mg |
|  | Week 6-26: 15 mg |

The study also has a 4-week follow up period. In addition to safety and efficacy for treating T2DM, efficacy endpoints include the effect of the GIP:GLP-1 Peptide on HbA1c, FBG, body weight, lipids, and waist circumference compared with placebo and with dulaglutide 1.5 mg. The study also evaluates the effect of the GIP:GLP-1 Peptide on GI tolerability, hypoglycemia, hypersensitivity reactions, and pancreatic safety, as well as the development of treatment-emergent anti-drug antibodies. Model-based dose response analyses are performed to predict potential for significant HbA1c lowering and weight loss in longer studies.

Statistical Analyses:

Efficacy: The primary efficacy outcome of HbA1c change from baseline to the 26-week endpoint is analyzed using a Bayesian dose-response model. Analyses are performed on the intention to treat population (mITT) analysis set. Supportive analysis of the primary efficacy outcome for the mITT dataset are the model for post-baseline measures (MMRM) with body mass index (BMI) (<30 kg/m$^2$, ≥30 kg/m$^2$), metformin use, treatment, visit, and treatment-by-visit interaction as fixed effects, baseline HbA1c as a covariate, and patient as a random effect.

The mean weight change from baseline at 12 and 26 weeks, along with the mean change from baseline of HbA1c at 12 weeks, is analyzed using similar dose-response models as the primary analyses. The percentages of patients with ≥5% or ≥10% body weight loss, reaching the HbA1c target of ≤6.5% or ≤7.0% at 26 weeks, or requiring rescue therapy are analyzed using logistic regression with fixed effects of treatment and strata, and baseline as a covariate. The changes from baseline in FBG (fasting blood glucose), SMBG (self-monitored blood glucose) levels, waist circumference, and mean percentage change in lipids from baseline to 12 and 26 weeks are analyzed using a similar MMRM to the one used for the primary analyses.

Clinical Study to Determine GIP:GLP-1 Peptide Titration Schedule

This is a 12-week treatment with a 1 week screening (Visit 1) followed by a 1 week lead-in (Visit 2), then 12 weeks of treatment (Visits 3-10, including telephone visits), then followed by 4-week safety follow-up. It is a Phase 2 study designed to examine the efficacy and tolerability of subcutaneously once-weekly administration of a GIP:GLP-1 Peptide compared with placebo in patients with type 2 diabetes who have inadequate glycemic control with diet and exercise alone or with a stable dose of metformin. The study was designed per below and conducted to refine the titration scheme.

| GIP:GLP-1 Peptide Dose: | Weekly GIP:GLP-1 Peptide Dose Increments: |
|---|---|
| Placebo | Week 1-12 |
| Group 1 | Weeks 1-2: 2.5 mg |
|  | Weeks 3-4: 5 mg |
|  | Weeks 5-8: 10 mg |
|  | Weeks 9-12: 15 mg |
| Group 2 | Weeks 1-4: 2.5 mg |
|  | Weeks 5-8: 7.5 mg |
|  | Weeks 9-12: 15 mg |
| Group 3 | Weeks 1-4: 4 mg |
|  | Weeks: 5-8: 8 mg |
|  | Weeks 9-12: 12 mg |

```
Amino Acid Sequences
GIP (Human)
                                         SEQ ID NO: 1
YAEGTFISDYSIAMDKIHQQDFVNWLLAQKGKKNDWKHNITQ GLP-1 (7-36) (Human)
                                         SEQ ID NO: 2
HAEGTFTSDVSSYLEGQAAKEFIAWLVKGR-NH2

SEQ ID NO: 3
```
$R_1X_1X_2X_3GTX_6TSDX_{10}X_{11}X_{12}X_{13}X_{14}DX_{16}X_{17}AX_{19}$ $X_{20}X_{21}X_{22}X_{23}X_{24}X_{25}X_{26}X_{27}X_{28}X_{29}X_{30}X_{31}$

---

SEQUENCE LISTING

```
Sequence total quantity: 139
SEQ ID NO: 1            moltype = AA  length = 42
FEATURE                 Location/Qualifiers
source                  1..42
                        mol_type = protein
                        organism = Homo sapiens
SEQUENCE: 1
YAEGTFISDY SIAMDKIHQQ DFVNWLLAQK GKKNDWKHNI TQ              42

SEQ ID NO: 2            moltype = AA  length = 30
FEATURE                 Location/Qualifiers
MOD_RES                 30
                        note = AMIDATION
source                  1..30
                        mol_type = protein
                        organism = Homo sapiens
SEQUENCE: 2
HAEGTFTSDV SSYLEGQAAK EFIAWLVKGR                            30

SEQ ID NO: 3            moltype = AA  length = 31
FEATURE                 Location/Qualifiers
REGION                  1..31
                        note = Synthetic construct; Formula I
VARIANT                 1
                        note = Xaa at position 1 is selected from the group
                          consisting of Y, H, D-Tyr, F, desH, and desY, or Xaa at
                          position 1 and Xaa at position 2 combine to form
                          desH-psi[NHCO]-Aib
MOD_RES                 1
                        note = The N-terminus of Xaa at position 1 is modified with
                          R1, wherein the modification is selected from the group
                          consisting of Ac and absent.
VARIANT                 2
                        note = Xaa at position 2 is selected from the group
                          consisting of Aib, alpha-MeP, A, P, and D-Ala, or Xaa at
                          position 1 combines with Xaa at position 2 to form
                          desH-psi[NHCO]-Aib
VARIANT                 3
                        note = Xaa at position 3 is selected from the group of E,
                          N, Aad, and cTA
VARIANT                 6
                        note = Xaa at position 6 is selected from the group
                          consisting of F, alpha-MeF, and alpha-MeF(2F)
```

-continued

| | |
|---|---|
| VARIANT | 10 |
| | note = Xaa at position 10 is selected from the group consisting of A, L, H, 3Pal, 4Pal, V, Y, E, alpha-MeF, alpha-MeF(2F), I, alpha-MeY, Q, D-His, D-Tyr, cTA, and K |
| VARIANT | 10 |
| | note = when Xaa at position 10 is K, then K is chemically modified by conjugation of the epsilon-amino group of the K side chain with (2-[2-(2-amino-ethoxy)-ethoxy]-acetyl)2-(gamma-Glu)-CO-(CH2)q-CO2 H |
| REGION | 10..31 |
| | note = MISC_FEATURE - When Xaa is K(2-[2-(2-amino-ethoxy)-ethoxy]-acetyl)2-(gamma-Glu)-CO-(CH2)q-CO 2H at positions 10, 12, 13, 14, 16, 17, 19, 20, 21, 23, 24, 26, 27, 28, 29, 30 or 31, q is 14, 15, 16, 17, 18, 19 or 20. |
| VARIANT | 11 |
| | note = Xaa at position 11 is selected from the group consisting of S, alpha-MeS, or D-Ser |
| VARIANT | 12 |
| | note = Xaa at position 12 is selected from the group consisting of I, S, D-Ile, and K |
| MOD_RES | 12 |
| | note = when Xaa at position 12 is K, then K is chemically modified by conjugation of the epsilon-amino group of the K side chain with (2-[2-(2-amino-ethoxy)-ethoxy]-acetyl)2-(gamma-Glu)-CO-(CH2)q-CO2 H |
| VARIANT | 13 |
| | note = Xaa at position 13 is selected from the group consisting of Nle, Aib, L, alpha-MeL, and K |
| MOD_RES | 13 |
| | note = when Xaa at position 13 is K, then K is chemically modified by conjugation of the epsilon-amino group of the K side chain with (2-[2-(2-amino-ethoxy)-ethoxy]-acetyl)2-(gamma-Glu)-CO-(CH2)q-CO2 H |
| VARIANT | 14 |
| | note = Xaa at position 14 is selected from the group consisting of L and K, wherein K is conjugated to a C16-C22 fatty acid wherein said fatty acid is optionally conjugated to said K via a linker |
| VARIANT | 16 |
| | note = Xaa at position 16 is selected from the group consisting of E, Orn, Dab, Dap, S, T, H, Aib, alpha-MeK, R, and K |
| MOD_RES | 16 |
| | note = when Xaa at position 16 is K, then K is optionally chemically modified by conjugation of the epsilon-amino group of the K side chain with (2-[2-(2-amino-ethoxy)-ethoxy]-acetyl)2-(gamma-Glu)-CO-(CH2)q-CO2H |
| VARIANT | 17 |
| | note = Xaa at position 17 is selected from the group consisting of K, Q, I, and an amino acid conjugated to a C16-C22 fatty acid wherein said fatty acid is optionally conjugated to said amino acid via a linker |
| VARIANT | 19 |
| | note = Xaa at position 19 is selected from the group consisting of Q, A, and K |
| MOD_RES | 19 |
| | note = when Xaa at position 19 is K, then K is chemically modified by conjugation of the epsilon-amino group of the K side chain with (2-[2-(2-amino-ethoxy)-ethoxy]-acetyl)2-(gamma-Glu)-CO-(CH2)q-CO2H |
| VARIANT | 20 |
| | note = Xaa at position 20 is selected from the group consisting of Aib, Q, H, R, K, and alpha-MeK |
| MOD_RES | 20 |
| | note = when Xaa at position 20 is K, then K is optionally chemically modified by conjugation of the epsilon-amino group of the K side chain with (2-[2-(2-amino-ethoxy)-ethoxy]-acetyl)2-(gamma-Glu)-CO-(CH2)q-CO2H |
| VARIANT | 21 |
| | note = Xaa at position 21 is selected from the group consisting of H, Aad, D, Aib, T, A, E, I, and K |
| MOD_RES | 21 |
| | note = when Xaa at position 21 is K, then K is chemically modified by conjugation of the epsilon-amino group of the |

|          |                                                                                                                                                                                                                                                       |
| -------- | ----------------------------------------------------------------------------------------------------------------------------------------------------------------------------------------------------------------------------------------------------- |
|          | K side chain with K(2-[2-(2-amino-ethoxy)-ethoxy]-acetyl)2-(gamma-Glu)-CO-(CH 2)q-CO 2H                                                                                                                                                                |
| VARIANT  | 22                                                                                                                                                                                                                                                    |
|          | note = Xaa at position 22 is selected from the group consisting of F and alpha-MeF                                                                                                                                                                    |
| VARIANT  | 23                                                                                                                                                                                                                                                    |
|          | note = Xaa at position 23 is selected from the group consisting of I, L, A, G, F, H, E, V, and K                                                                                                                                                      |
| MOD_RES  | 23                                                                                                                                                                                                                                                    |
|          | note = when Xaa at position 23 is K, then K is chemically modified by conjugation of the epsilon-amino group of the K side chain with K(2-[2-(2-amino-ethoxy)-ethoxy]-acetyl)2-(gamma-Glu)-CO-(CH 2)q-CO 2H                                           |
| VARIANT  | 24                                                                                                                                                                                                                                                    |
|          | note = Xaa at position 24 is selected from the group consisting of S, Aad, D-Glu, E, Aib, H, V, A, Q, D, P, and K                                                                                                                                     |
| MOD_RES  | 24                                                                                                                                                                                                                                                    |
|          | note = when Xaa at position 24 is K, then K is chemically modified by conjugation of the epsilon-amino group of the K side chain with K(2-[2-(2-amino-ethoxy)-ethoxy]-acetyl)2-(gamma-Glu)-CO-(CH 2)q-CO 2H                                           |
| VARIANT  | 25                                                                                                                                                                                                                                                    |
|          | note = Xaa at position 25 is selected from the group consisting of Y or alpha-MeY                                                                                                                                                                     |
| VARIANT  | 26                                                                                                                                                                                                                                                    |
|          | note = Xaa at position 26 is selected from the group consisting of L, alpha-MeL, and K                                                                                                                                                                |
| MOD_RES  | 26                                                                                                                                                                                                                                                    |
|          | note = when Xaa at position 26 is K, then K is chemically modified by conjugation of the epsilon-amino group of the K side chain with (2-[2-(2-amino-ethoxy)-ethoxy]-acetyl)2-(gamma-Glu)-CO-(CH2)q-CO2 H                                             |
| VARIANT  | 27                                                                                                                                                                                                                                                    |
|          | note = Xaa at position 27 is selected from the group consisting of L, I, and K                                                                                                                                                                        |
| MOD_RES  | 27                                                                                                                                                                                                                                                    |
|          | note = when Xaa at position 27 is K, then K is chemically modified by conjugation of the epsilon-amino group of the K side chain with (2-[2-(2-amino-ethoxy)-ethoxy]-acetyl)2-(gamma-Glu)-CO-(CH2)q-CO2 H                                             |
| VARIANT  | 28                                                                                                                                                                                                                                                    |
|          | note = Xaa at position 28 is selected from the group consisting of E, A, S, D-Glu, and K                                                                                                                                                              |
| MOD_RES  | 28                                                                                                                                                                                                                                                    |
|          | note = when Xaa at position 28 is K, then K is chemically modified by conjugation of the epsilon-amino group of the K side chain with (2-[2-(2-amino-ethoxy)-ethoxy]-acetyl)2-(gamma-Glu)-CO-(CH2)q-CO2 H                                             |
| VARIANT  | 29                                                                                                                                                                                                                                                    |
|          | note = Xaa at position 29 is selected from the group consisting of Aib, G, A, and K                                                                                                                                                                   |
| MOD_RES  | 29                                                                                                                                                                                                                                                    |
|          | note = when Xaa at position 29 is K, then K is chemically modified by conjugation of the epsilon-amino group of the K side chain with (2-[2-(2-amino-ethoxy)-ethoxy]-acetyl)2-(gamma-Glu)-CO-(CH2)q-CO2 H                                             |
| VARIANT  | 30                                                                                                                                                                                                                                                    |
|          | note = Xaa at position 30 is selected from the group consisting of C, G, G-R2, and K, wherein R2 is a modification of the C-terminal group, wherein the modification is NH2 or absent, wherein if X30 is G-R2, then X31 is absent.                    |
| MOD_RES  | 30                                                                                                                                                                                                                                                    |
|          | note = when Xaa at position 30 is K, then K is chemically modified by conjugation of the epsilon-amino group of the K side chain with (2-[2-(2-amino-ethoxy)-ethoxy]-acetyl)2-(gamma-Glu)-CO-(CH2)q-CO2 H                                             |
| VARIANT  | 31                                                                                                                                                                                                                                                    |
|          | note = Xaa at position 31 is absent or is selected from the group consisting of PX32X33X34-R2,                                                                                                                                                        |

```
                         PX32X33X34X35X36X37X38X39-R2,
                         PX32X33X34X35X36X37X38X39X40-R2,
                         K[(2-[2-(2-amino-ethoxy)-ethoxy]-acetyl)2-(gamma-Glu)-CO-(C
                         H2)q-CO2H]X32X33X34-R2,
                         K[(2-[2-(2-amino-ethoxy)-ethoxy]-acetyl)2-(gamma-Glu)-CO-(C
                         H2)q-CO2H]X32X33X34X35X36X37X38X39-R2, and
                         K[(2-[2-(2-amino-ethoxy)-ethoxy]-acetyl)2-(gamma-Glu)-CO-(C
                         H2)q-CO2H]X32X33X34X35X36X37X38X39X40-R2
SITE                     31
                         note = MISC_FEATURE - wherein no more than one of X10, X12,
                           X13, X14, X16, X17, X19, X20, X21, X23, X24, X26, X27,
                           X28, X29, X30, X31, X32, X33, X34, X35, X36, X37, X38,
                           X39, and X40 may be a substituent that contains a fatty
                           acid
SITE                     31
                         note = MISC_FEATURE - wherein no more than one of X30, X34,
                           X39, and X40 may be C
SITE                     31
                         note = MISC_FEATURE - wherein if one of X30, X34, X39, and
                           X40 is C, then none of X10, X12, X13, X14, X16, X17, X19,
                           X20, X21, X23, X24, X26, X27, X28, X29, X30, X31, X32,
                           X33, X34, X35, X36, X37, X38, X39, and X40 is a
                           substituent that contains a fatty acid
MOD_RES                  31
                         note = Xaa at position 31 is modified with R2, wherein the
                           modification is NH2 to form a C-terminal amide or absent
source                   1..31
                         mol_type = protein
                         organism = synthetic construct
SEQUENCE: 3
XXXGTXTSDX XXXXDXXAXX XXXXXXXXXX X                                           31

SEQ ID NO: 4             moltype = AA  length = 39
FEATURE                  Location/Qualifiers
REGION                   1..39
                         note = Synthetic Construct
SITE                     2
                         note = MISC_FEATURE - Xaa at position 2 is Aib
SITE                     6
                         note = MISC_FEATURE - Xaa at position 6 is alpha-MeF(2F)
SITE                     13
                         note = MISC_FEATURE - Xaa at position 13 is alpha-MeL
MOD_RES                  17
                         note = K at position 17 is chemically modified by
                           conjugation of the epsilon-amino group of the K side chain
                           with
                           (2-[2-(2-amino-ethoxy)-ethoxy]-acetyl)2-(gamma-Glu)-CO-(CH2
                           )18-CO2H
SITE                     20
                         note = MISC_FEATURE - Xaa at position 20 is Aib
SITE                     24
                         note = MISC_FEATURE - Xaa at position 24 is D-Glu
MOD_RES                  39
                         note = The Serine at position 39 is amidated
source                   1..39
                         mol_type = protein
                         organism = synthetic construct
SEQUENCE: 4
YXEGTXTSDY SIXLDEKAQX EFIXYLIEGG PSSGAPPPS                                    39

SEQ ID NO: 5             moltype = AA  length = 39
FEATURE                  Location/Qualifiers
REGION                   1..39
                         note = Synthetic Construct
SITE                     2
                         note = MISC_FEATURE - Xaa at position 2 is Aib
SITE                     6
                         note = MISC_FEATURE - Xaa at position 6 is alpha-MeF(2F)
SITE                     13
                         note = MISC_FEATURE - Xaa at position 13 is alpha-MeL
SITE                     16
                         note = MISC_FEATURE - Xaa at position 16 is Orn
MOD_RES                  17
                         note = K at position 17 is chemically modified by
                           conjugation of the epsilon-amino group of the K side chain
                           with
                           (2-[2-(2-amino-ethoxy)-ethoxy]-acetyl)2-(gamma-Glu)-CO-(CH2
                           )16-CO2H
SITE                     20
```

```
                        note = MISC_FEATURE - Xaa at position 20 is Aib
SITE                    24
                        note = MISC_FEATURE - Xaa at position 24 is D-Glu
MOD_RES                 39
                        note = The Serine at position 39 is amidated
source                  1..39
                        mol_type = protein
                        organism = synthetic construct
SEQUENCE: 5
YXEGTXTSDY SIXLDXKAQX EFIXYLIEGG PSSGAPPPS                              39

SEQ ID NO: 6            moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is alpha-MeF(2F)
SITE                    13
                        note = MISC_FEATURE - Xaa at position 13 is alpha-MeL
SITE                    16
                        note = MISC_FEATURE - Xaa at position 16 is Orn
MOD_RES                 17
                        note = K at position 17 is chemically modified by
                         conjugation of the epsilon-amino group of the K side chain
                         with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
SITE                    24
                        note = MISC_FEATURE - Xaa at position 24 is D-Glu
SITE                    39
                        note = MISC_FEATURE - The Serine at position 39 is amidated
source                  1..39
                        mol_type = protein
                        organism = synthetic construct
SEQUENCE: 6
YXEGTXTSDY SIXLDXKAQX EFIXYLIEGG PSSGAPPPS                              39

SEQ ID NO: 7            moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is alpha-MeF(2F)
SITE                    10
                        note = MISC_FEATURE - Xaa at position 10 is 4Pal
SITE                    13
                        note = MISC_FEATURE - Xaa at position 13 is alpha-MeL
SITE                    16
                        note = MISC_FEATURE - Xaa at position 16 is Orn
MOD_RES                 17
                        note = K at position 17 is chemically modified by
                         conjugation of the epsilon-amino group of the K side chain
                         with
                         (2-[2-(2-amino-ethoxy)-ethoxy]-acetyl)2-(gamma-Glu)-CO-(CH2
                         )16-CO 2H
SITE                    20
                        note = MISC_FEATURE - Xaa at position 20 is Aib
SITE                    24
                        note = MISC_FEATURE - Xaa at position 24 is D-Glu
SITE                    25
                        note = MISC_FEATURE - Xaa at position 25 is alpha-MeY
MOD_RES                 39
                        note = The Serine at position 39 is amidated
source                  1..39
                        mol_type = protein
                        organism = synthetic construct
SEQUENCE: 7
YXEGTXTSDX SIXLDXKAQX EFIXXLIEGG PSSGAPPPS                              39

SEQ ID NO: 8            moltype = AA  length = 39
FEATURE                 Location/Qualifiers
REGION                  1..39
                        note = Synthetic Construct
```

```
SITE                    2
                        note = MISC_FEATURE - Xaa at position 2 is Aib
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 39
                        note = Ser at position 39 is amidated
source                  1..39
                        mol_type = protein
                        organism = synthetic construct
SEQUENCE: 8
YXEGTFTSDY SILLDKKAQX AFIEYLIEGG PSSGAPPPS                                    39

SEQ ID NO: 9            moltype = AA   length = 39
FEATURE                 Location/Qualifiers
REGION                  1..39
                        note = Synthetic Construct
SITE                    2
                        note = MISC_FEATURE - Xaa at position 2 is Aib
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 39
                        note = Ser at position 39 is amidated
source                  1..39
                        mol_type = protein
                        organism = synthetic construct
SEQUENCE: 9
YXEGTFTSDY SILLDSKAQX AFIEYLIEGG PSSGAPPPS                                    39

SEQ ID NO: 10           moltype = AA   length = 39
FEATURE                 Location/Qualifiers
REGION                  1..39
                        note = Synthetic Construct
SITE                    2
                        note = MISC_FEATURE - Xaa at position 2 is Aib
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 39
                        note = Ser at position 39 is amidated
source                  1..39
                        mol_type = protein
                        organism = synthetic construct
SEQUENCE: 10
YXEGTFTSDY SIXLDKKAQX AFIEYLIEGG PSSGAPPPS                                    39

SEQ ID NO: 11           moltype = AA   length = 39
FEATURE                 Location/Qualifiers
REGION                  1..39
                        note = Synthetic Construct
SITE                    2
                        note = MISC_FEATURE - Xaa at position 2 is Aib
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
```

|  |  |
|---|---|
| MOD_RES | note = MISC_FEATURE - Xaa at position 20 is alpha-methyl-Lys<br>39<br>note = Ser at position 39 is amidated |
| source | 1..39<br>mol_type = protein<br>organism = synthetic construct |

SEQUENCE: 11
YXEGTFTSDY SIXLDEKAQX AFIEYLLEGG PSSGAPPPS                              39

|  |  |
|---|---|
| SEQ ID NO: 12 | moltype = AA  length = 39 |
| FEATURE | Location/Qualifiers |
| REGION | 1..39<br>note = Synthetic Construct |
| SITE | 2<br>note = MISC_FEATURE - Xaa at position 2 is Aib |
| SITE | 13<br>note = MISC_FEATURE - Xaa at position 13 is alpha-methyl-Leu |
| MOD_RES | 17<br>note = Lys at position 17 is chemically modified by<br> conjugation of the epsilon-amino group of the Lys side<br> chain with<br> (2-[2-(2-amino-ethoxy)-ethoxy]-acetyl)2-(gamma-Glu)-CO-(CH2<br> )18-CO 2H |
| SITE | 20<br>note = MISC_FEATURE - Xaa at position 20 is alpha-methyl-Lys |
| SITE | 29<br>note = MISC_FEATURE - Xaa at position 29 is Aib |
| MOD_RES | 39<br>note = Ser at position 39 is amidated |
| source | 1..39<br>mol_type = protein<br>organism = synthetic construct |

SEQUENCE: 12
YXEGTFTSDY SIXLDEKAQX AFIEYLLEXG PSSGAPPPS                              39

|  |  |
|---|---|
| SEQ ID NO: 13 | moltype = AA  length = 39 |
| FEATURE | Location/Qualifiers |
| REGION | 1..39<br>note = Synthetic Construct |
| SITE | 2<br>note = MISC_FEATURE - Xaa at position 2 is Aib |
| MOD_RES | 12<br>note = Lys at position 12 is chemically modified by<br> conjugation of the epsilon-amino group of the Lys side<br> chain with<br> (2-[2-(2-amino-ethoxy)-ethoxy]-acetyl)2-(gamma-Glu)-CO-(CH2<br> )18-CO 2H |
| SITE | 20<br>note = MISC_FEATURE - Xaa at position 20 is Aib |
| MOD_RES | 39<br>note = Ser at position 39 is amidated |
| source | 1..39<br>mol_type = protein<br>organism = synthetic construct |

SEQUENCE: 13
YXEGTFTSDY SKLLDKIAQX AFIEYLIEGG PSSGAPPPS                              39

|  |  |
|---|---|
| SEQ ID NO: 14 | moltype = AA  length = 39 |
| FEATURE | Location/Qualifiers |
| REGION | 1..39<br>note = Synthetic Construct |
| SITE | 2<br>note = MISC_FEATURE - Xaa at position 2 is Aib |
| MOD_RES | 13<br>note = Lys at position 13 is chemically modified by<br> conjugation of the epsilon-amino group of the Lys side<br> chain with<br> (2-[2-(2-amino-ethoxy)-ethoxy]-acetyl)2-(gamma-Glu)-CO-(CH2<br> )18-CO 2H |
| SITE | 20<br>note = MISC_FEATURE - Xaa at position 20 is Aib |
| MOD_RES | 39<br>note = Ser at position 39 is amidated |
| source | 1..39<br>mol_type = protein<br>organism = synthetic construct |

SEQUENCE: 14
YXEGTFTSDY SIKLDKIAQX AFIEYLIEGG PSSGAPPPS                              39

```
SEQ ID NO: 15            moltype = AA   length = 39
FEATURE                  Location/Qualifiers
REGION                   1..39
                         note = Synthetic Construct
SITE                     2
                         note = MISC_FEATURE - Xaa at position 2 is Aib
MOD_RES                  16
                         note = Lys at position 16 is chemically modified by
                          conjugation of the epsilon-amino group of the Lys side
                          chain with
                          (2-[2-(2-amino-ethoxy)-ethoxy]-acetyl)2-(gamma-Glu)-CO-(CH2
                         )18-CO 2H
SITE                     20
                         note = MISC_FEATURE - Xaa at position 20 is Aib
MOD_RES                  39
                         note = Ser at position 39 is amidated
source                   1..39
                         mol_type = protein
                         organism = synthetic construct
SEQUENCE: 15
YXEGTFTSDY SILLDKIAQX AFIEYLIEGG PSSGAPPPS                                 39

SEQ ID NO: 16            moltype = AA   length = 39
FEATURE                  Location/Qualifiers
REGION                   1..39
                         note = Synthetic Construct
SITE                     2
                         note = MISC_FEATURE - Xaa at position 2 is Aib
MOD_RES                  19
                         note = Lys at position 19 is chemically modified by
                          conjugation of the epsilon-amino group of the Lys side
                          chain with
                          (2-[2-(2-amino-ethoxy)-ethoxy]-acetyl)2-(gamma-Glu)-CO-(CH2
                         )18-CO 2H
SITE                     20
                         note = MISC_FEATURE - Xaa at position 20 is Aib
MOD_RES                  39
                         note = Ser at position 39 is amidated
source                   1..39
                         mol_type = protein
                         organism = synthetic construct
SEQUENCE: 16
YXEGTFTSDY SILLDKIAKX AFIEYLIEGG PSSGAPPPS                                 39

SEQ ID NO: 17            moltype = AA   length = 39
FEATURE                  Location/Qualifiers
REGION                   1..39
                         note = Synthetic Construct
SITE                     2
                         note = MISC_FEATURE - Xaa at position 2 is Aib
SITE                     20
                         note = MISC_FEATURE - Xaa at position 20 is Aib
MOD_RES                  21
                         note = Lys at position 17 is chemically modified by
                          conjugation of the epsilon-amino group of the Lys side
                          chain with
                          (2-[2-(2-amino-ethoxy)-ethoxy]-acetyl)2-(gamma-Glu)-CO-(CH2
                         )18-CO 2H
MOD_RES                  39
                         note = Ser at position 39 is amidated
source                   1..39
                         mol_type = protein
                         organism = synthetic construct
SEQUENCE: 17
YXEGTFTSDY SILLDKIAQX KFIEYLIEGG PSSGAPPPS                                 39

SEQ ID NO: 18            moltype = AA   length = 39
FEATURE                  Location/Qualifiers
REGION                   1..39
                         note = Synthetic Construct
SITE                     2
                         note = MISC_FEATURE - Xaa at position 2 is Aib
SITE                     20
                         note = MISC_FEATURE - Xaa at position 20 is Aib
MOD_RES                  23
                         note = Lys at position 23 is chemically modified by
                          conjugation of the epsilon-amino group of the Lys side
                          chain with
                          (2-[2-(2-amino-ethoxy)-ethoxy]-acetyl)2-(gamma-Glu)-CO-(CH2
```

```
                           )18-CO 2H
MOD_RES                 39
                        note = Ser at position 39 is amidated
source                  1..39
                        mol_type = protein
                        organism = synthetic construct
SEQUENCE: 18
YXEGTFTSDY SILLDKIAQX AFKEYLIEGG PSSGAPPPS                              39

SEQ ID NO: 19           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    20
                        note = MISC_FEATURE - Xaa at position 20 is Aib
MOD_RES                 24
                        note = Lys at position 24 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
MOD_RES                 39
                        note = Ser at position 39 is amidated
source                  1..39
                        mol_type = protein
                        organism = synthetic construct
SEQUENCE: 19
YXEGTFTSDY SILLDKIAQX AFIKYLIEGG PSSGAPPPS                              39

SEQ ID NO: 20           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    20
                        note = MISC_FEATURE - Xaa at position 20 is Aib
MOD_RES                 28
                        note = Lys at position 28 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
MOD_RES                 39
                        note = Ser at position 39 is amidated
source                  1..39
                        mol_type = protein
                        organism = synthetic construct
SEQUENCE: 20
YXEGTFTSDY SILLDKIAQX AFIEYLIKGG PSSGAPPPS                              39

SEQ ID NO: 21           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    20
                        note = MISC_FEATURE - Xaa at position 20 is Aib
MOD_RES                 32
                        note = Lys at position 32 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
MOD_RES                 39
                        note = Ser at position 39 is amidated
source                  1..39
                        mol_type = protein
                        organism = synthetic construct
SEQUENCE: 21
YXEGTFTSDY SILLDKIAQX AFIEYLIEGG PKSGAPPPS                              39

SEQ ID NO: 22           moltype = AA  length = 39
FEATURE                 Location/Qualifiers
REGION                  1..39
                        note = Synthetic Construct
```

| | | |
|---|---|---|
| SITE | 2 | |
| | note = MISC_FEATURE - Xaa at position 2 is Aib | |
| SITE | 20 | |
| | note = MISC_FEATURE - Xaa at position 20 is Aib | |
| MOD_RES | 37 | |
| | note = Lys at position 37 is chemically modified by conjugation of the epsilon-amino group of the Lys side chain with (2-[2-(2-amino-ethoxy)-ethoxy]-acetyl)2-(gamma-Glu)-CO-(CH2)18-CO 2H | |
| MOD_RES | 39 | |
| | note = Ser at position 39 is amidated | |
| source | 1..39 | |
| | mol_type = protein | |
| | organism = synthetic construct | |
| SEQUENCE: 22 | | |
| YXEGTFTSDY SILLDKIAQX AFIEYLIEGG PSSGAPKPS | | 39 |

| | | |
|---|---|---|
| SEQ ID NO: 23 | moltype = AA   length = 39 | |
| FEATURE | Location/Qualifiers | |
| REGION | 1..39 | |
| | note = Synthetic Construct | |
| SITE | 2 | |
| | note = MISC_FEATURE - Xaa at position 2 is Aib | |
| SITE | 20 | |
| | note = MISC_FEATURE - Xaa at position 20 is Aib | |
| MOD_RES | 38 | |
| | note = Lys at position 38 is chemically modified by conjugation of the epsilon-amino group of the Lys side chain with (2-[2-(2-amino-ethoxy)-ethoxy]-acetyl)2-(gamma-Glu)-CO-(CH2)18-CO 2H | |
| MOD_RES | 39 | |
| | note = Ser at position 39 is amidated | |
| source | 1..39 | |
| | mol_type = protein | |
| | organism = synthetic construct | |
| SEQUENCE: 23 | | |
| YXEGTFTSDY SILLDKIAQX AFIEYLIEGG PSSGAPPKS | | 39 |

| | | |
|---|---|---|
| SEQ ID NO: 24 | moltype = AA   length = 39 | |
| FEATURE | Location/Qualifiers | |
| REGION | 1..39 | |
| | note = Synthetic Construct | |
| SITE | 2 | |
| | note = MISC_FEATURE - Xaa at position 2 is Aib | |
| SITE | 20 | |
| | note = MISC_FEATURE - Xaa at position 20 is Aib | |
| MOD_RES | 39 | |
| | note = Lys at position 39 is chemically modified by conjugation of the epsilon-amino group of the Lys side chain with (2-[2-(2-amino-ethoxy)-ethoxy]-acetyl)2-(gamma-Glu)-CO-(CH2)18-CO 2H | |
| MOD_RES | 39 | |
| | note = Lys at position 39 is amidated | |
| source | 1..39 | |
| | mol_type = protein | |
| | organism = synthetic construct | |
| SEQUENCE: 24 | | |
| YXEGTFTSDY SILLDKIAQX AFIEYLIEGG PSSGAPPPK | | 39 |

| | | |
|---|---|---|
| SEQ ID NO: 25 | moltype = AA   length = 34 | |
| FEATURE | Location/Qualifiers | |
| REGION | 1..34 | |
| | note = Synthetic Construct | |
| SITE | 2 | |
| | note = MISC_FEATURE - Xaa at position 2 is Aib | |
| MOD_RES | 17 | |
| | note = Lys at position 17 is chemically modified by conjugation of the epsilon-amino group of the Lys side chain with (2-[2-(2-amino-ethoxy)-ethoxy]-acetyl)2-(gamma-Glu)-CO-(CH2)18-CO 2H | |
| SITE | 20 | |
| | note = MISC_FEATURE - Xaa at position 20 is Aib | |
| MOD_RES | 34 | |
| | note = Gly at position 34 is amidated | |
| source | 1..34 | |

```
                            mol_type = protein
                            organism = synthetic construct
SEQUENCE: 25
YXEGTFTSDY SILLDKKAQX AFIEYLIEGG PSSG                                      34

SEQ ID NO: 26               moltype = AA   length = 30
FEATURE                     Location/Qualifiers
REGION                      1..30
                            note = Synthetic Construct
SITE                        2
                            note = MISC_FEATURE - Xaa at position 2 is Aib
MOD_RES                     17
                            note = Lys at position 17 is chemically modified by
                             conjugation of the epsilon-amino group of the Lys side
                             chain with
                             (2-[2-(2-amino-ethoxy)-ethoxy]-acetyl)2-(gamma-Glu)-CO-(CH2
                             )18-CO 2H
SITE                        20
                            note = MISC_FEATURE - Xaa at position 20 is Aib
MOD_RES                     30
                            note = Gly at position 30 is amidated
source                      1..30
                            mol_type = protein
                            organism = synthetic construct
SEQUENCE: 26
YXEGTFTSDY SILLDKKAQX AFIEYLIEGG                                           30

SEQ ID NO: 27               moltype = AA   length = 39
FEATURE                     Location/Qualifiers
REGION                      1..39
                            note = Synthetic Construct
SITE                        2
                            note = MISC_FEATURE - Xaa at position 2 is Aib
SITE                        13
                            note = MISC_FEATURE - Xaa at position 13 is alpha-methyl-Leu
MOD_RES                     17
                            note = Lys at position 17 is chemically modified by
                             conjugation of the epsilon-amino group of the Lys side
                             chain with
                             (2-[2-(2-amino-ethoxy)-ethoxy]-acetyl)2-(gamma-Glu)-CO-(CH2
                             )18-CO 2H
SITE                        20
                            note = MISC_FEATURE - Xaa at position 20 is Aib
MOD_RES                     39
                            note = Ser at position 39 is amidated
source                      1..39
                            mol_type = protein
                            organism = synthetic construct
SEQUENCE: 27
YXEGTFTSDY SIXLDSKAQX AFIEYLIEGG PSSGAPPPS                                 39

SEQ ID NO: 28               moltype = AA   length = 39
FEATURE                     Location/Qualifiers
REGION                      1..39
                            note = Synthetic Construct
SITE                        2
                            note = MISC_FEATURE - Xaa at position 2 is Aib
SITE                        13
                            note = MISC_FEATURE - Xaa at position 13 is alpha-methyl-Leu
SITE                        16
                            note = MISC_FEATURE - Xaa at position 16 is Aib
MOD_RES                     17
                            note = Lys at position 17 is chemically modified by
                             conjugation of the epsilon-amino group of the Lys side
                             chain with
                             (2-[2-(2-amino-ethoxy)-ethoxy]-acetyl)2-(gamma-Glu)-CO-(CH2
                             )18-CO 2H
SITE                        20
                            note = MISC_FEATURE - Xaa at position 20 is Aib
MOD_RES                     39
                            note = Ser at position 39 is amidated
source                      1..39
                            mol_type = protein
                            organism = synthetic construct
SEQUENCE: 28
YXEGTFTSDY SIXLDXKAQX AFIEYLIEGG PSSGAPPPS                                 39

SEQ ID NO: 29               moltype = AA   length = 30
FEATURE                     Location/Qualifiers
```

```
                        -continued

REGION                  1..30
                        note = Synthetic Construct
SITE                    2
                        note = MISC_FEATURE - Xaa at position 2 is Aib
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 30
                        note = Gly at position 30 is amidated
source                  1..30
                        mol_type = protein
                        organism = synthetic construct
SEQUENCE: 29
YXEGTFTSDY SIXLDKKAQX AFIEYLIEGG                                              30

SEQ ID NO: 30           moltype = AA  length = 30
FEATURE                 Location/Qualifiers
REGION                  1..30
                        note = Synthetic Construct
SITE                    2
                        note = MISC_FEATURE - Xaa at position 2 is Aib
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 30
                        note = Gly at position 30 is amidated
source                  1..30
                        mol_type = protein
                        organism = synthetic construct
SEQUENCE: 30
YXEGTFTSDY SIXLDEKAQX AFIEYLIEGG                                              30

SEQ ID NO: 31           moltype = AA  length = 30
FEATURE                 Location/Qualifiers
REGION                  1..30
                        note = Synthetic Construct
SITE                    2
                        note = MISC_FEATURE - Xaa at position 2 is Aib
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 30
                        note = Gly at position 30 is amidated
source                  1..30
                        mol_type = protein
                        organism = synthetic construct
SEQUENCE: 31
YXEGTFTSDY SIXLDSKAQX AFIEYLIEGG                                              30

SEQ ID NO: 32           moltype = AA  length = 30
FEATURE                 Location/Qualifiers
REGION                  1..30
                        note = Synthetic Construct
SITE                    2
                        note = MISC_FEATURE - Xaa at position 2 is Aib
SITE                    13
                        note = MISC_FEATURE - Xaa at position 13 is alpha-methyl-Leu
MOD_RES                 17
```

```
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 30
                        note = Gly at position 30 is amidated
source                  1..30
                        mol_type = protein
                        organism = synthetic construct
SEQUENCE: 32
YXEGTFTSDY SIXLDTKAQX AFIEYLIEGG                                               30

SEQ ID NO: 33           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 39
                        note = Ser at position 39 is amidated
source                  1..39
                        mol_type = protein
                        organism = synthetic construct
SEQUENCE: 33
YXEGTFTSDY SIXLDEKAQX AFIEYLLEGG PSSGAPPPS                                     39

SEQ ID NO: 34           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    11
                        note = MISC_FEATURE - Xaa at position 11 is alpha-methyl-Ser
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 39
                        note = Ser at position 39 is amidated
source                  1..39
                        mol_type = protein
                        organism = synthetic construct
SEQUENCE: 34
YXEGTFTSDY XILLDKKAQX AFIEYLIEGG PSSGAPPPS                                     39

SEQ ID NO: 35           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is alpha-methyl-Phe
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
```

```
SITE                    20
                        note = MISC_FEATURE - Xaa at position 20 is Aib
MOD_RES                 39
                        note = Ser at position 39 is amidated
source                  1..39
                        mol_type = protein
                        organism = synthetic construct
SEQUENCE: 35
YXEGTXTSDY SIXLDKKAQX AFIEYLIEGG PSSGAPPPS                               39

SEQ ID NO: 36           moltype = AA  length = 30
FEATURE                 Location/Qualifiers
REGION                  1..30
                        note = Synthetic Construct
SITE                    2
                        note = MISC_FEATURE - Xaa at position 2 is Aib
SITE                    20
                        note = MISC_FEATURE - Xaa at position 20 is Aib
MOD_RES                 28
                        note = Lys at position 28 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
MOD_RES                 30
                        note = Gly at position 30 is amidated
source                  1..30
                        mol_type = protein
                        organism = synthetic construct
SEQUENCE: 36
YXEGTFTSDY SILLDKIAQX AFIEYLIKGG                                         30

SEQ ID NO: 37           moltype = AA  length = 39
FEATURE                 Location/Qualifiers
REGION                  1..39
                        note = Synthetic Construct
SITE                    2
                        note = MISC_FEATURE - Xaa at position 2 is D-Ala
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 39
                        note = Ser at position 39 is amidated
source                  1..39
                        mol_type = protein
                        organism = synthetic construct
SEQUENCE: 37
YXEGTFTSDY SILLDKKAQX AFIEYLIEGG PSSGAPPPS                               39

SEQ ID NO: 38           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    11
                        note = MISC_FEATURE - Xaa at position 11 is D-Ser
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 39
                        note = Ser at position 39 is amidated
source                  1..39
                        mol_type = protein
                        organism = synthetic construct
SEQUENCE: 38
YXEGTFTSDY XILLDKKAQX AFIEYLIEGG PSSGAPPPS                               39

SEQ ID NO: 39           moltype = AA  length = 39
```

```
FEATURE                 Location/Qualifiers
REGION                  1..39
                        note = Synthetic Construct
SITE                    2
                        note = MISC_FEATURE - Xaa at position 2 is Aib
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
SITE                    28
                        note = MISC_FEATURE - Xaa at position 28 is D-Glu
MOD_RES                 39
                        note = Ser at position 39 is amidated
source                  1..39
                        mol_type = protein
                        organism = synthetic construct
SEQUENCE: 39
YXEGTFTSDY SILLDKKAQX AFIEYLIXGG PSSGAPPPS                                     39

SEQ ID NO: 40           moltype = AA  length = 39
FEATURE                 Location/Qualifiers
REGION                  1..39
                        note = Synthetic Construct
SITE                    2
                        note = MISC_FEATURE - Xaa at position 2 is Aib
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 40
YXEGTFTSDY SILLDKKAQX AFIXYLIEGG PSSGAPPPS                                     39

SEQ ID NO: 41           moltype = AA  length = 39
FEATURE                 Location/Qualifiers
REGION                  1..39
                        note = Synthetic Construct
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 39
                        note = Ser at position 39 is amidated
source                  1..39
                        mol_type = protein
                        organism = synthetic construct
SEQUENCE: 41
YPEGTFTSDY SILLDKKAQX AFIEYLIEGG PSSGAPPPS                                     39

SEQ ID NO: 42           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    3
                        note = MISC_FEATURE - Xaa at position 3 is Aad
MOD_RES                 17
                        note = Lys at position 17 is chemically modified by
                         conjugation of the epsilon-amino group of the Lys side
                         chain with
```

```
                             (2-[2-(2-amino-ethoxy)-ethoxy]-acetyl)2-(gamma-Glu)-CO-(CH2
                             )18-CO 2H
SITE                         20
                             note = MISC_FEATURE - Xaa at position 20 is Aib
MOD_RES                      39
                             note = Ser at position 39 is amidated
source                       1..39
                             mol_type = protein
                             organism = synthetic construct
SEQUENCE: 42
YXXGTFTSDY SILLDKKAQX AFIEYLIEGG PSSGAPPPS                                          39

SEQ ID NO: 43                moltype = AA  length = 30
FEATURE                      Location/Qualifiers
REGION                       1..30
                             note = Synthetic Construct
SITE                         2
                             note = MISC_FEATURE - Xaa at position 2 is Aib
SITE                         6
                             note = MISC_FEATURE - Xaa at position 6 is alpha-methyl-Phe
SITE                         20
                             note = MISC_FEATURE - Xaa at position 20 is Aib
MOD_RES                      28
                             note = Lys at position 28 is chemically modified by
                              conjugation of the epsilon-amino group of the Lys side
                              chain with
                             (2-[2-(2-amino-ethoxy)-ethoxy]-acetyl)2-(gamma-Glu)-CO-(CH2
                             )18-CO 2H
MOD_RES                      30
                             note = Gly at position 30 is amidated
source                       1..30
                             mol_type = protein
                             organism = synthetic construct
SEQUENCE: 43
YXEGTXTSDY SILLDKIAQX AFIEYLIKGG                                                    30

SEQ ID NO: 44                moltype = AA  length = 30
FEATURE                      Location/Qualifiers
REGION                       1..30
                             note = Synthetic Construct
SITE                         2
                             note = MISC_FEATURE - Xaa at position 2 is Aib
SITE                         13
                             note = MISC_FEATURE - Xaa at position 13 is alpha-methyl-Leu
SITE                         20
                             note = MISC_FEATURE - Xaa at position 20 is Aib
MOD_RES                      28
                             note = Lys at position 28 is chemically modified by
                              conjugation of the epsilon-amino group of the Lys side
                              chain with
                             (2-[2-(2-amino-ethoxy)-ethoxy]-acetyl)2-(gamma-Glu)-CO-(CH2
                             )18-CO 2H
MOD_RES                      30
                             note = Gly at position 30 is amidated
source                       1..30
                             mol_type = protein
                             organism = synthetic construct
SEQUENCE: 44
YXEGTFTSDY SIXLDKIAQX AFIEYLIKGG                                                    30

SEQ ID NO: 45                moltype = AA  length = 30
FEATURE                      Location/Qualifiers
REGION                       1..30
                             note = Synthetic Construct
SITE                         2
                             note = MISC_FEATURE - Xaa at position 2 is Aib
SITE                         6
                             note = MISC_FEATURE - Xaa at position 13 is alpha-methyl-Phe
MOD_RES                      17
                             note = Lys at position 17 is chemically modified by
                              conjugation of the epsilon-amino group of the Lys side
                              chain with
                             (2-[2-(2-amino-ethoxy)-ethoxy]-acetyl)2-(gamma-Glu)-CO-(CH2
                             )18-CO 2H
SITE                         20
                             note = MISC_FEATURE - Xaa at position 20 is Aib
MOD_RES                      30
                             note = Gly at position 30 is amidated
source                       1..30
```

```
                        mol_type = protein
                        organism = synthetic construct
SEQUENCE: 45
YXEGTXTSDY SILLDKKAQX AFIEYLIEGG                                    30

SEQ ID NO: 46           moltype = AA  length = 30
FEATURE                 Location/Qualifiers
REGION                  1..30
                        note = Synthetic Construct
SITE                    2
                        note = MISC_FEATURE - Xaa at position 2 is Aib
SITE                    6
                        note = MISC_FEATURE - Xaa at position 6 is alpha-methyl-Phe
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 30
                        note = Gly at position 30 is amidated
source                  1..30
                        mol_type = protein
                        organism = synthetic construct
SEQUENCE: 46
YXEGTXTSDY SIXLDKKAQX AFIEYLIEGG                                    30

SEQ ID NO: 47           moltype = AA  length = 30
FEATURE                 Location/Qualifiers
REGION                  1..30
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 30
                        note = Gly at position 30 is amidated
source                  1..30
                        mol_type = protein
                        organism = synthetic construct
SEQUENCE: 47
YXEGTXTSDY SIXLDEKAQX EFIEYLIEGG                                    30

SEQ ID NO: 48           moltype = AA  length = 30
FEATURE                 Location/Qualifiers
REGION                  1..30
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )16-CO 2H
SITE                    20
                        note = MISC_FEATURE - Xaa at position 20 is Aib
MOD_RES                 30
                        note = Gly at position 30 is amidated
```

```
                             -continued source              1..30
                    mol_type = protein
                    organism = synthetic construct
SEQUENCE: 48
YXEGTXTSDY SIXLDEKAQX EFIEYLIEGG                                          30

SEQ ID NO: 49       moltype = AA  length = 39
FEATURE             Location/Qualifiers
REGION              1..39
                    note = Synthetic Construct
SITE                2
                    note = MISC_FEATURE - Xaa at position 2 is Aib
MOD_RES             17
                    note = Lys at position 17 is chemically modified by
                     conjugation of the epsilon-amino group of the Lys side
                     chain with
                     (2-[2-(2-amino-ethoxy)-ethoxy]-acetyl)-AOC-(gamma-Glu)-CO-(
                     CH2)18 -CO2H
SITE                20
                    note = MISC_FEATURE - Xaa at position 20 is Aib
MOD_RES             39
                    note = Ser at position 39 is amidated
source              1..39
                    mol_type = protein
                    organism = synthetic construct
SEQUENCE: 49
YXEGTFTSDY SILLDKKAQX AFIEYLIEGG PSSGAPPPS                                39

SEQ ID NO: 50       moltype = AA  length = 39
FEATURE             Location/Qualifiers
REGION              1..39
                    note = Synthetic Construct
SITE                2
                    note = MISC_FEATURE - Xaa at position 2 is Aib
MOD_RES             17
                    note = Lys at position 17 is chemically modified by
                     conjugation of the epsilon-amino group of the Lys side
                     chain with
                     AOC-(2-[2-(2-amino-ethoxy)-ethoxy]-acetyl)-(gamma-Glu)-CO-(
                     CH2)18 -CO2H
SITE                20
                    note = MISC_FEATURE - Xaa at position 20 is Aib
MOD_RES             39
                    note = Ser at position 39 is amidated
source              1..39
                    mol_type = protein
                    organism = synthetic construct
SEQUENCE: 50
YXEGTFTSDY SILLDKKAQX AFIEYLIEGG PSSGAPPPS                                39

SEQ ID NO: 51       moltype = AA  length = 39
FEATURE             Location/Qualifiers
REGION              1..39
                    note = Synthetic Construct
SITE                2
                    note = MISC_FEATURE - Xaa at position 2 is Aib
MOD_RES             17
                    note = Lys at position 17 is chemically modified by
                     conjugation of the epsilon-amino group of the Lys side
                     chain with
                     (2-[2-(2-amino-ethoxy)-ethoxy]-acetyl)-(gamma-Glu)-(Trx)-CO
                     -(CH2) 18-CO2H
SITE                20
                    note = MISC_FEATURE - Xaa at position 20 is Aib
MOD_RES             39
                    note = Ser at position 39 is amidated
source              1..39
                    mol_type = protein
                    organism = synthetic construct
SEQUENCE: 51
YXEGTFTSDY SILLDKKAQX AFIEYLIEGG PSSGAPPPS                                39

SEQ ID NO: 52       moltype = AA  length = 39
FEATURE             Location/Qualifiers
REGION              1..39
                    note = Synthetic Construct
SITE                2
                    note = MISC_FEATURE - Xaa at position 2 is Aib
MOD_RES             17
```

```
                      note = Lys at position 17 is chemically modified by
                       conjugation of the epsilon-amino group of the Lys side
                       chain with
                       (2-[2-(2-amino-ethoxy)-ethoxy]-acetyl)-(Trx)-(gamma-Glu)-CO
                       -(CH2) 18-CO2H
SITE                  20
                      note = MISC_FEATURE - Xaa at position 20 is Aib
MOD_RES               39
                      note = Ser at position 39 is amidated
source                1..39
                      mol_type = protein
                      organism = synthetic construct
SEQUENCE: 52
YXEGTFTSDY SILLDKKAQX AFIEYLIEGG PSSGAPPPS                                 39

SEQ ID NO: 53         moltype = AA   length = 39
FEATURE               Location/Qualifiers
REGION                1..39
                      note = Synthetic Construct
SITE                  2
                      note = MISC_FEATURE - Xaa at position 2 is Aib
MOD_RES               17
                      note = Lys at position 17 is chemically modified by
                       conjugation of the epsilon-amino group of the Lys side
                       chain with
                       (2-[2-(2-amino-ethoxy)-ethoxy]-acetyl)-(epsilon-Lys)-(gamma
                       -Glu)- CO-(CH2)18-CO2H
SITE                  20
                      note = MISC_FEATURE - Xaa at position 20 is Aib
MOD_RES               39
                      note = Ser at position 39 is amidated
source                1..39
                      mol_type = protein
                      organism = synthetic construct
SEQUENCE: 53
YXEGTFTSDY SILLDKKAQX AFIEYLIEGG PSSGAPPPS                                 39

SEQ ID NO: 54         moltype = AA   length = 39
FEATURE               Location/Qualifiers
REGION                1..39
                      note = Synthetic Construct
SITE                  2
                      note = MISC_FEATURE - Xaa at position 2 is Aib
MOD_RES               17
                      note = Lys at position 17 is chemically modified by
                       conjugation of the epsilon-amino group of the Lys side
                       chain with
                       (2-[2-(2-amino-ethoxy)-ethoxy]-acetyl)2-(epsilon-Lys)-CO-(C
                       H2)18- CO2H
SITE                  20
                      note = MISC_FEATURE - Xaa at position 20 is Aib
MOD_RES               39
                      note = Ser at position 39 is amidated
source                1..39
                      mol_type = protein
                      organism = synthetic construct
SEQUENCE: 54
YXEGTFTSDY SILLDKKAQX AFIEYLIEGG PSSGAPPPS                                 39

SEQ ID NO: 55         moltype = AA   length = 39
FEATURE               Location/Qualifiers
REGION                1..39
                      note = Synthetic Construct
SITE                  2
                      note = MISC_FEATURE - Xaa at position 2 is Aib
MOD_RES               17
                      note = Lys at position 17 is chemically modified by
                       conjugation of the epsilon-amino group of the Lys side
                       chain with
                       (2-[2-(2-amino-ethoxy)-ethoxy]-acetyl)-(epsilon-Lys)-(epsil
                       on-Lys )-CO-(CH2)18-CO2H
SITE                  20
                      note = MISC_FEATURE - Xaa at position 2 is Aib
MOD_RES               39
                      note = Ser at position 39 is amidated
source                1..39
                      mol_type = protein
                      organism = synthetic construct
SEQUENCE: 55
```

```
YXEGTFTSDY SILLDKKAQX AFIEYLIEGG PSSGAPPPS                                  39

SEQ ID NO: 56           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is alpha-methyl-Phe
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                        )18-CO 2H
SITE                    20
                        note = MISC_FEATURE - Xaa at position 20 is Aib
MOD_RES                 39
                        note = Ser at position 39 is amidated
source                  1..39
                        mol_type = protein
                        organism = synthetic construct
SEQUENCE: 56
YXEGTXTSDY SIXLDEKAQX AFIEYLIEGG PSSGAPPPS                                  39

SEQ ID NO: 57           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                        )18-CO 2H
SITE                    20
                        note = MISC_FEATURE - Xaa at position 20 is Aib
MOD_RES                 39
                        note = Ser at position 39 is amidated
source                  1..39
                        mol_type = protein
                        organism = synthetic construct
SEQUENCE: 57
YXEGTXTSDY SIXLDEKAQX EFIEYLIEGG PSSGAPPPS                                  39

SEQ ID NO: 58           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    3
                        note = MISC_FEATURE - Xaa at position 3 is cTA
SITE                    6
                        note = MISC_FEATURE - Xaa at position 6 is alpha-methyl-Phe
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                        )18-CO 2H
SITE                    20
                        note = MISC_FEATURE - Xaa at position 20 is Aib
MOD_RES                 39
                        note = Ser at position 39 is amidated
source                  1..39
                        mol_type = protein
```

```
                        organism = synthetic construct
SEQUENCE: 58
YXXGTXTSDY SIXLDEKAQX AFIEYLIEGG PSSGAPPPS                                39

SEQ ID NO: 59           moltype = AA  length = 34
FEATURE                 Location/Qualifiers
REGION                  1..34
                        note = Synthetic Construct
SITE                    2
                        note = MISC_FEATURE - Xaa at position 2 is Aib
SITE                    6
                        note = MISC_FEATURE - Xaa at position 6 is alpha-methyl-Phe
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 34
                        note = Gly at position 34 is amidated
source                  1..34
                        mol_type = protein
                        organism = synthetic construct
SEQUENCE: 59
YXEGTXTSDY SIXLDKKAQX EFIEYLIEGG PSSG                                     34

SEQ ID NO: 60           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is alpha-methyl-Phe
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)2-CO-(CH
                         2)18-C O2H
SITE                    20
                        note = MISC_FEATURE - Xaa at position 20 is Aib
MOD_RES                 39
                        note = Ser at position 39 is amidated
source                  1..39
                        mol_type = protein
                        organism = synthetic construct
SEQUENCE: 60
YXEGTXTSDY SIXLDKKAQX AFIEYLIEGG PSSGAPPPS                                39

SEQ ID NO: 61           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is alpha-methyl-Phe
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 39
                        note = Ser at position 39 is amidated
source                  1..39
                        mol_type = protein
                        organism = synthetic construct
```

```
SEQUENCE: 61
YXEGTXTSDY SIXLDKKAQX AFIEYLIEAG PSSGAPPPS                               39

SEQ ID NO: 62             moltype = AA  length = 39
FEATURE                   Location/Qualifiers
REGION                    1..39
                          note = Synthetic Construct
SITE                      2
                          note = MISC_FEATURE - Xaa at position 2 is Aib
SITE                      6
                          note = MISC_FEATURE - Xaa at position 6 is alpha-methyl-Phe
MOD_RES                   17
                          note = Lys at position 17 is chemically modified by
                           conjugation of the epsilon-amino group of the Lys side
                           chain with
                           (2-[2-(2-amino-ethoxy)-ethoxy]-acetyl)2-(gamma-Glu)-CO-(CH2
                           )18-CO 2H
SITE                      20
                          note = MISC_FEATURE - Xaa at position 20 is Aib
MOD_RES                   39
                          note = Ser at position 39 is amidated
source                    1..39
                          mol_type = protein
                          organism = synthetic construct
SEQUENCE: 62
YXEGTXTSDH SILLDKKAQX AFIEYLIEGG PSSGAPPPS                               39

SEQ ID NO: 63             moltype = AA  length = 39
FEATURE                   Location/Qualifiers
REGION                    1..39
                          note = Synthetic Construct
SITE                      2
                          note = MISC_FEATURE - Xaa at position 2 is Aib
SITE                      6
                          note = MISC_FEATURE - Xaa at position 6 is alpha-methyl-Phe
MOD_RES                   17
                          note = Lys at position 17 is chemically modified by
                           conjugation of the epsilon-amino group of the Lys side
                           chain with
                           (2-[2-(2-amino-ethoxy)-ethoxy]-acetyl)2-(gamma-Glu)-CO-(CH2
                           )18-CO 2H
SITE                      20
                          note = MISC_FEATURE - Xaa at position 20 is Aib
MOD_RES                   39
                          note = Ser at position 39 is amidated
source                    1..39
                          mol_type = protein
                          organism = synthetic construct
SEQUENCE: 63
YXEGTXTSDL SILLDKKAQX AFIEYLIEGG PSSGAPPPS                               39

SEQ ID NO: 64             moltype = AA  length = 39
FEATURE                   Location/Qualifiers
REGION                    1..39
                          note = Synthetic Construct
SITE                      2
                          note = MISC_FEATURE - Xaa at position 2 is Aib
SITE                      6
                          note = MISC_FEATURE - Xaa at position 6 is alpha-methyl-Phe
SITE                      13
                          note = MISC_FEATURE - Xaa at position 13 is alpha-methyl-Leu
MOD_RES                   17
                          note = Lys at position 17 is chemically modified by
                           conjugation of the epsilon-amino group of the Lys side
                           chain with
                           (2-[2-(2-amino-ethoxy)-ethoxy]-acetyl)2-(gamma-Glu)-CO-(CH2
                           )18-CO 2H
SITE                      20
                          note = MISC_FEATURE - Xaa at position 20 is Aib
SITE                      21
                          note = MISC_FEATURE - Xaa at position 21 is Aad
MOD_RES                   39
                          note = Ser at position 39 is amidated
source                    1..39
                          mol_type = protein
                          organism = synthetic construct
SEQUENCE: 64
YXEGTXTSDY SIXLDKKAQX XFIEYLIEGG PSSGAPPPS                               39
```

```
SEQ ID NO: 65              moltype = AA  length = 39
FEATURE                    Location/Qualifiers
REGION                     1..39
                           note = Synthetic Construct
SITE                       2
                           note = MISC_FEATURE - Xaa at position 2 is Aib
SITE                       6
                           note = MISC_FEATURE - Xaa at position 6 is alpha-methyl-Phe
SITE                       13
                           note = MISC_FEATURE - Xaa at position 13 is alpha-methyl-Leu
MOD_RES                    17
                           note = Lys at position 17 is chemically modified by
                            conjugation of the epsilon-amino group of the Lys side
                            chain with
                            (2-[2-(2-amino-ethoxy)-ethoxy]-acetyl)2-(gamma-Glu)-CO-(CH2
                           )18-CO 2H
SITE                       20
                           note = MISC_FEATURE - Xaa at position 20 is Aib
MOD_RES                    39
                           note = Ser at position 39 is amidated
source                     1..39
                           mol_type = protein
                           organism = synthetic construct
SEQUENCE: 65
YXEGTXTSDY SIXLDKKAQX TFIEYLIEGG PSSGAPPPS                                  39

SEQ ID NO: 66              moltype = AA  length = 39
FEATURE                    Location/Qualifiers
REGION                     1..39
                           note = Synthetic Construct
SITE                       2
                           note = MISC_FEATURE - Xaa at position 2 is Aib
SITE                       6
                           note = MISC_FEATURE - Xaa at position 6 is alpha-methyl-Phe
SITE                       13
                           note = MISC_FEATURE - Xaa at position 13 is alpha-methyl-Leu
MOD_RES                    17
                           note = Lys at position 17 is chemically modified by
                            conjugation of the epsilon-amino group of the Lys side
                            chain with
                            (2-[2-(2-amino-ethoxy)-ethoxy]-acetyl)2-(gamma-Glu)-CO-(CH2
                           )18-CO 2H
SITE                       20
                           note = MISC_FEATURE - Xaa at position 20 is Aib
MOD_RES                    39
                           note = Ser at position 39 is amidated
source                     1..39
                           mol_type = protein
                           organism = synthetic construct
SEQUENCE: 66
YXEGTXTSDY SIXLDKKAQX DFIEYLIEGG PSSGAPPPS                                  39

SEQ ID NO: 67              moltype = AA  length = 39
FEATURE                    Location/Qualifiers
REGION                     1..39
                           note = Synthetic Construct
SITE                       2
                           note = MISC_FEATURE - Xaa at position 2 is Aib
SITE                       6
                           note = MISC_FEATURE - Xaa at position 6 is alpha-methyl-Phe
SITE                       13
                           note = MISC_FEATURE - Xaa at position 13 is alpha-methyl-Leu
MOD_RES                    17
                           note = Lys at position 17 is chemically modified by
                            conjugation of the epsilon-amino group of the Lys side
                            chain with
                            (2-[2-(2-amino-ethoxy)-ethoxy]-acetyl)2-(gamma-Glu)-CO-(CH2
                           )18-CO 2H
SITE                       20
                           note = MISC_FEATURE - Xaa at position 20 is Aib
SITE                       21
                           note = MISC_FEATURE - Xaa at position 21 is Aib
MOD_RES                    39
                           note = Ser at position 39 is amidated
source                     1..39
                           mol_type = protein
                           organism = synthetic construct
SEQUENCE: 67
YXEGTXTSDY SIXLDKKAQX XFIEYLIEGG PSSGAPPPS                                  39
```

```
SEQ ID NO: 68           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is alpha-methyl-Phe
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    21
                        note = MISC_FEATURE - Xaa at position 21 is Aib
MOD_RES                 39
                        note = Ser at position 39 is amidated
source                  1..39
                        mol_type = protein
                        organism = synthetic construct
SEQUENCE: 68
YXEGTXTSDY SIXLDKKAQH XFIEYLIEGG PSSGAPPPS                    39

SEQ ID NO: 69           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
SITE                    24
                        note = MISC_FEATURE - Xaa at position 24 is Aad
MOD_RES                 39
                        note = Ser at position 39 is amidated
source                  1..39
                        mol_type = protein
                        organism = synthetic construct
SEQUENCE: 69
YXEGTXTSDY SIXLDEKAQX EFIXYLIEGG PSSGAPPPS                    39

SEQ ID NO: 70           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 39
                        note = Ser at position 39 is amidated
source                  1..39
                        mol_type = protein
```

-continued

```
                        organism = synthetic construct
SEQUENCE: 70
YXEGTXTSDY SIXLDEKAQX EFIAYLIEGG PSSGAPPPS                        39

SEQ ID NO: 71           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 39
                        note = Ser at position 39 is amidated
source                  1..39
                        mol_type = protein
                        organism = synthetic construct
SEQUENCE: 71
YXEGTXTSDY SIXLDEKAQX EFIVYLIEGG PSSGAPPPS                        39

SEQ ID NO: 72           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 39
                        note = Ser at position 39 is amidated
source                  1..39
                        mol_type = protein
                        organism = synthetic construct
SEQUENCE: 72
YXEGTXTSDY SIXLDEKAQX EFISYLIEGG PSSGAPPPS                        39

SEQ ID NO: 73           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
MOD_RES                 39
                        note = Ser at position 39 is amidated
```

```
                           US 12,453,758 B2
              117                                          118
                             -continued source                  1..39
                        mol_type = protein
                        organism = synthetic construct
SEQUENCE: 73
YXEGTXTSDY SIXLDEKAQX EFIPYLIEGG PSSGAPPPS                      39

SEQ ID NO: 74           moltype = AA   length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                          alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                          conjugation of the epsilon-amino group of the Lys side
                          chain with
                          (2-[2-(2-amino-ethoxy)-ethoxy]-acetyl)2-(gamma-Glu)-CO-(CH2
                          )18-CO 2H
SITE                    20
                        note = MISC_FEATURE - Xaa at position 20 is Aib
SITE                    24
                        note = MISC_FEATURE - Xaa at position 24 is Aib
MOD_RES                 39
                        note = Ser at position 39 is amidated
source                  1..39
                        mol_type = protein
                        organism = synthetic construct
SEQUENCE: 74
YXEGTXTSDY SIXLDEKAQX EFIXYLIEGG PSSGAPPPS                      39

SEQ ID NO: 75           moltype = AA   length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                          alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                          conjugation of the epsilon-amino group of the Lys side
                          chain with
                          (2-[2-(2-amino-ethoxy)-ethoxy]-acetyl)2-(gamma-Glu)-CO-(CH2
                          )18-CO 2H
SITE                    20
                        note = MISC_FEATURE - Xaa at position 20 is Aib
MOD_RES                 39
                        note = Ser at position 39 is amidated
source                  1..39
                        mol_type = protein
                        organism = synthetic construct
SEQUENCE: 75
YXEGTXTSDY SIXLDEKAQX EFIHYLIEGG PSSGAPPPS                      39

SEQ ID NO: 76           moltype = AA   length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                          alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                          conjugation of the epsilon-amino group of the Lys side
                          chain with
                          (2-[2-(2-amino-ethoxy)-ethoxy]-acetyl)2-(gamma-Glu)-CO-(CH2
                          )18-CO 2H
```

US 12,453,758 B2

119                                                                 120
-continued

| | |
|---|---|
| SITE | 20 |
| | note = MISC_FEATURE - Xaa at position 20 is Aib |
| MOD_RES | 39 |
| | note = Ser at position 39 is amidated |
| source | 1..39 |
| | mol_type = protein |
| | organism = synthetic construct |
| SEQUENCE: 76 | |
| YXEGTXTSDH SIXLDEKAQX EFIEYLIEGG PSSGAPPPS | 39 |
| | |
| SEQ ID NO: 77 | moltype = AA  length = 39 |
| FEATURE | Location/Qualifiers |
| REGION | 1..39 |
| | note = Synthetic Construct |
| SITE | 2 |
| | note = MISC_FEATURE - Xaa at position 2 is Aib |
| SITE | 6 |
| | note = MISC_FEATURE - Xaa at position 6 is alpha-methyl-Phe(2F) |
| SITE | 10 |
| | note = MISC_FEATURE - Xaa at position 10 is cTA |
| SITE | 13 |
| | note = MISC_FEATURE - Xaa at position 13 is alpha-methyl-Leu |
| MOD_RES | 17 |
| | note = Lys at position 17 is chemically modified by conjugation of the epsilon-amino group of the Lys side chain with (2-[2-(2-amino-ethoxy)-ethoxy]-acetyl)2-(gamma-Glu)-CO-(CH2)18-CO 2H |
| SITE | 20 |
| | note = MISC_FEATURE - Xaa at position 20 is Aib |
| MOD_RES | 39 |
| | note = Ser at position 39 is amidated |
| source | 1..39 |
| | mol_type = protein |
| | organism = synthetic construct |
| SEQUENCE: 77 | |
| YXEGTXTSDX SIXLDEKAQX EFIEYLIEGG PSSGAPPPS | 39 |
| | |
| SEQ ID NO: 78 | moltype = AA  length = 39 |
| FEATURE | Location/Qualifiers |
| REGION | 1..39 |
| | note = Synthetic Construct |
| SITE | 2 |
| | note = MISC_FEATURE - Xaa at position 2 is Aib |
| SITE | 6 |
| | note = MISC_FEATURE - Xaa at position 6 is alpha-methyl-Phe(2F) |
| SITE | 10 |
| | note = MISC_FEATURE - Xaa at position 10 is 3Pal |
| SITE | 13 |
| | note = MISC_FEATURE - Xaa at position 13 is alpha-methyl-Leu |
| MOD_RES | 17 |
| | note = Lys at position 17 is chemically modified by conjugation of the epsilon-amino group of the Lys side chain with (2-[2-(2-amino-ethoxy)-ethoxy]-acetyl)2-(gamma-Glu)-CO-(CH2)18-CO 2H |
| SITE | 20 |
| | note = MISC_FEATURE - Xaa at position 20 is Aib |
| MOD_RES | 39 |
| | note = Ser at position 39 is amidated |
| source | 1..39 |
| | mol_type = protein |
| | organism = synthetic construct |
| SEQUENCE: 78 | |
| YXEGTXTSDX SIXLDEKAQX EFIEYLIEGG PSSGAPPPS | 39 |
| | |
| SEQ ID NO: 79 | moltype = AA  length = 34 |
| FEATURE | Location/Qualifiers |
| REGION | 1..34 |
| | note = Synthetic Construct |
| SITE | 2 |
| | note = MISC_FEATURE - Xaa at position 2 is Aib |
| SITE | 6 |
| | note = MISC_FEATURE - Xaa at position 6 is alpha-methyl-Phe(2F) |
| SITE | 13 |
| | note = MISC_FEATURE - Xaa at position 13 is alpha-methyl-Leu |

| | | |
|---|---|---|
| MOD_RES | 17 | |
| | note = Lys at position 17 is chemically modified by conjugation of the epsilon-amino group of the Lys side chain with (2-[2-(2-amino-ethoxy)-ethoxy]-acetyl)2-(gamma-Glu)-CO-(CH2)18-CO 2H | |
| SITE | 20 | |
| | note = MISC_FEATURE - Xaa at position 20 is Aib | |
| SITE | 24 | |
| | note = MISC_FEATURE - Xaa at position 24 is D-Glu | |
| MOD_RES | 34 | |
| | note = Gly at position 34 is amidated | |
| source | 1..34 | |
| | mol_type = protein | |
| | organism = synthetic construct | |
| SEQUENCE: 79 | | |
| YXEGTXTSDH SIXLDEKAQX TFIXYLIEGG PSSG | | 34 |
| | | |
| SEQ ID NO: 80 | moltype = AA  length = 39 | |
| FEATURE | Location/Qualifiers | |
| REGION | 1..39 | |
| | note = Synthetic Construct | |
| SITE | 2 | |
| | note = MISC_FEATURE - Xaa at position 2 is Aib | |
| SITE | 6 | |
| | note = MISC_FEATURE - Xaa at position 6 is alpha-methyl-Phe(2F) | |
| SITE | 13 | |
| | note = MISC_FEATURE - Xaa at position 13 is alpha-methyl-Leu | |
| MOD_RES | 17 | |
| | note = Lys at position 17 is chemically modified by conjugation of the epsilon-amino group of the Lys side chain with (2-[2-(2-amino-ethoxy)-ethoxy]-acetyl)2-(gamma-Glu)-CO-(CH2)18-CO 2H | |
| SITE | 20 | |
| | note = MISC_FEATURE - Xaa at position 20 is Aib | |
| SITE | 24 | |
| | note = MISC_FEATURE - Xaa at position 24 is D-Glu | |
| MOD_RES | 39 | |
| | note = Ser at position 39 is amidated | |
| source | 1..39 | |
| | mol_type = protein | |
| | organism = synthetic construct | |
| SEQUENCE: 80 | | |
| YXEGTXTSDH SIXLDEKAQX TFIXYLIEGG PSSGAPPPS | | 39 |
| | | |
| SEQ ID NO: 81 | moltype = AA  length = 39 | |
| FEATURE | Location/Qualifiers | |
| REGION | 1..39 | |
| | note = Synthetic Construct | |
| SITE | 2 | |
| | note = MISC_FEATURE - Xaa at position 2 is Aib | |
| SITE | 6 | |
| | note = MISC_FEATURE - Xaa at position 6 is alpha-methyl-Phe(2F) | |
| SITE | 13 | |
| | note = MISC_FEATURE - Xaa at position 13 is alpha-methyl-Leu | |
| MOD_RES | 17 | |
| | note = Lys at position 17 is chemically modified by conjugation of the epsilon-amino group of the Lys side chain with (2-[2-(2-amino-ethoxy)-ethoxy]-acetyl)2-(gamma-Glu)-CO-(CH2)16-CO 2H | |
| SITE | 20 | |
| | note = MISC_FEATURE - Xaa at position 20 is Aib | |
| SITE | 24 | |
| | note = MISC_FEATURE - Xaa at position 24 is D-Glu | |
| MOD_RES | 39 | |
| | note = Ser at position 39 is amidated | |
| source | 1..39 | |
| | mol_type = protein | |
| | organism = synthetic construct | |
| SEQUENCE: 81 | | |
| YXEGTXTSDH SIXLDEKAQX TFIXYLIEGG PSSGAPPPS | | 39 |
| | | |
| SEQ ID NO: 82 | moltype = AA  length = 39 | |
| FEATURE | Location/Qualifiers | |
| REGION | 1..39 | |

```
                       note = Synthetic Construct
SITE                   2
                       note = MISC_FEATURE - Xaa at position 2 is Aib
SITE                   6
                       note = MISC_FEATURE - Xaa at position 6 is
                        alpha-methyl-Phe(2F)
SITE                   13
                       note = MISC_FEATURE - Xaa at position 13 is alpha-methyl-Leu
SITE                   16
                       note = MISC_FEATURE - Xaa at position 16 is Orn
MOD_RES                17
                       note = Lys at position 17 is chemically modified by
                        conjugation of the epsilon-amino group of the Lys side
                        chain with
                        (2-[2-(2-amino-ethoxy)-ethoxy]-acetyl)2-(gamma-Glu)-CO-(CH2
                        )18-CO 2H
SITE                   20
                       note = MISC_FEATURE - Xaa at position 20 is Aib
SITE                   24
                       note = MISC_FEATURE - Xaa at position 24 is D-Glu
MOD_RES                39
                       note = Ser at position 39 is amidated
source                 1..39
                       mol_type = protein
                       organism = synthetic construct
SEQUENCE: 82
YXEGTXTSDH SIXLDXKAQX TFIXYLIEGG PSSGAPPPS                                  39

SEQ ID NO: 83          moltype = AA  length = 39
FEATURE                Location/Qualifiers
REGION                 1..39
                       note = Synthetic Construct
SITE                   2
                       note = MISC_FEATURE - Xaa at position 2 is Aib
SITE                   6
                       note = MISC_FEATURE - Xaa at position 6 is
                        alpha-methyl-Phe(2F)
SITE                   13
                       note = MISC_FEATURE - Xaa at position 13 is alpha-methyl-Leu
SITE                   16
                       note = MISC_FEATURE - Xaa at position 16 is Dab
MOD_RES                17
                       note = Lys at position 17 is chemically modified by
                        conjugation of the epsilon-amino group of the Lys side
                        chain with
                        (2-[2-(2-amino-ethoxy)-ethoxy]-acetyl)2-(gamma-Glu)-CO-(CH2
                        )18-CO 2H
SITE                   20
                       note = MISC_FEATURE - Xaa at position 20 is a Aib
SITE                   24
                       note = MISC_FEATURE - Xaa at position 24 is D-Glu
MOD_RES                39
                       note = Ser at position 39 is amidated
source                 1..39
                       mol_type = protein
                       organism = synthetic construct
SEQUENCE: 83
YXEGTXTSDH SIXLDXKAQX TFIXYLIEGG PSSGAPPPS                                  39

SEQ ID NO: 84          moltype = AA  length = 39
FEATURE                Location/Qualifiers
REGION                 1..39
                       note = Synthetic Construct
SITE                   2
                       note = MISC_FEATURE - Xaa at position 2 is Aib
SITE                   6
                       note = MISC_FEATURE - Xaa at position 6 is
                        alpha-methyl-Phe(2F)
SITE                   13
                       note = MISC_FEATURE - Xaa at position 13 is alpha-methyl-Leu
SITE                   16
                       note = MISC_FEATURE - Xaa at position 16 is Dap
MOD_RES                17
                       note = Lys at position 17 is chemically modified by
                        conjugation of the epsilon-amino group of the Lys side
                        chain with
                        (2-[2-(2-amino-ethoxy)-ethoxy]-acetyl)2-(gamma-Glu)-CO-(CH2
                        )18-CO 2H
SITE                   20
```

```
                    note = MISC_FEATURE - Xaa at position 20 is Aib
SITE                24
                    note = MISC_FEATURE - Xaa at position 24 is D-Glu
MOD_RES             39
                    note = Ser at position 39 is amidated
source              1..39
                    mol_type = protein
                    organism = synthetic construct
SEQUENCE: 84
YXEGTXTSDH SIXLDXKAQX TFIXYLIEGG PSSGAPPPS                              39

SEQ ID NO: 85       moltype = AA  length = 39
FEATURE             Location/Qualifiers
REGION              1..39
                    note = Synthetic Construct
SITE                2
                    note = MISC_FEATURE - Xaa at position 2 is Aib
SITE                6
                    note = MISC_FEATURE - Xaa at position 6 is
                     alpha-methyl-Phe(2F)
SITE                13
                    note = MISC_FEATURE - Xaa at position 13 is alpha-methyl-Leu
MOD_RES             17
                    note = Lys at position 17 is chemically modified by
                     conjugation of the epsilon-amino group of the Lys side
                     chain with
                     (2-[2-(2-amino-ethoxy)-ethoxy]-acetyl)2-CO-(CH2)18-CO2H
SITE                20
                    note = MISC_FEATURE - Xaa at position 20 is Aib
SITE                24
                    note = MISC_FEATURE - Xaa at position 24 is D-Glu
MOD_RES             39
                    note = Ser at position 39 is amidated
source              1..39
                    mol_type = protein
                    organism = synthetic construct
SEQUENCE: 85
YXEGTXTSDH SIXLDEKAQX TFIXYLIEGG PSSGAPPPS                              39

SEQ ID NO: 86       moltype = AA  length = 39
FEATURE             Location/Qualifiers
REGION              1..39
                    note = Synthetic Construct
SITE                2
                    note = MISC_FEATURE - Xaa at position 2 is Aib
SITE                6
                    note = MISC_FEATURE - Xaa at position 6 is
                     alpha-methyl-Phe(2F)
SITE                13
                    note = MISC_FEATURE - Xaa at position 13 is alpha-methyl-Leu
MOD_RES             17
                    note = Lys at position 17 is chemically modified by
                     conjugation of the epsilon-amino group of the Lys side
                     chain with
                     (2-[2-(2-amino-ethoxy)-ethoxy]-acetyl)2-(epsilon-Lys)-CO-(C
                     H2)16- CO2H
SITE                20
                    note = MISC_FEATURE - Xaa at position 20 is Aib
SITE                24
                    note = MISC_FEATURE - Xaa at position 24 is D-Glu
MOD_RES             39
                    note = Ser at position 39 is amidated
source              1..39
                    mol_type = protein
                    organism = synthetic construct
SEQUENCE: 86
YXEGTXTSDH SIXLDEKAQX TFIXYLIEGG PSSGAPPPS                              39

SEQ ID NO: 87       moltype = AA  length = 39
FEATURE             Location/Qualifiers
REGION              1..39
                    note = Synthetic Construct
SITE                2
                    note = MISC_FEATURE - Xaa at position 2 is Aib
SITE                6
                    note = MISC_FEATURE - Xaa at position 6 is
                     alpha-methyl-Phe(2F)
SITE                13
                    note = MISC_FEATURE - Xaa at position 13 is alpha-methyl-Leu
```

```
MOD_RES            17
                   note = Lys at position 17 is chemically modified by
                    conjugation of the epsilon-amino group of the Lys side
                    chain with
                    (2-[2-(2-amino-ethoxy)-ethoxy]-acetyl)2-(gamma-Glu)-CO-(CH2
                   )14-CO 2H
SITE               20
                   note = MISC_FEATURE - Xaa at position 20 is Aib
SITE               24
                   note = MISC_FEATURE - Xaa at position 24 is D-Glu
MOD_RES            39
                   note = Ser at position 39 is amidated
source             1..39
                   mol_type = protein
                   organism = synthetic construct
SEQUENCE: 87
YXEGTXTSDH SIXLDEKAQX HFIXYLIEGG PSSGAPPPS                           39

SEQ ID NO: 88      moltype = AA  length = 34
FEATURE            Location/Qualifiers
REGION             1..34
                   note = Synthetic Construct
SITE               2
                   note = MISC_FEATURE - Xaa at position 2 is Aib
SITE               6
                   note = MISC_FEATURE - Xaa at position 6 is
                    alpha-methyl-Phe(2F)
SITE               13
                   note = MISC_FEATURE - Xaa at position 13 is alpha-methyl-Leu
MOD_RES            17
                   note = Lys at position 17 is chemically modified by
                    conjugation of the epsilon-amino group of the Lys side
                    chain with
                    (2-[2-(2-amino-ethoxy)-ethoxy]-acetyl)2-(gamma-Glu)-CO-(CH2
                   )16-CO 2H
SITE               20
                   note = MISC_FEATURE - Xaa at position 20 is Aib
SITE               24
                   note = MISC_FEATURE - Xaa at position 24 is D-Glu
MOD_RES            34
                   note = Gly at position 34 is amidated
source             1..34
                   mol_type = protein
                   organism = synthetic construct
SEQUENCE: 88
YXEGTXTSDH SIXLDEKAQX HFIXYLIEGG PSSG                                34

SEQ ID NO: 89      moltype = AA  length = 30
FEATURE            Location/Qualifiers
REGION             1..30
                   note = Synthetic Construct
SITE               2
                   note = MISC_FEATURE - Xaa at position 2 is Aib
SITE               6
                   note = MISC_FEATURE - Xaa at position 6 is
                    alpha-methyl-Phe(2F)
SITE               13
                   note = MISC_FEATURE - Xaa at position 13 is alpha-methyl-Leu
MOD_RES            17
                   note = Lys at position 17 is chemically modified by
                    conjugation of the epsilon-amino group of the Lys side
                    chain with
                    (2-[2-(2-amino-ethoxy)-ethoxy]-acetyl)2-(gamma-Glu)-CO-(CH2
                   )16-CO 2H
SITE               20
                   note = MISC_FEATURE - Xaa at position 20 is Aib
SITE               24
                   note = MISC_FEATURE - Xaa at position 24 is D-Glu
MOD_RES            30
                   note = Gly at position 30 is amidated
source             1..30
                   mol_type = protein
                   organism = synthetic construct
SEQUENCE: 89
YXEGTXTSDH SIXLDEKAQX HFIXYLIEGG                                     30

SEQ ID NO: 90      moltype = AA  length = 39
FEATURE            Location/Qualifiers
REGION             1..39
```

```
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    10
                        note = MISC_FEATURE - Xaa at position 10 is 3Pal
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 90
YXEGTXTSDX SIXLDEKAQX EFIXYLIEGG PSSGAPPPS                                 39

SEQ ID NO: 91           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    10
                        note = MISC_FEATURE - Xaa at position 10 is 4Pal
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 91
YXEGTXTSDX SIXLDEKAQX EFIXYLIEGG PSSGAPPPS                                 39

SEQ ID NO: 92           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
SITE                    24
```

```
                         note = MISC_FEATURE - Xaa at position 24 is D-Glu
MOD_RES                  39
                         note = Ser at position 39 is amidated
source                   1..39
                         mol_type = protein
                         organism = synthetic construct
SEQUENCE: 92
YXEGTXTSDL SIXLDEKAQX EFIXYLIEGG PSSGAPPPS                              39

SEQ ID NO: 93            moltype = AA   length = 39
FEATURE                  Location/Qualifiers
REGION                   1..39
                         note = Synthetic Construct
SITE                     2
                         note = MISC_FEATURE - Xaa at position 2 is Aib
SITE                     6
                         note = MISC_FEATURE - Xaa at position 6 is
                          alpha-methyl-Phe(2F)
SITE                     13
                         note = MISC_FEATURE - Xaa at position 13 is alpha-methyl-Leu
MOD_RES                  17
                         note = Lys at position 17 is chemically modified by
                          conjugation of the epsilon-amino group of the Lys side
                          chain with
                          (2-[2-(2-amino-ethoxy)-ethoxy]-acetyl)2-(gamma-Glu)-CO-(CH2
                          )18-CO 2H
SITE                     20
                         note = MISC_FEATURE - Xaa at position 20 is Aib
SITE                     24
                         note = MISC_FEATURE - Xaa at position 24 is D-Glu
MOD_RES                  39
                         note = Ser at position 39 is amidated
source                   1..39
                         mol_type = protein
                         organism = synthetic construct
SEQUENCE: 93
YXEGTXTSDQ SIXLDEKAQX EFIXYLIEGG PSSGAPPPS                              39

SEQ ID NO: 94            moltype = AA   length = 39
FEATURE                  Location/Qualifiers
REGION                   1..39
                         note = Synthetic Construct
SITE                     2
                         note = MISC_FEATURE - Xaa at position 2 is Aib
SITE                     6
                         note = MISC_FEATURE - Xaa at position 6 is
                          alpha-methyl-Phe(2F)
SITE                     10
                         note = MISC_FEATURE - Xaa at position 10 is 4Pal
SITE                     13
                         note = MISC_FEATURE - Xaa at position 13 is alpha-methyl-Leu
MOD_RES                  17
                         note = Lys at position 17 is chemically modified by
                          conjugation of the epsilon-amino group of the Lys side
                          chain with
                          (2-[2-(2-amino-ethoxy)-ethoxy]-acetyl)2-(gamma-Glu)-CO-(CH2
                          )18-CO 2H
SITE                     20
                         note = MISC_FEATURE - Xaa at position 20 is Aib
SITE                     24
                         note = MISC_FEATURE - Xaa at position 24 is Aib
MOD_RES                  39
                         note = Ser at position 39 is amidated
source                   1..39
                         mol_type = protein
                         organism = synthetic construct
SEQUENCE: 94
YXEGTXTSDX SIXLDEKAQX EFIXYLIEGG PSSGAPPPS                              39

SEQ ID NO: 95            moltype = AA   length = 34
FEATURE                  Location/Qualifiers
REGION                   1..34
                         note = Synthetic Construct
SITE                     2
                         note = MISC_FEATURE - Xaa at position 2 is alpha-methyl-Pro
MOD_RES                  17
                         note = Lys at position 17 is chemically modified by
                          conjugation of the epsilon-amino group of the Lys side
                          chain with
```

```
                            (2-[2-(2-amino-ethoxy)-ethoxy]-acetyl)2-(gamma-Glu)-CO-(CH2
                            )16-CO 2H
MOD_RES                     34
                            note = Gly at position 34 is amidated
source                      1..34
                            mol_type = protein
                            organism = synthetic construct
SEQUENCE: 95
YXEGTFTSDY SILLDEKAQQ AFIEYLIEGG PSSG                                      34

SEQ ID NO: 96               moltype = AA   length = 39
FEATURE                     Location/Qualifiers
REGION                      1..39
                            note = Synthetic Construct
SITE                        2
                            note = MISC_FEATURE - Xaa at position 2 is Aib
SITE                        6
                            note = MISC_FEATURE - Xaa at position 6 is
                            alpha-methyl-Phe(2F)
SITE                        10
                            note = MISC_FEATURE - Xaa at position 10 is 4Pal
SITE                        13
                            note = MISC_FEATURE - Xaa at position 13 is alpha-methyl-Leu
MOD_RES                     17
                            note = Lys at position 17 is chemically modified by
                            conjugation of the epsilon-amino group of the Lys side
                            chain with
                            (2-[2-(2-Amino-ethoxy)-ethoxy]-acetyl)-(gamma-Glu)-(2-[2-(2
                            -Amino -ethoxy)-ethoxy]-acetyl)-CO-(CH2)18-CO2H
SITE                        20
                            note = MISC_FEATURE - Xaa at position 20 is Aib
SITE                        24
                            note = MISC_FEATURE - Xaa at position 24 is D-Glu
MOD_RES                     39
                            note = Ser at position 39 is amidated
source                      1..39
                            mol_type = protein
                            organism = synthetic construct
SEQUENCE: 96
YXEGTXTSDX SIXLDKKAQX EFIXYLIEGG PSSGAPPPS                                 39

SEQ ID NO: 97               moltype = AA   length = 39
FEATURE                     Location/Qualifiers
REGION                      1..39
                            note = Synthetic Construct
SITE                        2
                            note = MISC_FEATURE - Xaa at position 2 is Aib
SITE                        6
                            note = MISC_FEATURE - Xaa at position 6 is
                            alpha-methyl-Phe(2F)
SITE                        10
                            note = MISC_FEATURE - Xaa at position 10 is 4Pal
SITE                        13
                            note = MISC_FEATURE - Xaa at position 13 is alpha-methyl-Leu
MOD_RES                     17
                            note = Lys at position 17 is chemically modified by
                            conjugation of the epsilon-amino group of the Lys side
                            chain with
                            (2-[2-(2-amino-ethoxy)-ethoxy]-acetyl)2-(gamma-Glu)-CO-(CH2
                            )18-CO 2H
SITE                        20
                            note = MISC_FEATURE - Xaa at position 20 is Aib
SITE                        24
                            note = MISC_FEATURE - Xaa at position 24 is D-Glu
MOD_RES                     39
                            note = Ser at position 39 is amidated
source                      1..39
                            mol_type = protein
                            organism = synthetic construct
SEQUENCE: 97
YXEGTXTSDX SIXLDKKAQX EFIXYLIEGG PSSGAPPPS                                 39

SEQ ID NO: 98               moltype = AA   length = 39
FEATURE                     Location/Qualifiers
REGION                      1..39
                            note = Synthetic Construct
SITE                        2
                            note = MISC_FEATURE - Xaa at position 2 is Aib
SITE                        6
```

-continued

```
                        note = MISC_FEATURE - Xaa at position 6 is
                         alpha-methyl-Phe(2F)
SITE                    10
                        note = MISC_FEATURE - Xaa at position 10 is 4Pal
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )16-CO 2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 98
YXEGTXTSDX SIXLDEKAQX EFIXYLIEGG PSSGAPPPS                                39

SEQ ID NO: 99           moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    10
                        note = MISC_FEATURE - Xaa at position 10 is 4Pal
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-CO-(CH2)16-CO2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 99
YXEGTXTSDX SIXLDEKAQX EFIXYLIEGG PSSGAPPPS                                39

SEQ ID NO: 100          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    10
                        note = MISC_FEATURE - Xaa at position 10 is 4Pal
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-CO-(CH2)18-CO2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
```

```
                              mol_type = protein
                              organism = synthetic construct
SEQUENCE: 100
YXEGTXTSDX SIXLDEKAQX EFIXYLIEGG PSSGAPPPS                              39

SEQ ID NO: 101          moltype = AA  length = 39
FEATURE                 Location/Qualifiers
REGION                  1..39
                              note = Synthetic Construct
SITE                    2
                              note = MISC_FEATURE - Xaa at position 2 is Aib
SITE                    6
                              note = MISC_FEATURE - Xaa at position 6 is
                               alpha-methyl-Phe(2F)
SITE                    10
                              note = MISC_FEATURE - Xaa at position 10 is 4Pal
SITE                    13
                              note = MISC_FEATURE - Xaa at position 13 is alpha-methyl-Leu
MOD_RES                 17
                              note = Lys at position 17 is chemically modified by
                               conjugation of the epsilon-amino group of the Lys side
                               chain with
                               (2-[2-(2-Amino-ethoxy)-ethoxy]-acetyl)2-(epsilon-Lys)-CO-(C
                              H2)18- CO2H
SITE                    20
                              note = MISC_FEATURE - Xaa at position 20 is Aib
SITE                    24
                              note = MISC_FEATURE - Xaa at position 24 is D-Glu
MOD_RES                 39
                              note = Ser at position 39 is amidated
source                  1..39
                              mol_type = protein
                              organism = synthetic construct
SEQUENCE: 101
YXEGTXTSDX SIXLDEKAQX EFIXYLIEGG PSSGAPPPS                              39

SEQ ID NO: 102          moltype = AA  length = 39
FEATURE                 Location/Qualifiers
REGION                  1..39
                              note = Synthetic Construct
SITE                    2
                              note = MISC_FEATURE - Xaa at position 2 is Aib
SITE                    6
                              note = MISC_FEATURE - Xaa at position 6 is
                               alpha-methyl-Phe(2F)
SITE                    13
                              note = MISC_FEATURE - Xaa at position 13 is alpha-methyl-Leu
MOD_RES                 17
                              note = Lys at position 17 is chemically modified by
                               conjugation of the epsilon-amino group of the Lys side
                               chain with
                               (2-[2-(2-amino-ethoxy)-ethoxy]-acetyl)2-(gamma-Glu)-CO-(CH2
                              )14-CO 2H
SITE                    20
                              note = MISC_FEATURE - Xaa at position 20 is Aib
SITE                    24
                              note = MISC_FEATURE - Xaa at position 24 is D-Glu
MOD_RES                 39
                              note = Ser at position 39 is amidated
source                  1..39
                              mol_type = protein
                              organism = synthetic construct
SEQUENCE: 102
YXEGTXTSDY SIXLDEKAQX EFIXYLIEGG PSSGAPPPS                              39

SEQ ID NO: 103          moltype = AA  length = 39
FEATURE                 Location/Qualifiers
REGION                  1..39
                              note = Synthetic Construct
SITE                    2
                              note = MISC_FEATURE - Xaa at position 2 is Aib
SITE                    6
                              note = MISC_FEATURE - Xaa at position 6 is
                               alpha-methyl-Phe(2F)
SITE                    13
                              note = MISC_FEATURE - Xaa at position 13 is alpha-methyl-Leu
SITE                    16
                              note = MISC_FEATURE - Xaa at position 16 is Dab
MOD_RES                 17
```

```
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )16-CO 2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 103
YXEGTXTSDY SIXLDXKAQX EFIXYLIEGG PSSGAPPPS                              39

SEQ ID NO: 104          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is alpha-methyl-Leu
SITE                    16
                        note = MISC_FEATURE - Xaa at position 16 is Dap
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )16-CO 2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 104
YXEGTXTSDY SIXLDXKAQX EFIXYLIEGG PSSGAPPPS                              39

SEQ ID NO: 105          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-Amino-ethoxy)-ethoxy]-acetyl)-(gamma-Glu)-(2-[2-(2
                         -Amino -ethoxy)-ethoxy]-acetyl)-CO-(CH2)18-CO2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 105
YXEGTXTSDY SIXLDKKAQX EFIXYLIEGG PSSGAPPPS                              39

SEQ ID NO: 106          moltype = AA  length = 39
FEATURE                 Location/Qualifiers
```

```
REGION                    1..39
                          note = Synthetic Construct
SITE                      2
                          note = MISC_FEATURE - Xaa at position 2 is Aib
SITE                      6
                          note = MISC_FEATURE - Xaa at position 6 is
                          alpha-methyl-Phe(2F)
SITE                      13
                          note = MISC_FEATURE - Xaa at position 13 is alpha-methyl-Leu
MOD_RES                   17
                          note = Lys at position 17 is chemically modified by
                          conjugation of the epsilon-amino group of the Lys side
                          chain with
                          (2-[2-(2-amino-ethoxy)-ethoxy]-acetyl)2-(gamma-Glu)-CO-(CH2
                          )18-CO 2H
SITE                      20
                          note = MISC_FEATURE - Xaa at position 20 is Aib
SITE                      24
                          note = MISC_FEATURE - Xaa at position 24 is D-Glu
MOD_RES                   39
                          note = Ser at position 39 is amidated
source                    1..39
                          mol_type = protein
                          organism = synthetic construct
SEQUENCE: 106
YXEGTXTSDY SIXLDKKAQX EFIXYLIEGG PSSGAPPPS                                         39

SEQ ID NO: 107            moltype = AA  length = 39
FEATURE                   Location/Qualifiers
REGION                    1..39
                          note = Synthetic Construct
SITE                      2
                          note = MISC_FEATURE - Xaa at position 2 is Aib
SITE                      6
                          note = MISC_FEATURE - Xaa at position 6 is alpha-methyl-Phe
SITE                      13
                          note = MISC_FEATURE - Xaa at position 13 is alpha-methyl-Leu
MOD_RES                   17
                          note = Lys at position 17 is chemically modified by
                          conjugation of the epsilon-amino group of the Lys side
                          chain with
                          (2-[2-(2-amino-ethoxy)-ethoxy]-acetyl)2-(gamma-Glu)-CO-(CH2
                          )16-CO 2H
SITE                      20
                          note = MISC_FEATURE - Xaa at position 20 is Aib
SITE                      24
                          note = MISC_FEATURE - Xaa at position 24 is D-Glu
MOD_RES                   39
                          note = Ser at position 39 is amidated
source                    1..39
                          mol_type = protein
                          organism = synthetic construct
SEQUENCE: 107
YXEGTXTSDY SIXLDEKAQX EFIXYLIEGG PSSGAPPPS                                         39

SEQ ID NO: 108            moltype = AA  length = 39
FEATURE                   Location/Qualifiers
REGION                    1..39
                          note = Synthetic Construct
SITE                      2
                          note = MISC_FEATURE - Xaa at position 2 is Aib
SITE                      6
                          note = MISC_FEATURE - Xaa at position 6 is
                          alpha-methyl-Phe(2F)
SITE                      13
                          note = MISC_FEATURE - Xaa at position 13 is alpha-methyl-Leu
MOD_RES                   17
                          note = Lys at position 17 is chemically modified by
                          conjugation of the epsilon-amino group of the Lys side
                          chain with
                          (2-[2-(2-amino-ethoxy)-ethoxy]-acetyl)2-CO-(CH2)16-CO2H
SITE                      20
                          note = MISC_FEATURE - Xaa at position 20 is Aib
SITE                      24
                          note = MISC_FEATURE - Xaa at position 24 is D-Glu
MOD_RES                   39
                          note = Ser at position 39 is amidated
source                    1..39
                          mol_type = protein
```

-continued

```
                        organism = synthetic construct
SEQUENCE: 108
YXEGTXTSDY SIXLDEKAQX EFIXYLIEGG PSSGAPPPS                           39

SEQ ID NO: 109          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-CO-(CH2)18-CO2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 109
YXEGTXTSDY SIXLDEKAQX EFIXYLIEGG PSSGAPPPS                           39

SEQ ID NO: 110          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(epsilon-Lys)-CO-(C
                         H2)18- CO2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 110
YXEGTXTSDY SIXLDEKAQX EFIXYLIEGG PSSGAPPPS                           39

SEQ ID NO: 111          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is alpha-methyl-Leu
SITE                    16
                        note = MISC_FEATURE - Xaa at position 16 is Dab
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
```

```
                        )18-CO 2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 111
YXEGTXTSDY SIXLDXKAQX EFIXYLIEGG PSSGAPPPS                            39

SEQ ID NO: 112          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                        alpha-methyl-Phe(2F)
SITE                    13
                        note = MISC_FEATURE - Xaa at position 13 is alpha-methyl-Leu
SITE                    16
                        note = MISC_FEATURE - Xaa at position 16 is Dap
MOD_RES                 17
                        note = Lys at position 17 is chemically modified by
                        conjugation of the epsilon-amino group of the Lys side
                        chain with
                        (2-[2-(2-amino-ethoxy)-ethoxy]-acetyl)2-(gamma-Glu)-CO-(CH2
                        )18-CO 2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 112
YXEGTXTSDY SIXLDXKAQX EFIXYLIEGG PSSGAPPPS                            39

SEQ ID NO: 113          moltype = AA  length = 34
FEATURE                 Location/Qualifiers
REGION                  1..34
                        note = Synthetic Construct
SITE                    2
                        note = MISC_FEATURE - Xaa at position 2 is Aib
SITE                    6
                        note = MISC_FEATURE - Xaa at position 6 is
                        alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                        conjugation of the epsilon-amino group of the Lys side
                        chain with
                        (2-[2-(2-amino-ethoxy)-ethoxy]-acetyl)2-(gamma-Glu)-CO-(CH2
                        )16-CO 2H
SITE                    20
                        note = MISC_FEATURE - Xaa at position 20 is Aib
SITE                    24
                        note = MISC_FEATURE - Xaa at position 24 is D-Glu
MOD_RES                 34
                        note = Gly at position 34 is amidated
source                  1..34
                        mol_type = protein
                        organism = synthetic construct
SEQUENCE: 113
YXEGTXTSDY SIXLDEKAQX EFIXYLIEGG PSSG                                 34

SEQ ID NO: 114          moltype = AA  length = 30
FEATURE                 Location/Qualifiers
REGION                  1..30
                        note = Synthetic Construct
SITE                    2
                        note = MISC_FEATURE - Xaa at position 2 is Aib
```

```
SITE            6
                note = MISC_FEATURE - Xaa at position 6 is
                alpha-methyl-Phe(2F)
SITE            13
                note = MISC_FEATURE - Xaa at position 13 is alpha-methyl-Leu
MOD_RES         17
                note = Lys at position 17 is chemically modified by
                conjugation of the epsilon-amino group of the Lys side
                chain with
                (2-[2-(2-amino-ethoxy)-ethoxy]-acetyl)2-(gamma-Glu)-CO-(CH2
                )16-CO 2H
SITE            20
                note = MISC_FEATURE - Xaa at position 20 is Aib
SITE            24
                note = MISC_FEATURE - Xaa at position 24 is D-Glu
MOD_RES         30
                note = Gly at position 30 is amidated
source          1..30
                mol_type = protein
                organism = synthetic construct
SEQUENCE: 114
YXEGTXTSDY SIXLDEKAQX EFIXYLIEGG                                         30

SEQ ID NO: 115          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                        alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                        conjugation of the epsilon-amino group of the Lys side
                        chain with
                        (2-[2-(2-amino-ethoxy)-ethoxy]-acetyl)2-(gamma-Glu)-CO-(CH2
                        )16-CO 2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 115
YXEGTXTSDY SIXLDEKAQX EFIXYLIEGG PSSGAPPPS                               39

SEQ ID NO: 116          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                        alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                        conjugation of the epsilon-amino group of the Lys side
                        chain with
                        (2-[2-(2-amino-ethoxy)-ethoxy]-acetyl)2-(gamma-Glu)-CO-(CH2
                        )18-CO 2H
SITE                    20
                        note = MISC_FEATURE - Xaa at position 20 is Aib
SITE                    24
                        note = MISC_FEATURE - Xaa at position 24 is D-Glu
SITE                    25
                        note = MISC_FEATURE - Xaa at position 25 alpha-methyl-Tyr
MOD_RES                 39
                        note = Ser at position 39 is amidated
source                  1..39
                        mol_type = protein
```

```
                        organism = synthetic construct
SEQUENCE: 116
YXEGTXTSDY SIXLDEKAQX EFIXXLIEGG PSSGAPPPS                              39

SEQ ID NO: 117          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
SITE                    25
                        note = MISC_FEATURE - Xaa at position 25 is alpha-methyl-Tyr
MOD_RES                 39
                        note = Ser at position 39 is amidated
source                  1..39
                        mol_type = protein
                        organism = synthetic construct
SEQUENCE: 117
YXEGTXTSDY SIXLDEKAQX EFIEXLIEGG PSSGAPPPS                              39

SEQ ID NO: 118          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is Aib
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 118
YXEGTXTSDY SIXLDEKAQX EFIXYLIEGG PSSGAPPPS                              39

SEQ ID NO: 119          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is alpha-methyl-Phe
SITE                    13
                        note = MISC_FEATURE - Xaa at position 13 is Aib
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
```

```
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 119
YXEGTXTSDY SIXLDEKAQX EFIXYLIEGG PSSGAPPPS                               39

SEQ ID NO: 120          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 120
YXEGTXTSDY SILLDEKAQX EFIXYLIEGG PSSGAPPPS                               39

SEQ ID NO: 121          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is alpha-methyl-Phe
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 121
YXEGTXTSDY SIXLDEKAQX EFIXYLIEGG PSSGAPPPS                               39

SEQ ID NO: 122          moltype = AA  length = 34
FEATURE                 Location/Qualifiers
REGION                  1..34
                        note = Synthetic Construct
SITE                    2
                        note = MISC_FEATURE - Xaa at position 2 is Aib
SITE                    6
                        note = MISC_FEATURE - Xaa at position 6 is alpha-methyl-Phe
SITE                    13
                        note = MISC_FEATURE - Xaa at position 13 is alpha-methyl-Leu
MOD_RES                 17
                        note = Lys at position 17 is chemically modified by
                         conjugation of the epsilon-amino group of the Lys side
```

```
                         chain with
                         (2-[2-(2-amino-ethoxy)-ethoxy]-acetyl)2-(gamma-Glu)-CO-(CH2
                         )18-CO 2H
SITE                     20
                         note = MISC_FEATURE - Xaa at position 20 is Aib
SITE                     24
                         note = MISC_FEATURE - Xaa at position 24 is D-Glu
MOD_RES                  34
                         note = Gly at position 34 is amidated
source                   1..34
                         mol_type = protein
                         organism = synthetic construct
SEQUENCE: 122
YXEGTXTSDY SIXLDKKAQX EFIXYLIEGG PSSG                                       34

SEQ ID NO: 123           moltype = AA  length = 39
FEATURE                  Location/Qualifiers
REGION                   1..39
                         note = Synthetic Construct
SITE                     2
                         note = MISC_FEATURE - Xaa at position 2 is Aib
SITE                     6
                         note = MISC_FEATURE - Xaa at position 6 is
                         alpha-methyl-Phe(2F)
SITE                     13
                         note = MISC_FEATURE - Xaa at position 13 is alpha-methyl-Leu
MOD_RES                  17
                         note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                     20
                         note = MISC_FEATURE - Xaa at position 20 is Aib
SITE                     24
                         note = MISC_FEATURE - Xaa at position 24 is D-Glu
MOD_RES                  39
                         note = Ser at position 39 is amidated
source                   1..39
                         mol_type = protein
                         organism = synthetic construct
SEQUENCE: 123
YXEGTXTSDY SIXLDHKAQX EFIXYLIEGG PSSGAPPPS                                  39

SEQ ID NO: 124           moltype = AA  length = 39
FEATURE                  Location/Qualifiers
REGION                   1..39
                         note = Synthetic Construct
SITE                     2
                         note = MISC_FEATURE - Xaa at position 2 is Aib
SITE                     6
                         note = MISC_FEATURE - Xaa at position 6 is
                         alpha-methyl-Phe(2F)
SITE                     10
                         note = MISC_FEATURE - Xaa at position 10 is 4Pal
SITE                     13
                         note = MISC_FEATURE - Xaa at position 13 is alpha-methyl-Leu
SITE                     16
                         note = MISC_FEATURE - Xaa at position 16 is Dab
MOD_RES                  17
                         note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )16-CO 2H
SITE                     20
                         note = MISC_FEATURE - Xaa at position 20 is Aib
SITE                     24
                         note = MISC_FEATURE - Xaa at position 24 is D-Glu
MOD_RES                  39
                         note = Ser at position 39 is amidated
source                   1..39
                         mol_type = protein
                         organism = synthetic construct
SEQUENCE: 124
YXEGTXTSDX SIXLDXKAQX EFIXYLIEGG PSSGAPPPS                                  39

SEQ ID NO: 125           moltype = AA  length = 39
FEATURE                  Location/Qualifiers
```

```
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is alpha-methyl-Leu
SITE                    16
                        note = MISC_FEATURE - Xaa at position 16 is Orn
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )16-CO 2H
SITE                    20
                        note = MISC_FEATURE - Xaa at position 20 is Aib
SITE                    24
                        note = MISC_FEATURE - Xaa at position 24 is D-Glu
SITE                    25
                        note = MISC_FEATURE - Xaa at position 25 is alpha-methyl-Tyr
MOD_RES                 39
                        note = Ser at position 39 is amidated
source                  1..39
                        mol_type = protein
                        organism = synthetic construct
SEQUENCE: 125
YXEGTXTSDY SIXLDXKAQX EFIXXLIEGG PSSGAPPPS                                    39

SEQ ID NO: 126          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is alpha-methyl-Leu
SITE                    16
                        note = MISC_FEATURE - Xaa at position 16 is Orn
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )16-CO 2H
SITE                    20
                        note = MISC_FEATURE - Xaa at position 20 is Aib
SITE                    24
                        note = MISC_FEATURE - Xaa at position 24 is D-Glu
SITE                    25
                        note = MISC_FEATURE - Xaa at position 25 is alpha-methyl-Tyr
MOD_RES                 39
                        note = Ser at position 39 is amidated
source                  1..39
                        mol_type = protein
                        organism = synthetic construct
SEQUENCE: 126
YXEGTXTSDL SIXLDXKAQX EFIXXLIEGG PSSGAPPPS                                    39

SEQ ID NO: 127          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    10
                        note = MISC_FEATURE - Xaa at position 10 is 4Pal
SITE                    13
                        note = MISC_FEATURE - Xaa at position 13 is alpha-methyl-Leu
SITE                    16
                        note = MISC_FEATURE - Xaa at position 16 is Orn
```

|  |  |
|---|---|
| MOD_RES | 17 |
|  | note = Lys at position 17 is chemically modified by conjugation of the epsilon-amino group of the Lys side chain with (2-[2-(2-amino-ethoxy)-ethoxy]-acetyl)2-(gamma-Glu)-CO-(CH2)16-CO 2H |
| SITE | 20 |
|  | note = MISC_FEATURE - Xaa at position 20 is Aib |
| SITE | 24 |
|  | note = MISC_FEATURE - Xaa at position 24 is D-Glu |
| SITE | 25 |
|  | note = MISC_FEATURE - Xaa at position 25 is alpha-methyl-Tyr |
| MOD_RES | 39 |
|  | note = Ser at position 39 is amidated |
| source | 1..39 |
|  | mol_type = protein |
|  | organism = synthetic construct |
| SEQUENCE: 127 |  |
| YXEGTXTSDX SIXLDXKAQX TFIXXLIEGG PSSGAPPPS | 39 |
|  |  |
| SEQ ID NO: 128 | moltype = AA length = 39 |
| FEATURE | Location/Qualifiers |
| REGION | 1..39 |
|  | note = Synthetic Construct |
| SITE | 2 |
|  | note = MISC_FEATURE - Xaa at position 2 is Aib |
| SITE | 6 |
|  | note = MISC_FEATURE - Xaa at position 6 is alpha-methyl-Phe(2F) |
| SITE | 13 |
|  | note = MISC_FEATURE - Xaa at position 13 is alpha-methyl-Leu |
| SITE | 16 |
|  | note = MISC_FEATURE - Xaa at position 16 is Orn |
| MOD_RES | 17 |
|  | note = Lys at position 17 is chemically modified by conjugation of the epsilon-amino group of the Lys side chain with (2-[2-(2-amino-ethoxy)-ethoxy]-acetyl)2-(gamma-Glu)-CO-(CH2)16-CO 2H |
| SITE | 20 |
|  | note = MISC_FEATURE - Xaa at position 20 is Aib |
| SITE | 24 |
|  | note = MISC_FEATURE - Xaa at position 24 is D-Glu |
| SITE | 25 |
|  | note = MISC_FEATURE - Xaa at position 25 is alpha-methyl-Tyr |
| MOD_RES | 39 |
|  | note = Ser at position 39 is amidated |
| source | 1..39 |
|  | mol_type = protein |
|  | organism = synthetic construct |
| SEQUENCE: 128 |  |
| YXEGTXTSDV SIXLDXKAQX TFIXXLIEGG PSSGAPPPS | 39 |
|  |  |
| SEQ ID NO: 129 | moltype = AA length = 39 |
| FEATURE | Location/Qualifiers |
| REGION | 1..39 |
|  | note = Synthetic Construct |
| SITE | 2 |
|  | note = MISC_FEATURE - Xaa at position 2 is Aib |
| SITE | 6 |
|  | note = MISC_FEATURE - Xaa at position 6 is alpha-methyl-Phe(2F) |
| SITE | 13 |
|  | note = MISC_FEATURE - Xaa at position 13 is alpha-methyl-Leu |
| SITE | 16 |
|  | note = MISC_FEATURE - Xaa at position 16 is Orn |
| MOD_RES | 17 |
|  | note = Lys at position 17 is chemically modified by conjugation of the epsilon-amino group of the Lys side chain with (2-[2-(2-amino-ethoxy)-ethoxy]-acetyl)2-(gamma-Glu)-CO-(CH2)16-CO 2H |
| SITE | 20 |
|  | note = MISC_FEATURE - Xaa at position 20 is Aib |
| SITE | 24 |
|  | note = MISC_FEATURE - Xaa at position 24 is D-Glu |
| SITE | 25 |
|  | note = MISC_FEATURE - Xaa at position 25 is alpha-methyl-Tyr |
| MOD_RES | 39 |

|   |   |
|---|---|
|   | note = Ser at position 39 is amidated |
| source | 1..39 |
|   | mol_type = protein |
|   | organism = synthetic construct |
| SEQUENCE: 129 |   |
| YXEGTXTSDV SIXLDXKAQX AFIXXLIEGG PSSGAPPPS | 39 |
|   |   |
| SEQ ID NO: 130 | moltype = AA  length = 39 |
| FEATURE | Location/Qualifiers |
| REGION | 1..39 |
|   | note = Synthetic Construct |
| SITE | 2 |
|   | note = MISC_FEATURE - Xaa at position 2 is Aib |
| SITE | 6 |
|   | note = MISC_FEATURE - Xaa at position 6 is |
|   |   alpha-methyl-Phe(2F) |
| SITE | 13 |
|   | note = MISC_FEATURE - Xaa at position 13 is alpha-methyl-Leu |
| SITE | 16 |
|   | note = MISC_FEATURE - Xaa at position 16 is Orn |
| MOD_RES | 17 |
|   | note = Lys at position 17 is chemically modified by |
|   |   conjugation of the epsilon-amino group of the Lys side |
|   |   chain with |
|   |   (2-[2-(2-amino-ethoxy)-ethoxy]-acetyl)2-(gamma-Glu)-CO-(CH2 |
|   |   )16-CO 2H |
| SITE | 20 |
|   | note = MISC_FEATURE - Xaa at position 20 is Aib |
| SITE | 24 |
|   | note = MISC_FEATURE - Xaa at position 24 is D-Glu |
| SITE | 25 |
|   | note = MISC_FEATURE - Xaa at position 25 is alpha-methyl-Tyr |
| MOD_RES | 39 |
|   | note = Ser at position 39 is amidated |
| source | 1..39 |
|   | mol_type = protein |
|   | organism = synthetic construct |
| SEQUENCE: 130 |   |
| YXEGTXTSDL SIXLDXKAQX TFIXXLIEGG PSSGAPPPS | 39 |
|   |   |
| SEQ ID NO: 131 | moltype = AA  length = 39 |
| FEATURE | Location/Qualifiers |
| REGION | 1..39 |
|   | note = Synthetic Construct |
| SITE | 2 |
|   | note = MISC_FEATURE - Xaa at position 2 is Aib |
| SITE | 6 |
|   | note = MISC_FEATURE - Xaa at position 6 is |
|   |   alpha-methyl-Phe(2F) |
| SITE | 13 |
|   | note = MISC_FEATURE - Xaa at position 13 is alpha-methyl-Leu |
| SITE | 16 |
|   | note = MISC_FEATURE - Xaa at position 16 is Orn |
| MOD_RES | 17 |
|   | note = Lys at position 17 is chemically modified by |
|   |   conjugation of the epsilon-amino group of the Lys side |
|   |   chain with |
|   |   (2-[2-(2-amino-ethoxy)-ethoxy]-acetyl)2-(gamma-Glu)-CO-(CH2 |
|   |   )16-CO 2H |
| SITE | 20 |
|   | note = MISC_FEATURE - Xaa at position 20 is Aib |
| SITE | 24 |
|   | note = MISC_FEATURE - Xaa at position 24 is D-Glu |
| SITE | 25 |
|   | note = MISC_FEATURE - Xaa at position 25 is alpha-methyl-Tyr |
| MOD_RES | 39 |
|   | note = Ser at position 39 is amidated |
| source | 1..39 |
|   | mol_type = protein |
|   | organism = synthetic construct |
| SEQUENCE: 131 |   |
| YXEGTXTSDL SIXLDXKAQX AFIXXLIEGG PSSGAPPPS | 39 |
|   |   |
| SEQ ID NO: 132 | moltype = AA  length = 39 |
| FEATURE | Location/Qualifiers |
| REGION | 1..39 |
|   | note = Synthetic Construct |
| SITE | 2 |
|   | note = MISC_FEATURE - Xaa at position 2 is Aib |

```
                    SITE             6
                                     note = MISC_FEATURE - Xaa at position 6 is
                                      alpha-methyl-Phe(2F)
                    SITE             13
                                     note = MISC_FEATURE - Xaa at position 13 is alpha-methyl-Leu
                    SITE             16
                                     note = MISC_FEATURE - Xaa at position 16 is Orn
                    MOD_RES          17
                                     note = Lys at position 17 is chemically modified by
                                      conjugation of the epsilon-amino group of the Lys side
                                      chain with
                                      (2-[2-(2-amino-ethoxy)-ethoxy]-acetyl)2-(gamma-Glu)-CO-(CH2
                                      )16-CO 2H
                    SITE             20
                                     note = MISC_FEATURE - Xaa at position 20 is Aib
                    SITE             24
                                     note = MISC_FEATURE - Xaa at position 24 is D-Glu
                    SITE             25
                                     note = MISC_FEATURE - Xaa at position 25 is alpha-methyl-Tyr
                    MOD_RES          39
                                     note = Ser at position 39 is amidated
                    source           1..39
                                     mol_type = protein
                                     organism = synthetic construct
SEQUENCE: 132
YXEGTXTSDA SIXLDXKAQX AFIXXLIEGG PSSGAPPPS                                               39

SEQ ID NO: 133          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is Aib
SITE                    16
                        note = MISC_FEATURE - Xaa at position 16 is Orn
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )16-CO 2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 133
YXEGTXTSDY SIXLDXKAQX EFIXYLIEGG PSSGAPPPS                                               39

SEQ ID NO: 134          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    16
                        note = MISC_FEATURE - Xaa at position 16 is Orn
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )16-CO 2H
SITE                    20
                        note = MISC_FEATURE - Xaa at position 20 is Aib
SITE                    24
                        note = MISC_FEATURE - Xaa at position 24 is D-Glu
```

```
MOD_RES                 39
                        note = Ser at position 39 is amidated
source                  1..39
                        mol_type = protein
                        organism = synthetic construct
SEQUENCE: 134
YXEGTXTSDY SILLDXKAQX EFIXYLIEGG PSSGAPPPS                              39

SEQ ID NO: 135          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is Nle
SITE                    16
                        note = MISC_FEATURE - Xaa at position 16 is Orn
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )16-CO 2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 135
YXEGTXTSDY SIXLDXKAQX EFIXYLIEGG PSSGAPPPS                              39

SEQ ID NO: 136          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
SITE                    13
                        note = MISC_FEATURE - Xaa at position 13 is Aib
SITE                    16
                        note = MISC_FEATURE - Xaa at position 16 is Orn
MOD_RES                 17
                        note = Lys at position 17 is chemically modified by
                         conjugation of the epsilon-amino group of the Lys side
                         chain with
                         (2-[2-(2-amino-ethoxy)-ethoxy]-acetyl)2-(gamma-Glu)-CO-(CH2
                         )18-CO 2H
SITE                    20
                        note = MISC_FEATURE - Xaa at position 20 is Aib
SITE                    24
                        note = MISC_FEATURE - Xaa at position 24 is D-Glu
MOD_RES                 39
                        note = Ser at position 39 is amidated
source                  1..39
                        mol_type = protein
                        organism = synthetic construct
SEQUENCE: 136
YXEGTXTSDY SIXLDXKAQX EFIXYLIEGG PSSGAPPPS                              39

SEQ ID NO: 137          moltype = AA  length = 39
FEATURE                 Location/Qualifiers
REGION                  1..39
                        note = Synthetic Construct
SITE                    2
                        note = MISC_FEATURE - Xaa at position 2 is Aib
SITE                    6
                        note = MISC_FEATURE - Xaa at position 6 is
                         alpha-methyl-Phe(2F)
```

```
SITE              10
                  note = MISC_FEATURE - Xaa at position 10 is 4Pal
SITE              13
                  note = MISC_FEATURE - Xaa at position 13 is alpha-methyl-Leu
SITE              16
                  note = MISC_FEATURE - Xaa at position 16 is Orn
MOD_RES           17
                  note = Lys at position 17 is chemically modified by
                   conjugation of the epsilon-amino group of the Lys side
                   chain with
                   (2-[2-(2-amino-ethoxy)-ethoxy]-acetyl)2-(epsilon-Lys)-CO-(C
                  H2)18- CO2H
SITE              20
                  note = MISC_FEATURE - Xaa at position 20 is Aib
SITE              24
                  note = MISC_FEATURE - Xaa at position 24 is D-Glu
SITE              25
                  note = MISC_FEATURE - Xaa at position 25 is alpha-methyl-Tyr
MOD_RES           39
                  note = Ser at position 39 is amidated
source            1..39
                  mol_type = protein
                  organism = synthetic construct
SEQUENCE: 137
YXEGTXTSDX SIXLDXKAQX AFIXXLIEGG PSSGAPPPS                      39

SEQ ID NO: 138    moltype = AA  length = 34
FEATURE           Location/Qualifiers
REGION            1..34
                  note = Synthetic Construct
SITE              2
                  note = MISC_FEATURE - Xaa at position 2 is Aib
SITE              6
                  note = MISC_FEATURE - Xaa at position 6 is
                   alpha-methyl-Phe(2F)
SITE              10
                  note = MISC_FEATURE - Xaa at position 10 is 4Pal
SITE              13
                  note = MISC_FEATURE - Xaa at position 13 is alpha-methyl-Leu
SITE              16
                  note = MISC_FEATURE - Xaa at position 16 is Orn
MOD_RES           17
                  note = Lys at position 17 is chemically modified by
                   conjugation of the epsilon-amino group of the Lys side
                   chain with
                   (2-[2-(2-amino-ethoxy)-ethoxy]-acetyl)2-(gamma-Glu)-CO-(CH2
                  )16-CO 2H
SITE              20
                  note = MISC_FEATURE - Xaa at position 20 is Aib
SITE              24
                  note = MISC_FEATURE - Xaa at position 24 is D-Glu
SITE              25
                  note = MISC_FEATURE - Xaa at position 25 is alpha-methyl-Tyr
MOD_RES           34
                  note = Gly at position 34 is amidated
source            1..34
                  mol_type = protein
                  organism = synthetic construct
SEQUENCE: 138
YXEGTXTSDX SIXLDXKAQX EFIXXLIEGG PSSG                           34

SEQ ID NO: 139    moltype = AA  length = 30
FEATURE           Location/Qualifiers
REGION            1..30
                  note = Synthetic Construct
SITE              2
                  note = MISC_FEATURE - Xaa at position 2 is Aib
SITE              6
                  note = MISC_FEATURE - Xaa at position 6 is
                   alpha-methyl-Phe(2F)
SITE              10
                  note = MISC_FEATURE - Xaa at position 10 is 4Pal
SITE              13
                  note = MISC_FEATURE - Xaa at position 13 is alpha-methyl-Leu
SITE              16
                  note = MISC_FEATURE - Xaa at position 13 is Orn
MOD_RES           17
                  note = Lys at position 17 is chemically modified by
                   conjugation of the epsilon-amino group of the Lys side
```

```
                    chain with
                    (2-[2-(2-amino-ethoxy)-ethoxy]-acetyl)2-(gamma-Glu)-CO-(CH2
                    )16-CO 2H
SITE                20
                    note = MISC_FEATURE - Xaa at position 20 is Aib
SITE                24
                    note = MISC_FEATURE - Xaa at position 24 is D-Glu
SITE                25
                    note = MISC_FEATURE - Xaa at position 25 is alpha-methyl-Tyr
MOD_RES             30
                    note = Gly at position 30 is amidated
source              1..30
                    mol_type = protein
                    organism = synthetic construct
SEQUENCE: 139
YXEGTXTSDX SIXLDXKAQX EFIXXLIEGG                                          30
```

We claim:

1. A method of improving weight management in a patient in need thereof, comprising:
   a) administering to said patient a first dose of a GIP:GLP-1 Peptide having a GIP:GLP-1 receptor agonist potency ratio that is greater than or equal to the GIP:GLP-1 receptor agonist potency ratio of a GIP:GLP-1 Peptide having SEQ ID NO: 56 and less than the GIP:GLP-1 receptor agonist potency ratio of a GIP:GLP-1 Peptide having SEQ ID NO: 49, wherein the GIP:GLP-1 agonist potency ratio is measured after a 60 minute incubation using a casein cAMP assay normalized against GIP and GLP-1; and thereafter
   b) administering to said patient a second dose of the GIP:GLP-1 Peptide for a minimum of about two weeks; and thereafter
   c) administering to said patient a third dose of the GIP:GLP-1 Peptide for a minimum of about two weeks; and thereafter
   d) administering to said patient a fourth dose of the GIP:GLP-1 Peptide;
   wherein the first dose is about 25% of the fourth dose, the second dose is about 50% of the fourth dose and the third dose is about 75% of the fourth dose.

2. The method of claim 1, wherein the doses are each administered for about four weeks before the administration of the next higher dose begins.

3. The method of claim 1, wherein the GIP:GLP-1 Peptide has a receptor agonist potency ratio that is 2.5:1 to about 5:1 GIP to GLP-1.

4. The method of claim 1, wherein the GIP:GLP-1 Peptide has a receptor agonist potency ratio that is 2.5:1 to about 3.5:1 GIP to GLP-1.

5. A method of treating obesity in a patient in need thereof, comprising:
   a) administering to said patient a first dose of a GIP:GLP-1 Peptide having a GIP:GLP-1 receptor agonist potency ratio that is greater than or equal to the GIP:GLP-1 receptor agonist potency ratio of a GIP:GLP-1 Peptide having SEQ ID NO: 56 and less than the GIP:GLP-1 receptor agonist potency ratio of a GIP:GLP-1 Peptide having SEQ ID NO: 49, wherein the GIP:GLP-1 agonist potency ratio is measured after a 60 minute incubation using a casein cAMP assay normalized against GIP and GLP-1; and thereafter
   b) administering to said patient a second dose of the GIP:GLP-1 Peptide for a minimum of about two weeks; and thereafter
   c) administering to said patient a third dose of the GIP:GLP-1 Peptide for a minimum of about two weeks; and thereafter
   d) administering to said patient a fourth dose of the GIP:GLP-1 Peptide;
   wherein the first dose is about 25% of the fourth dose, the second dose is about 50% of the fourth dose and the third dose is about 75% of the fourth dose.

6. The method of claim 5, wherein the doses are each administered for about four weeks before the administration of the next higher dose begins.

7. The method of claim 5, wherein the GIP:GLP-1 Peptide has a receptor agonist potency ratio that is 2.5:1 to about 5:1 GIP to GLP-1.

8. The method of claim 5, wherein the GIP:GLP-1 Peptide has a receptor agonist potency ratio that is 2.5:1 to about 3.5:1 GIP to GLP-1.

* * * * *